United States Patent
Preda et al.

(10) Patent No.: US 10,806,140 B2
(45) Date of Patent: Oct. 20, 2020

(54) ANTIMICROBIAL COMPOUND

(71) Applicant: Physical Sciences, Inc., Andover, MA (US)

(72) Inventors: Dorin V. Preda, Medford, MA (US); Aaron R. Rathmell, Upton, MA (US); Colin M. Hessel, North Andover, MA (US); John D. Lennhoff, North Andover, MA (US); Mitchell T. Antalek, Medford, MA (US)

(73) Assignee: Physical Sciences, Inc., Andover, MA (US)

( * ) Notice: Subject to any disclaimer, the term of this patent is extended or adjusted under 35 U.S.C. 154(b) by 0 days.

(21) Appl. No.: 16/375,045

(22) Filed: Apr. 4, 2019

(65) Prior Publication Data

US 2019/0313641 A1    Oct. 17, 2019

Related U.S. Application Data

(60) Provisional application No. 62/656,410, filed on Apr. 12, 2018.

(51) Int. Cl.
*A01N 37/48*    (2006.01)
*A01N 43/66*    (2006.01)
*A01N 47/28*    (2006.01)

(52) U.S. Cl.
CPC .............. *A01N 37/48* (2013.01); *A01N 43/66* (2013.01); *A01N 47/28* (2013.01)

(58) Field of Classification Search
CPC ......... A01N 37/48; A01N 43/66; A01N 47/28
See application file for complete search history.

(56) References Cited

U.S. PATENT DOCUMENTS

| | | |
|---|---|---|
| 6,440,405 B1 | 8/2002 | Cooper et al. |
| 6,579,906 B2 | 6/2003 | Cooper et al. |
| 8,309,117 B2 | 11/2012 | Rubner et al. |
| 8,790,672 B2 | 7/2014 | Lamba-Kohli |
| 2004/0251188 A1 | 12/2004 | Skinner et al. |
| 2018/0258295 A1* | 9/2018 | Chu ..................... C09D 5/1637 |

OTHER PUBLICATIONS

SciFinder™ search opened saved answer set 'Antimicrobial dendrimers_ Oct. 12, 2017', Oct. 16, 2017, American Chemical Society, 2017, twenty-nine (29) pages total.

* cited by examiner

*Primary Examiner* — Shirley V Gembeh
(74) *Attorney, Agent, or Firm* — Iandiorio Teska & Coleman, LLP

(57) ABSTRACT

An antimicrobial composition including low molecular weight dendrimers of formula (1):

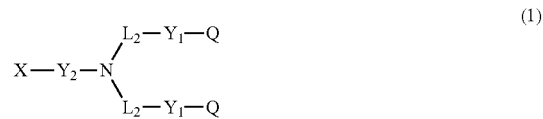

(1)

Q is an antimicrobial moiety in monomer or dendritic form, N is a nitrogen atom, $L_2$ is a linker linking each $Y_1$ molecular spacer to the nitrogen atom, $Y_1$ is a molecular spacer spacing each antimicrobial moiety Q from the $L_2$ linker, there are two or more chains of antimicrobial moieties and molecular spacers, X is a linker configured to covalently bond to surface functionalities of the substrate, and $Y_2$ is a molecular spacer between the linker X and the nitrogen atom.

22 Claims, 46 Drawing Sheets

(I)

X = GROUP FOR SURFACE ATTACHMENT
$L_1$, $L_2$ = LINKERS
Y = SPACER

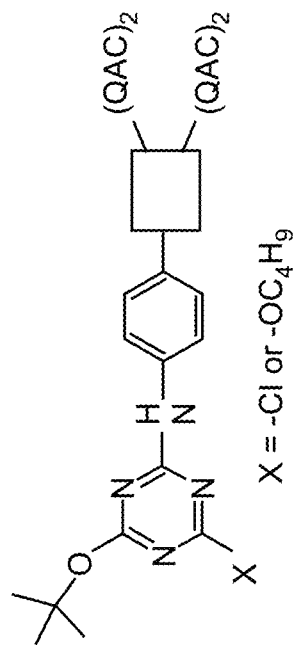
FIG. 10
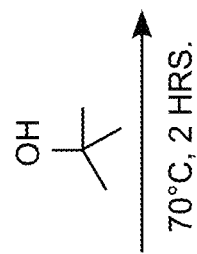
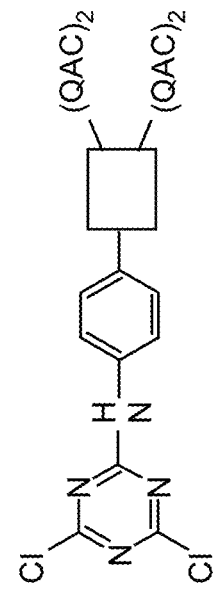

$R_1 = C_{18}$ TETRAMER UNIT $R_2 = C_{18}$ TETRAMER WITH DIDODECYLMETHYLAMONNIUM QACs

R₃ = QAC-TETRAMER UNIT

NEGATIVE CONTROL    INCREASED QAC LOADING (A) NO LAUNDERING

NON-IONIC
(B) TWEEN-20

ANIONIC (SULFATES, SULFONATES
(C) TIDE (D) TIDE WITH BRINE SOAK 0 mg     4 mg     20 mg     40 mg     NON-LAUNDERED (CONTROL)

QAC-NO$_2$ AMOUNT (PER SWATCH)

TEMPERATURE
49°C     R.T.     49°C     49°C

COLOR STANDARD     0.23% W/V     0.23% W/V     0.046% W/V     0.023% W/V     NON-LAUNDERED (CONTROL)

TIDE CONCENTRATION

TOP-LEFT    CENTER    BOTTOM-RIGHT

COLOR STANDARD | 1ST CYCLE | 5TH CYCLE | 10TH CYCLE | 11TH CYCLE | 15TH CYCLE

SIGNIFICANT REDUCTION IN ➤
QAC SURFACE POPULATION (A) PICTURE SATURATION 100%

(B) PICTURE SATURATION 400%

(A) PICTURE SATURATION 100%

(B) PICTURE SATURATION 300%

(A) PICTURE SATURATION 100%

(B) PICTURE SATURATION 300%

(A) PICTURE TEMPERATURE: 6500K     (B) PICTURE TEMPERATURE: 11200K (A) BACILLUS ATROPHAEUS (ATCC 9372)

(B) BACILLUS sp. (ATCC 29669)

(A) AZIDE DENDRIMER + UV (B) AZIDE DENDRIMER (NO UV)

(C) NO DENDRIMER

ANTIMICROBIAL COMPOUND

RELATED APPLICATIONS

This application claims benefit of and priority to U.S. Provisional Application Ser. No. 62/656,410 filed Apr. 12, 2018, under 35 U.S.C. §§ 119, 120, 363, 365, and 37 C.F.R. § 1.55 and § 1.78, which is incorporated herein by this reference.

BACKGROUND OF THE INVENTION

This invention relates to the field of antimicrobial surfaces such as textiles, metallic surfaces, polymeric materials, and the like Novel technologies in this field have tremendous and broad market opportunities in both medical and non-medical areas. The antimicrobial textiles market size is estimated to be valued at US $497.4 million in the US in 2015 and is projected to reach $1.07 million in the US by 2026, at a CAGR of 7.4% from 2016 to 2026. Also, by 2020, the market for smart antimicrobial coatings and surfaces in non-healthcare markets is expected to reach $225 million in the US and may reach $500 million by the 2022. The report "Antimicrobial Coatings Market by Type (Silver, Copper), Application (Indoor Air/HVAC, Medical, Mold Remediation, Building & Construction, Foods & Beverages, Textiles)—Global Forecast to 2021", is projected to reach 54.19 billion in the US by 2021, at a CAGR of 12.1% from 2016 to 2021. With the increased penetration of antimicrobial coatings in end-use applications in North America and Europe, it is anticipated that the market will register slightly higher growth than the Asia Pacific region, Middle East, Africa, and South America during the forecast period.

Multiple literature reports describe the concepts of antimicrobial dendrimers and covalent attachment of antimicrobial polymers to various surfaces. See U.S. Pat. Nos. 6,440,405-B1, 8,790,672-B2 and U.S. Published Application No. 2004/0251188-A1, all incorporated herein by this reference.

SUMMARY OF THE INVENTION

The problem of antimicrobial (AM) surfaces with low antimicrobial activity and/or loss of AM activity due to leaching/laundering is solved by novel quaternary ammonium cation (QAC) dendrimers covalently (strongly) attached to a surface of choice. These compounds render the resulting surfaces with high efficacy and broad spectrum antimicrobial activity (including antibacterial—both vegetative cells and spores, antifungal and antiviral), and resistance to leaching/laundering.

The concept for combined high antimicrobial efficacy, covalent attachment and biocompatibility has been demonstrated for textile surfaces. The attachment of dendrimers to metal surfaces via covalent bonds and the high antimicrobial efficacy of the resulting surfaces have also been demonstrated. Functionalization of polyurethane surfaces via covalent bonds has also been demonstrated. Functionalization of invasive medical devices such as tracheal tubes and catheters (made of polymers such as polyvinyl chloride or polyurethane) and antimicrobial evaluation have been proposed.

One embodiment of the approach produces textile materials with AM finish that is robust towards heat (autoclaving) or laundering. The attachment chemistry can be modified for AM derivatization of multiple surfaces (metallic, polymers, others).

One purpose of this invention is to demonstrate novel, low molecular weight dendrimers and their use for providing antimicrobial properties to multiple surfaces including but not limited to textiles, metals, polymers and filtration media.

Featured is a composition providing antimicrobial properties to a substrate. The composition comprises low molecular weight dendrimers of formula (1):

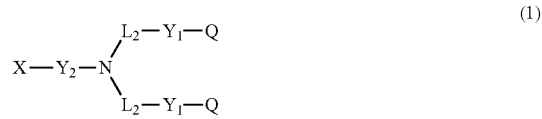

(1)

Preferably, Q is an antimicrobial moiety in monomer or dendritic form, N is a nitrogen atom, $L_2$ is a linker linking each $Y_1$ molecular spacer to the nitrogen atom, $Y_1$ is a molecular spacer spacing each antimicrobial moiety Q from the $L_2$ linker, and there are two or more chains of antimicrobial moieties and molecular spacers. X preferably is a linker configured to covalently bond to surface functionalities of the substrate and $Y_2$ is preferably a molecular spacer between the linker X and the nitrogen atom.

The molecular spacer $Y_2$ preferably includes a ring structure such as an aromatic ring. The antimicrobial moiety may include positively charged quaternary ammonium cations. The quaternary ammonium cations are preferably chosen from: tetrasubstituted nitrogen of type $^+NR_1R_2R_3R_4$, where $R_1$-$R_4$ can independently be alkyl, aryl, alkenyl or other carbon moieties and trisubstituted nitrogen of type $Z_1Z_2N^+=CA_1A_2$, where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$. The quaternary ammonium cations may be chosen from substituted dimethyldodecylammonium cation, didodecylmethylammonium cation, and dimethyloctylammonium cation, and substituted 2-methyl-1-decylimidazolium. The linker X may be chosen from: amino groups, dichlorotriazine, phosphonic acid, azide or other linkers specific to the surface of choice. The linker $L_2$ may include substituted N-propyl-propionamide. The spacer $Y_1$ may include substituted N-ethylurea.

Also featured is a composition providing antimicrobial properties to a substrate. The preferred composition comprises an antimicrobial moiety in monomer or dendritic form, a nitrogen atom, and a linker $L_2$ linking a molecular spacer $Y_1$ to the nitrogen atom. The molecular spacer $Y_1$ spaces each antimicrobial moiety from the $L_2$ linker. There are two or more chains of antimicrobial moieties and molecular spacers, a linker X configured to covalently bond to surface functionalities of the substrate, and a molecular spacer $Y_2$ between the linker X and the nitrogen atom.

The molecular spacer $Y_2$ may include a ring structure such as an aromatic ring. The antimicrobial moiety preferably includes positively charged quaternary ammonium cations. The quaternary ammonium cations may be chosen from: tetrasubstituted nitrogen of type $^+NR_1R_2R_3R_4$ where $R_1$-$R_4$ can independently be alkyl, aryl, alkenyl or other carbon moieties and trisubstituted nitrogen of type $Z_1Z_2N^+=CA_1A_2$ where $Z_1$, $Z_2$ can independently be alkyl, aryl, alkenyl or other carbon moieties and $A_5$ and $A_2$ are carbon or heteroatom moieties that may form a ring structure with $Z_1$ or $Z_2$. The composition of claim 14 in which the quaternary ammonia cations is chosen from substituted dimethyldodecylammonium cation, didodecylmethylammonium cation, and dimethyloctylammonium cation, and substituted 2-methyl-1-decylimidazolium. The linker X is preferably chosen from: amino groups, dichlorotriazine, phosphonic acid, and azide. The linker $L_2$ may include substituted N-propyl-propionamide. The spacer $Y_1$ may include substituted N-ethylurea.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIG. 10 is an example of a reaction of QAC-tetramer (DC form) with t-butanol;

DETAILED DESCRIPTION OF THE INVENTION

Figure 1:
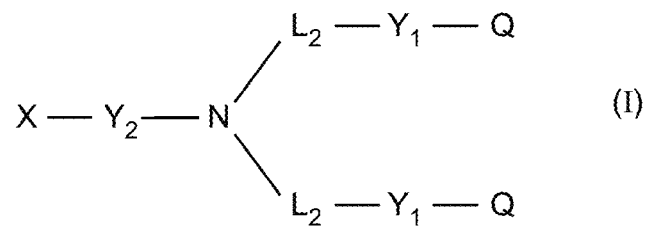
FIG. 1 shows Formula (1) of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Featured is a composition (see FIG. 1) providing antimicrobial properties to a substrate. The composition comprises low molecular weight dendrimers of formula (1):

(1)

Where Q is an antimicrobial moiety in monomer or dendritic form, N is a nitrogen atom, L is a linker linking each $Y_1$ molecular spacer to the nitrogen atom, $Y_1$ is a molecular spacer spacing each antimicrobial moiety Q from the $L_2$ linker, there are two or more chains of antimicrobial moieties and molecular spacers, X is a linker configured to covalently bond to surface functionalities of the substrate, and $Y_2$ is a molecular spacer between the linker X and the nitrogen atom.

Figure 2:
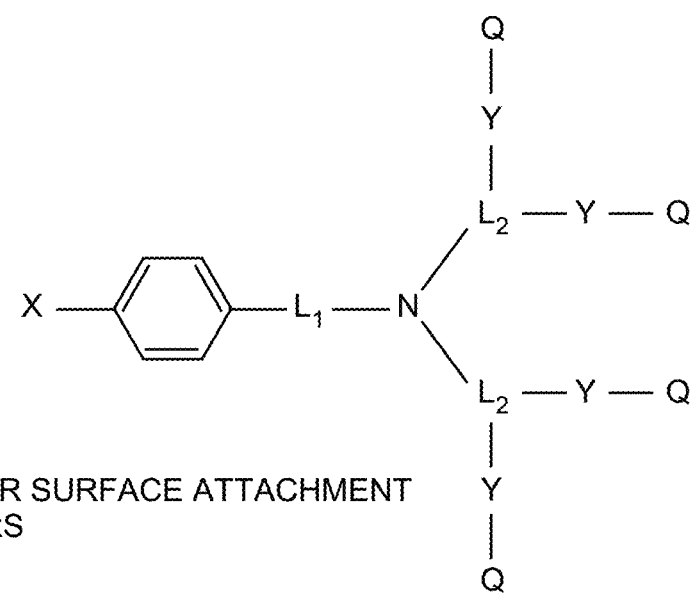
FIG. 2 is an example of generic structure of the dendrimers (tetramers)

Molecular spacer $Y_2$ may include a ring structure as shown in FIG. 2. The ring structure may be an aromatic ring such as a benzene ring or similar type aromatic ring. The antimicrobial moiety Q may include positively charged quaternary ammonium cations (QAC). The quaternary ammonium cations may be chosen from: tetrasubstituted nitrogen of type $^+NR_1R_2R_3R_4$, where $R_1$-$R_4$ can independently be alkyl, aryl, alkenyl or other carbon moieties and trisubstituted nitrogen of type $Z_1Z_2N^+=CA_1A_2$, where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$. The quaternary ammonium cations may be chosen from substituted dimethyldodecylammonium cation, didodecylmethylammonium cation, and dimethyloctylammonium cation, and substituted 2-methyl-1-decylimidazolium.

The linker X may be chosen from: amino groups, dichlorotriazine, phosphonic acid, azide or other linkers specific to the surface of choice. The linker $L_2$ may include substituted N-propyl-propionamide. The spacer $Y_1$ may include substituted N-ethylurea.

A. Synthesis of Antimicrobial QAC-Dendrimers—Examples

Multiple compounds (QAC-dendrimers and intermediates) were synthesized on gram-to-multigram scale. All compounds originated from the commercially available NPEA—2-(4-nitrophenyl)ethylamine hydrochloride. The compounds are structurally classified based on the dendrimer generation: $1^{st}$ generation (two branches—dimers), $2^{nd}$ generation (four branches—tetramers), $3^{rd}$ generation (eight branches—octamers) and $4^{th}$ generation (sixteen branches—hexadecamers). Examples of synthesis and experimental procedures for various compounds from these four classes are presented below (note: NMR spectra are available in picture format).

Synthesis of $1^{st}$ Generation Dendrimer Compounds and Intermediates (Dimers)

(a) Synthesis of QAC-Dimer (NO$_2$ Derivative)

Figure 3:
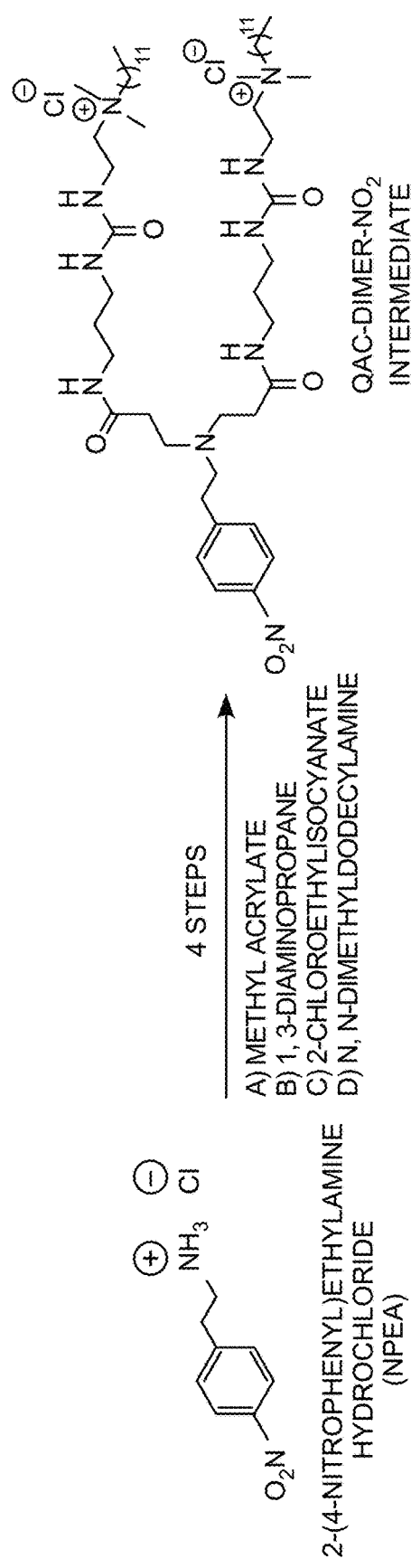
FIG. 3 is an example of synthesis of QAC-dimer-$NO_2$ intermediate.

This material has been synthesized on a gram scale in four steps from the commercially available NPEA—2-(4-nitrophenyl)ethylamine hydrochloride (FIG. 3). First, 2-(4-nitrophenyl)ethylamine hydrochloride—NPEA (20 grams, 99 mmol) was treated with excess aqueous sodium hydroxide in a methylene chloride (150 mL) emulsion. The resultant was thoroughly extracted (3×50 mL) with methylene chloride, dried over anhydrous sodium sulfate, and concentrated in vacuo prior to being added to methanol (100 mL). The free base solution in methanol was then treated with methyl acrylate (30 mL, 300 mmol). The resultant reaction mixture was heated to reflux and left to react overnight.

Following 16 hours of reaction time, the crude reaction mixture was concentrated via rotary evaporation. After evaporation of all solvent and excess methyl acrylate, the diester intermediate, dimethyl 3,3'-((4-nitrophenethyl)azanediyl)dipropionate was isolated as an orange oil (32.1 grams, 96%). $^1$H-NMR analysis of the material indicated sufficient purity to use directly in subsequent syntheses.

The previously obtained diester intermediate (32.1 grams, 95 mmol) was added to ethanol (50 mL) in a round bottom flask equipped with stir bar. To the reaction vessel was added 1,3-diaminopropane (32 mL, 380 mmol). The vessel was equipped with a glycol-chilled condenser and heated to reflux for 72 hours. Following completion of the reaction, excess solvent and 1,3-diaminopropane were removed in vacuo and the resultant oily liquid (13.3 grams, 31.6 mmol) was directly added to tert-butanol (50 mL) in a round bottom flask equipped with stir bar. To this solution was added 2-chloroethylisocyanate (10.5 mL, 100 mmol). The mixture was heated to reflux while equipped with a condenser for 48 hours. The excess solvent and 2-chloroethylisocyanate were removed from the mixture via vacuum distillation, yielding 3,3'-((4-nitrophenethyl)azanediyl)bis(N-(3-(3-(2-chloroethyl)ureido)propyl)propanamide) as an orange, waxy, semi-solid. $^1$H-NMR analysis indicated good purity.

The dichloro-intermediate previously isolated was carried forward directly without further purification toward the synthesis of the first generation QAC dendrimer. The substrate was dissolved in hot methanol (600 mL) and stirred vigorously. To the solution was added excess N,N-dimethyldodecylamine (80 mL, 300 mmol). The reaction mixture was allowed to proceed under refluxing conditions for % hours.

After 96 hours of reaction time the reaction mixture was concentrated under reduced pressure. Acetone was added to remove excess N,N-dimethyldodecylamine via trituration. The resultant material was washed thoroughly with methanol, and the supernatant collected. The supernatant solution was concentrated via rotary evaporation. After removal of the excess solvent, the material from the supernatant was analyzed by $^1$H-NMR. It was determined that this fraction contained the majority of the desired product.

(b) Synthesis of QAC-Dimer (NH$_2$ Derivative)

Reduction of QAC-dimer-NO$_2$ derivative with tin (II) chloride afforded the QAC-dimer amino intermediate as shown below.

A round bottomed flask equipped with magnetic stir bar is charged with methanol (50 mL) and water (10 mL). To the flask is added N1,N25-didodecyl-N1,N1,N25,N25-tetramethyl-13-(4-nitrophenethyl)-4,10,16,22-tetraoxo-3,5,9,13,17,21,23-heptaazapentacosane-1,25-diaminium chloride (5.9 grams, 5.56 mmol). To the solution was then added tin chloride dihydrate (3.8 grams, 16.7 mmol), followed by concentrated hydrochloric acid (1.4 mL, 16.7 mmol). The resultant was allowed to proceed at ambient temperature—for 3 days.

Following the completion of the reaction, aqueous sodium bicarbonate was added to the mixture under vigorous stirring until formation of gas ceased. The methanol was removed under reduced pressure, and the resultant suspension in water was concentrated by evaporation. The suspension was then filtered over a Teflon membrane, removing various inorganic salts. It was determined by $^1$H-NMR that the aqueous layer contained the QAC-dimer (amino intermediate).

Synthesis of 2$^{nd}$ Generation Dendrimer Compounds and Intermediates (Tetramers)

(a) Synthesis of the Tetraester Intermediate

Figure 4:
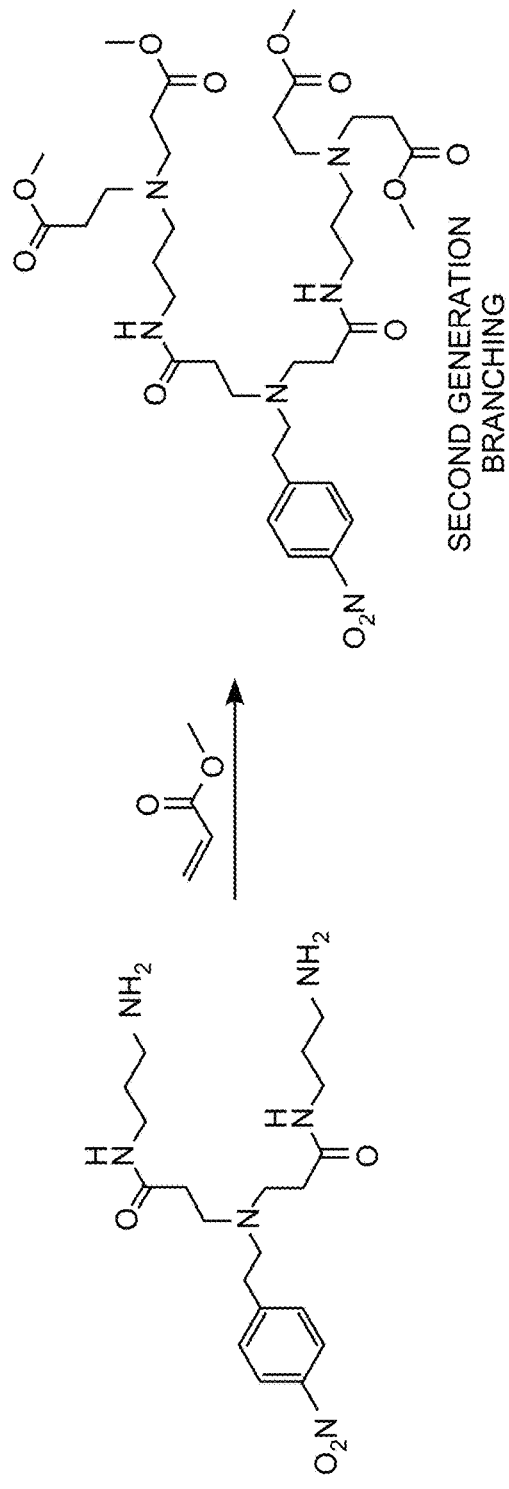
FIG. 4 is an example of synthesis of the tetraester intermediate.

The key tetraester intermediate was synthesized in one step from a diamino-intermediate used for the synthesis of the 1$^{st}$ generation dendrimers. The reaction involves exhaustive treatment with methyl acrylate as shown in FIG. 4.

The experimental procedure is presented below.

A round bottom flask was charged with methanol (100 mL) and equipped with a magnetic stir bar. To the flask was added 3,3'-((4-nitrophenethyl)azanediyl)bis(N-(3-aminopropyl)propanamide)(26.7 grams, 63 mmol). The resultant was stirred vigorously and methyl acrylate (34 mL, 380 mmol) was added. The reaction mixture was heated to reflux while equipped with a glycol-chilled condenser and left to react overnight. Removal of solvent in vacuo yielded the tetraester intermediate—dimethyl 4,20-bis(3-methoxy-3-oxopropyl)-12-(4-nitrophenethyl)-9,15-dioxo-4,8,12,16,20-pentaazatricosanedioate. The product has high purity, as indicated by the $^1$H-NMR analysis.

(b) Synthesis of the Tetraamino Intermediate

Figure 5:
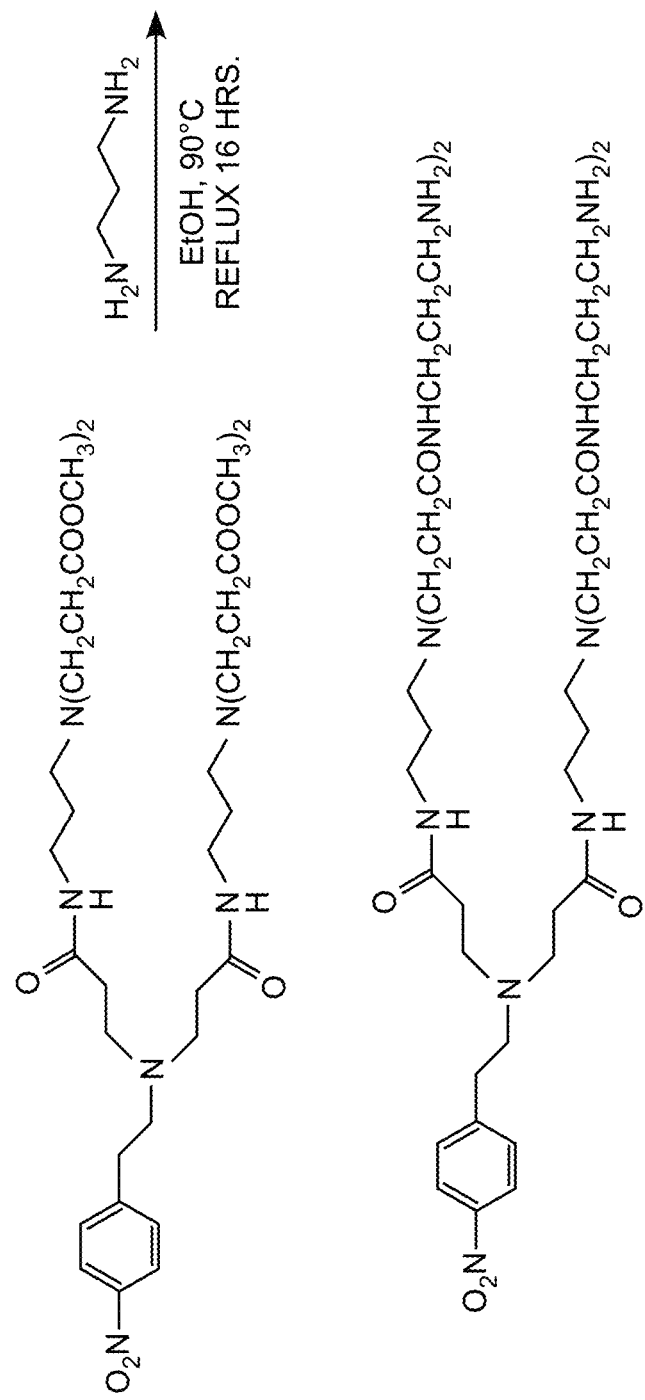
FIG. 5 is an example of synthesis of the tetraamino intermediate.

The tetraamino intermediate was obtained from the tetraester intermediate shown above by treatment with excess of 1,3-diaminopropane (FIG. 5).

A mixture of tetraester intermediate (63 mmol), ethanol (50 mL) and 1,3-diaminopropane (506 mmol, 43 mL) was stirred for 16 hours under reflux. Once the reaction was finished, the solvent and remaining 1,3-diaminopropane were removed using vacuum distillation. The resulting waxy residue was analyzed by $^1$H-NMR which indicated high purity.

(c) Synthesis of QAC-Tetramer (NO$_2$ Form, QAC=Dimethyldodecylammonium)

The target compound was synthesized from the tetraamino intermediate in two steps as described below. In the first step, the reaction of the tetraamino intermediate with 2-chloroethyl isocyanate affords the tetrachlorointermediate shown in FIG. 6.

The experimental details are presented below.

A 100 mL round bottom flask was charged with 2-chloroethyl isocyanate (6 mL) dissolved in DCM (5 mL). In a separate vial the 1$^{st}$ generation amine terminated dendrimer (~5.3 mmoles) was dissolved in DCM (15 mL) and then transferred to an addition funnel. The addition funnel was connected to the 100 mL round bottom flask, and the flask was placed in an oil bath set to 50° C. while stirring. After the 2-chloroethylisocyanate was up to temperature, the dendrimer intermediate solution was added dropwise over an hour. After one hour the addition funnel was switched out for a glycol chilled condenser and the reaction was allowed to proceed for 16 hours. The product was triturated with heptane. After decanting, this process was repeated 5 additional times to ensure the product was pure as evidenced by the $^1$H-NMR analysis.

Figure 7:
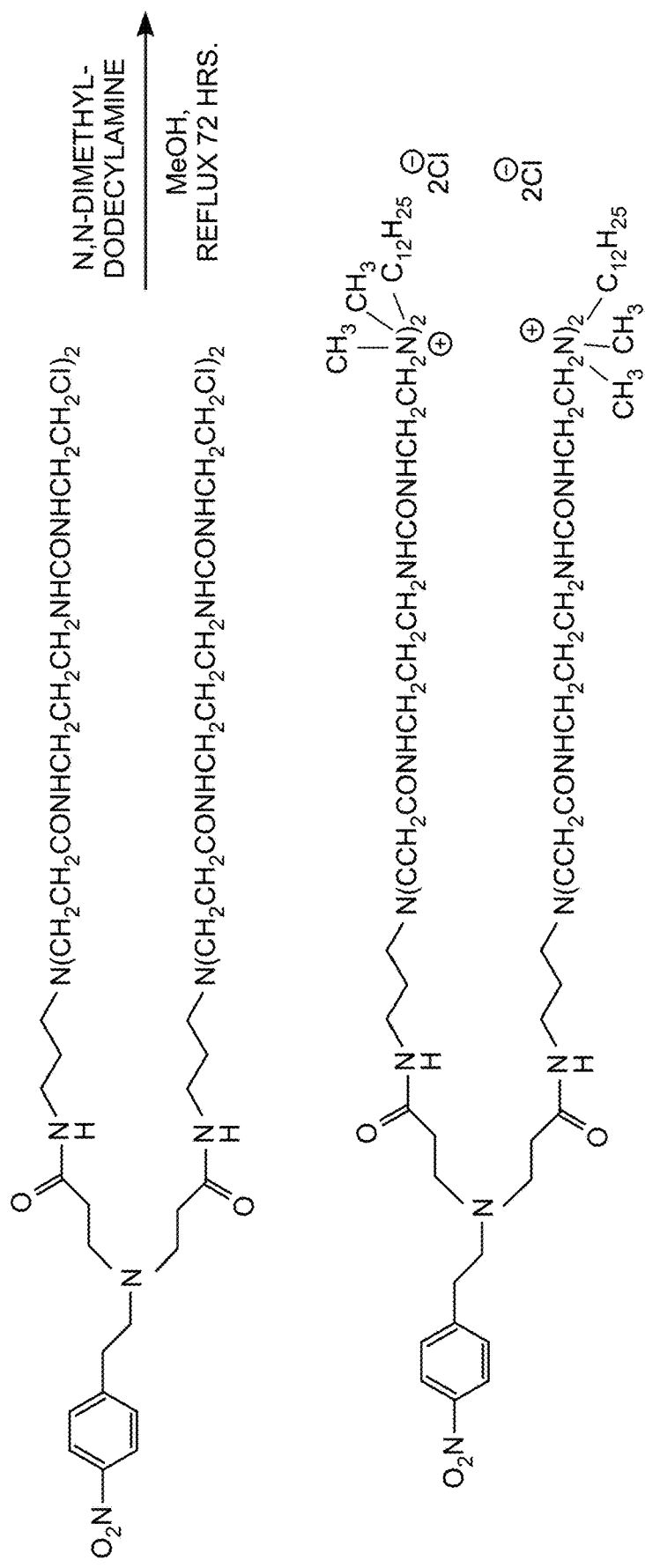
FIG. 7 is an example of synthesis of QAC-tetramer ($NO_2$ form, QAC=dimethyldodecylammonium)

In the second step of the synthesis, the tetrachlorointermediate was reacted with the dimethyldodecylamine to afford the QAC-tetramer target compound (FIG. 7).

Figure 6:
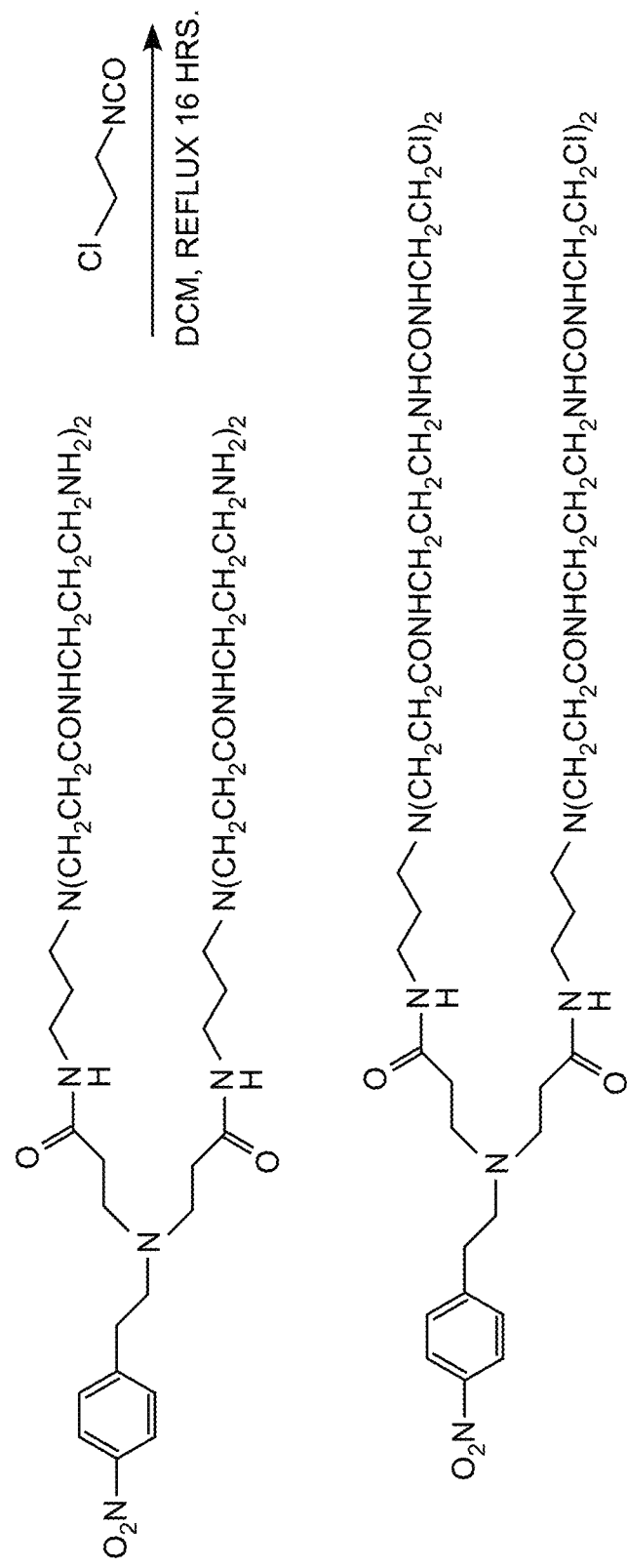
FIG. 6 is an example of synthesis of the tetrachlorointermediate.

The experimental procedure is presented below:

The tetrachlorointermediate shown in FIG. 6 (1 gram) was dissolved in methanol (13 mL) and N,N-dimethyldodecylamine (3.4 mL) was added. The mixture was magnetically stirred under reflux for 72 hours. The mixture was concentrated under reduced pressure and the crude product was purified by crystallization from acetone. $^1$H-NMR analysis indicated high purity.

(d) Synthesis of Final QAC-Tetramers (Amino-NH$_2$ and Dichlorotriazine-DCT Forms, QAC=Dimethyldodecylammonium)

The QAC-tetramer (NO$_2$ form) synthesized as shown above was reduced with tin (II) chloride to afford the amino (NH$_2$) derivative. This compound was further reacted with cyanuric chloride to afford the dichlorotriazine (DCT) analog. The experimental procedures associated with these two steps are presented in details below.

Figure 8:
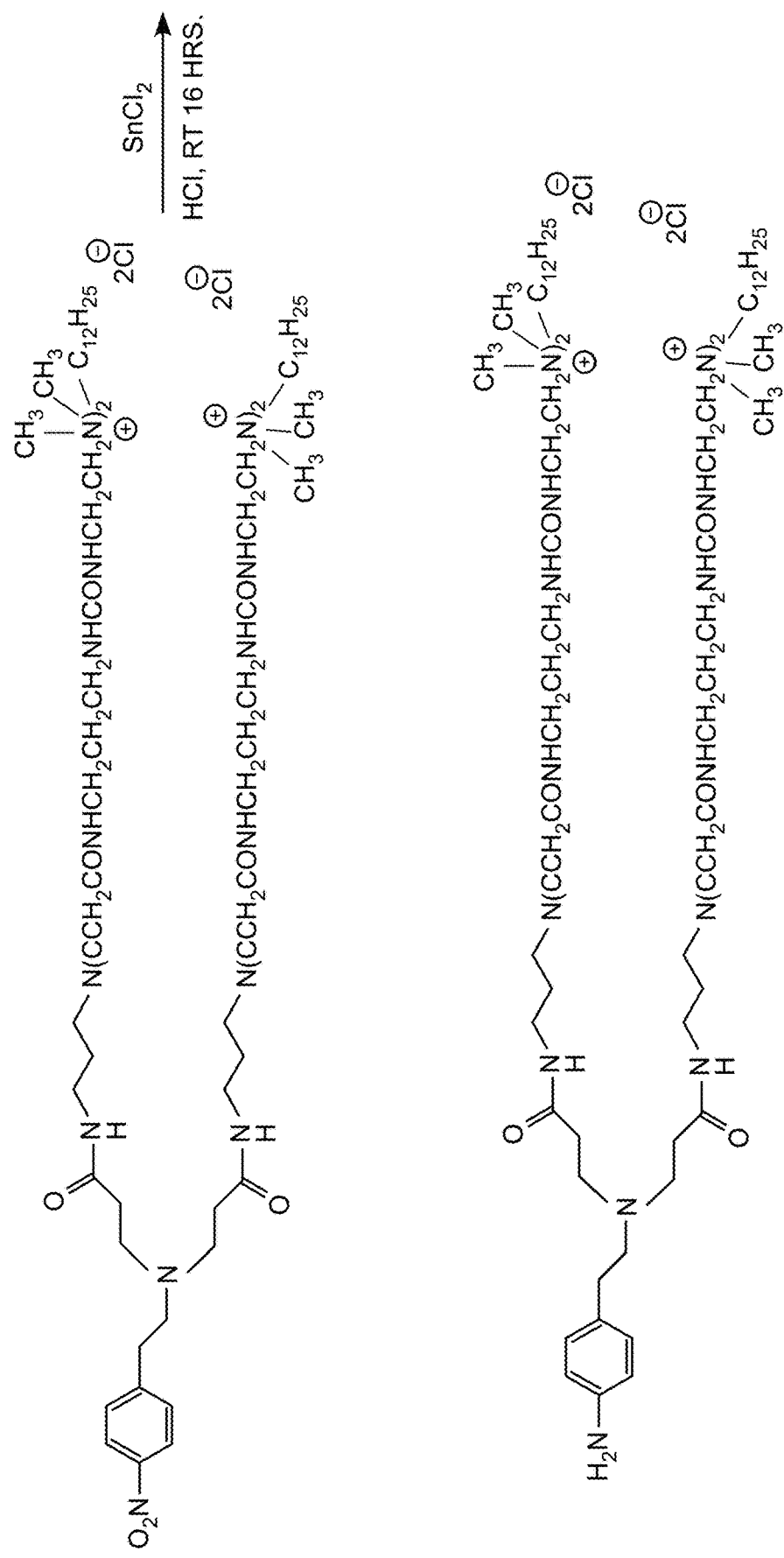
FIG. 8 is an example of a reduction of the nitro group (tetramer QAC)

(d1) Reduction of the Nitro Group (FIG. 8)

A 250 mL round bottom flask was charged with 0.8 grams (0.36 mmoles) of the nitro QAC-tetramer intermediate, 50 mL MeOH, 10 mL H$_2$O, 380 µL 12 M HCl (12 mole equivalents), and 0.5 grams of SnCl$_2$ 2H$_2$O (6 mole equivalents). The reaction was allowed to stir for 16 hours at room temperature. The solution was then roto-evaporated to ~10 mL. 50 mL of DCM was added and the entire solution was transferred to a separation funnel. The reduced tetramer intermediate was phase transferred to the DCM layer. The aqueous layer was removed and the organic layer was treated with sodium carbonate to free up the base (—NH$_3^+$→—NH$_2$). Concentration under reduced pressure afforded the target compound which was used in the next step without further purification.

Figure 9:
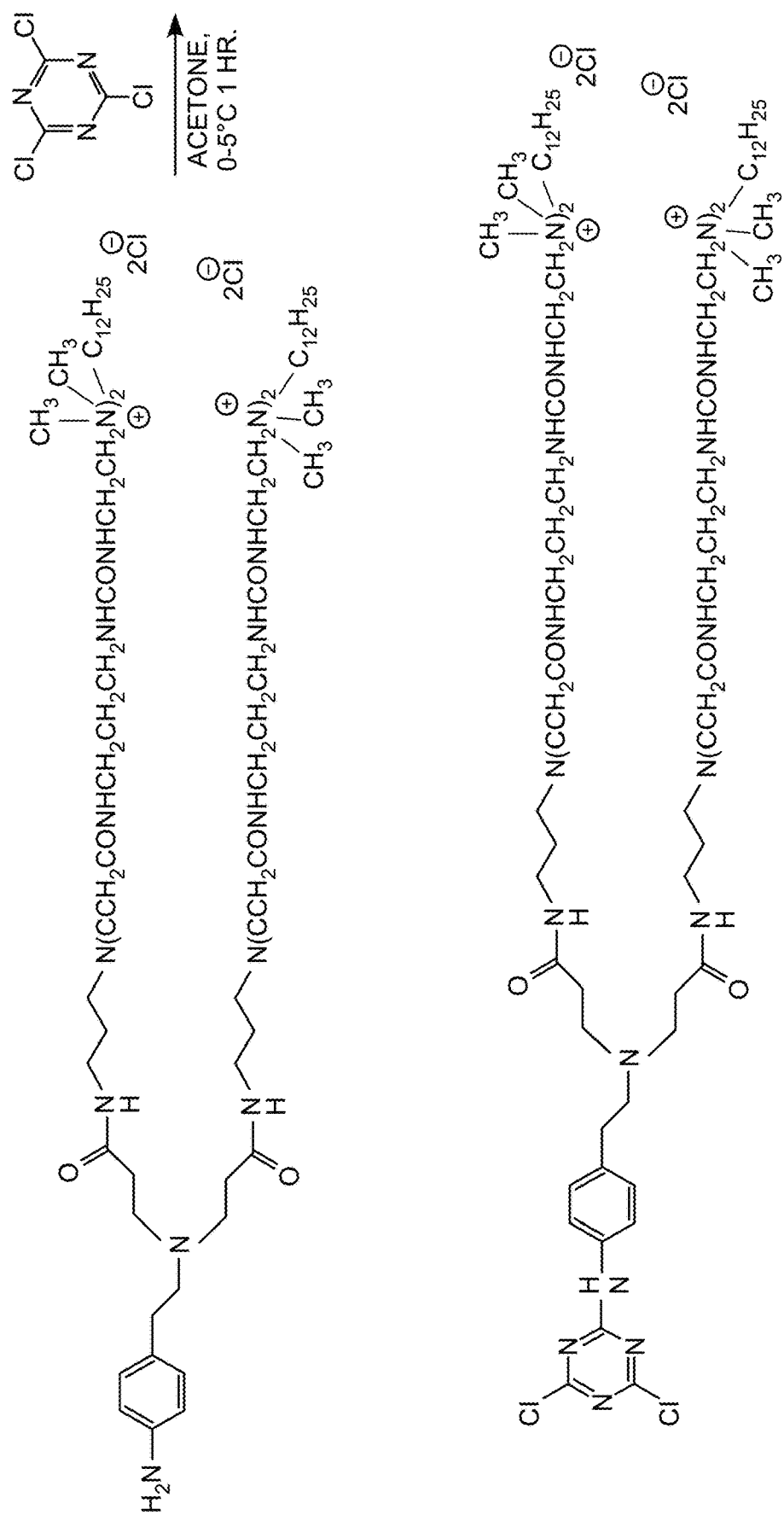
FIG. 9 is an example of introduction of the dichlorotriazine-DCT linker.

(d2) Introduction of the Dichlorotriazine—DCT Linker (FIG. 9)

A 100 mL round bottom flask was charged with 0.36 mmoles of the amine QAC-tetramer intermediate (FIG. 8) and 50 mL of deionized water before being placed in an ice bath. The pH of was then reduced to ~5 using HC. In a separate vial, 0.56 mmoles (0.11 grams) of cyanuric chloride was dissolved in 5 mL of acetone before being chilled to 0-5° C. The cyanuric chloride solution was then added to the amine QAC-tetramer intermediate while stirring in the ice bath. After an hour of stirring the reaction was stopped and the product was crushed out of solution using an excess of acetone. The solution was poured off and the product was stored in dry acetone in the freezer.

Structural Confirmation of the Nitro Group Reduction and Subsequent DCT Introduction A small amount of the finished QAC tetramer shown in FIG. 9 was dissolved in t-BuOH and allowed to react at 70° C. for 2 hours while stirring (FIG. 10):

The solvent was removed via roto-evaporation and the $^1$H-NMR analysis confirmed the reaction and the structures of the starting material and of the amino precursor.

Synthesis of QAC-Tetramers with Various QAC-Head Groups

Figure 11:
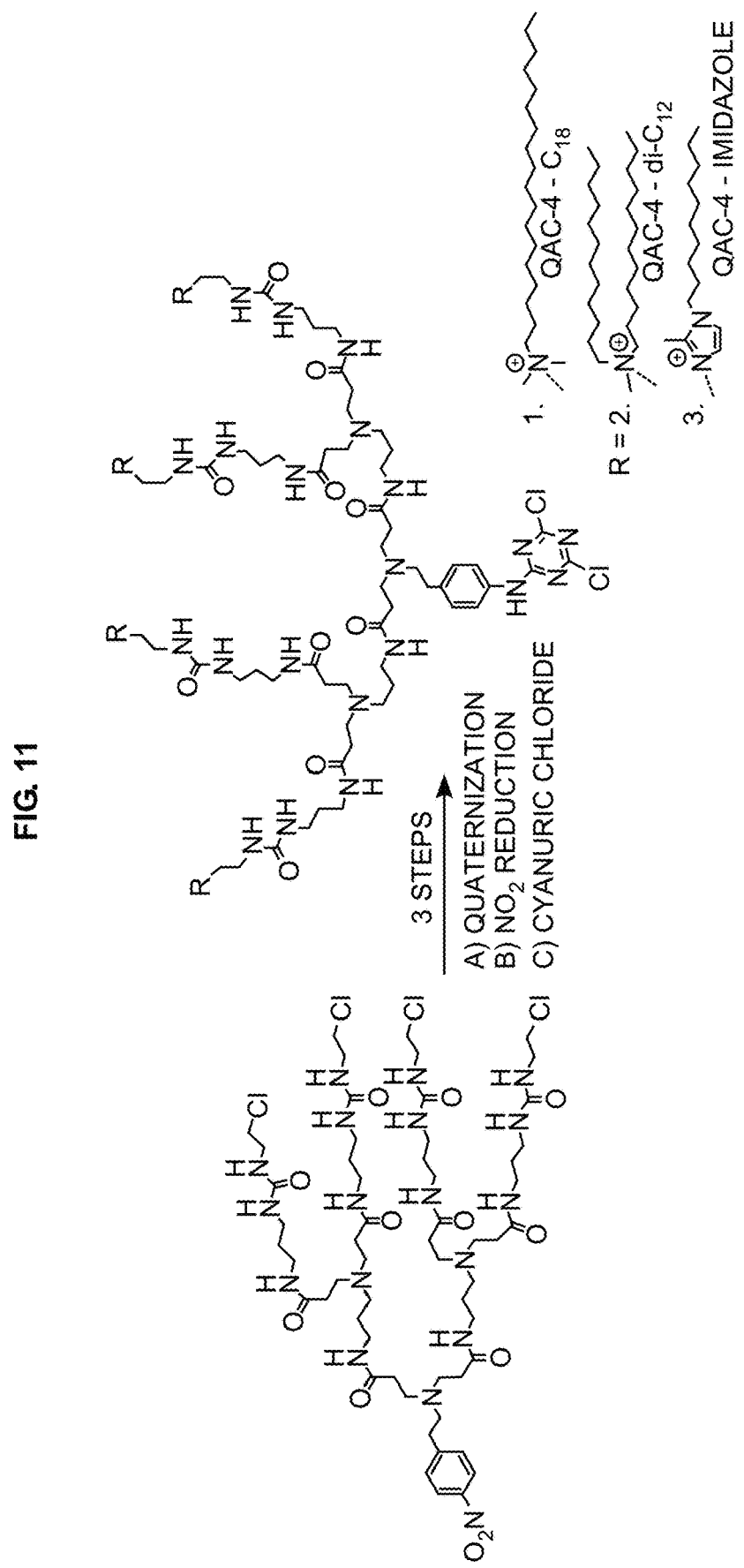
FIG. 11 is an example of the structure of novel QAC-tetramers.

In order to develop a structure activity relationship (SAR) between the QAC groups and the antimicrobial efficacy, three more constructs were synthesized in addition to the compound described in FIG. 9. The structures of these compounds which were synthesized from the common tetrachlorointermediate are shown in FIG. 11.

The steps involved in the synthesis of these compounds along with the corresponding experimental procedures are presented below:

(a) Synthesis of the C$_{18}$ Tetramer Compounds

Figure 12:
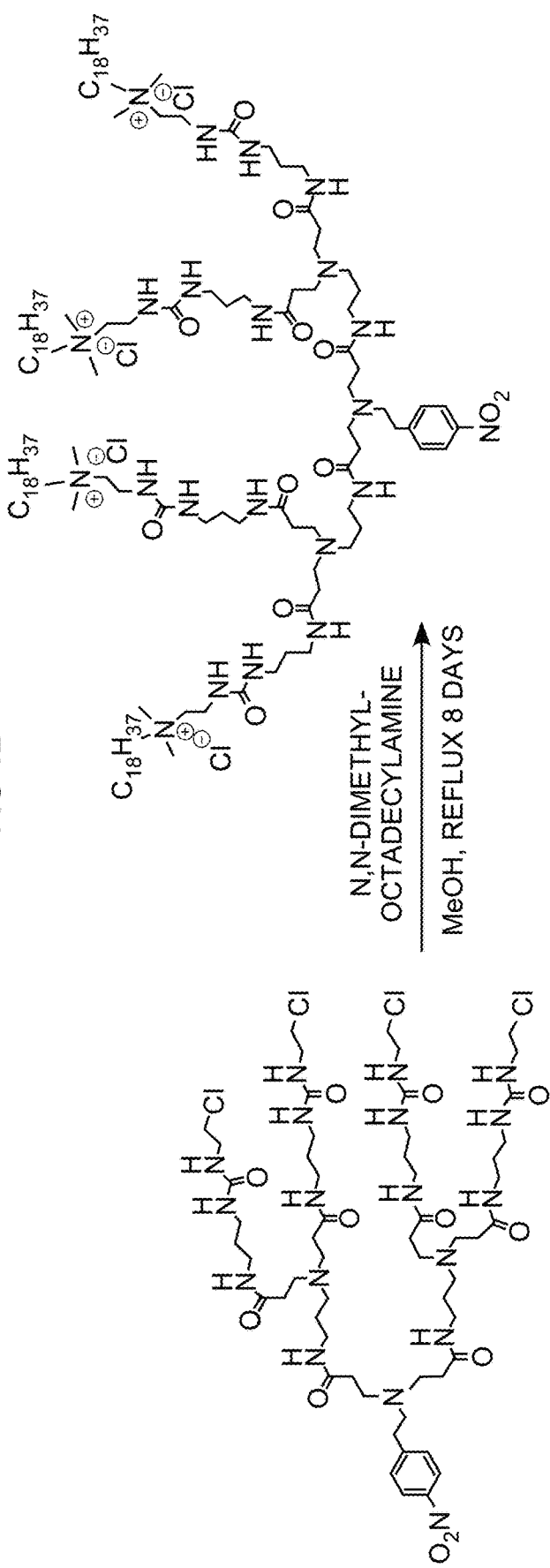
FIG. 12 is an example of N,N-dimethyloctadecyl amine quaternization.

Step 1: N,N-dimethyloctadecyl Amine Quarternization (FIG. 12)

The isocyanate terminated tetra-dendrimer intermediate (7 grams) and N,N-dimethyloctadecylamine (15.3 grams) were dissolved in MeOH (180 mL) in a 500 mL round bottom flask. The flask was equipped with a glycol chilled condenser and placed in a 70° C. oil bath where the reaction was allowed to reflux for 8 days. Purification by crystallization from ethyl ether two times afforded pure product.

Figure 13:
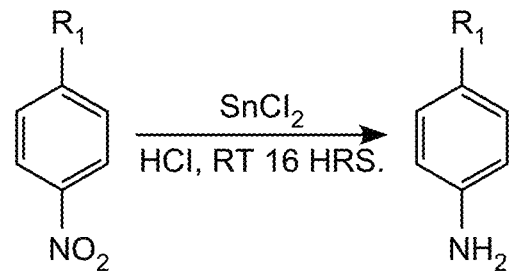
FIG. 13 is an example of a reduction of the nitro group ($C_{18}$-tetramer)
Figure 13:
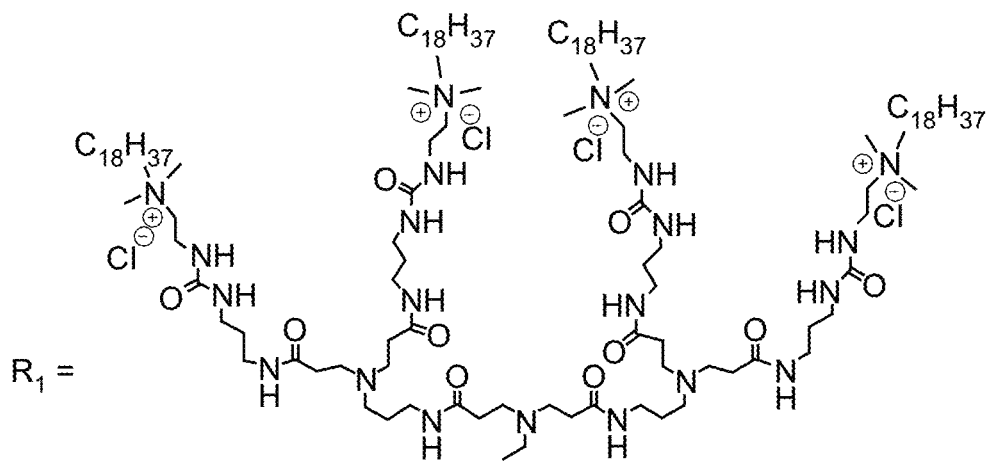

Step 2: Reduction of the Nitro Group (FIG. 13)

A 500 mL round bottom flask was charged with the nitro $C_{18}$-QAC-tetramer intermediate (8.56 grams), MeOH (250 mL), $H_2O$ (20 mL), 12 M HCl (3.4 mL, 12 mole equivalents), and $SnCl_2$ $2H_2O$ (4.6 grams, 6 mole equivalents). The reaction was allowed to stir for 16 hours at room temperature. The solution was then roto-evaporated to ~20 mL total volume. 50 mL of DCM was added and the entire solution was transferred to a separation funnel. The reduced tetramer intermediate was phase transferred into the DCM layer. The aqueous layer was removed and the organic layer was treated with sodium carbonate to free up the base ($—NH_3^+ \rightarrow —NH_2$). The product (8 grams) was then isolated via rotary evaporation.

Figure 14:
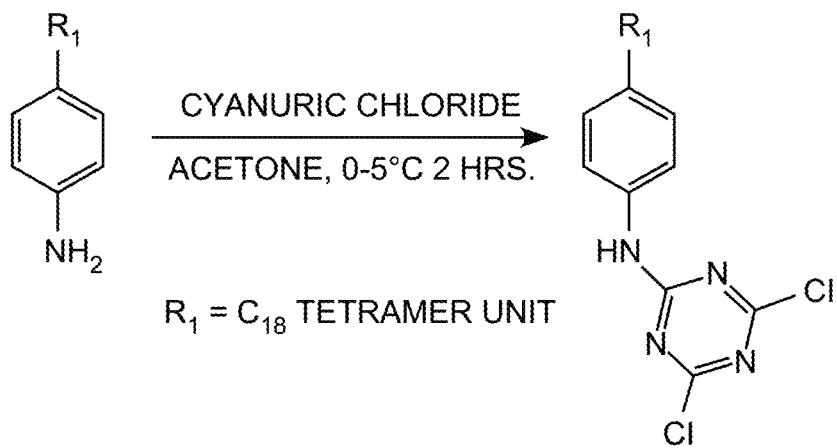
FIG. 14 is an example of an introduction of the DCT linker ($C_{18}$-tetramer)

Step 3: Introduction of the DCT Linker (FIG. 14)

A 250 mL round bottom flask was charged with the amine $C_{18}$-QAC-tetramer intermediate (8 grams) and deionized water (100 mL) before being placed in an ice bath. The pH was then adjusted to 5 using HCl. In a separate vial, cyanuric chloride (0.88 grams) was dissolved in acetone (5 mL) before being chilled to 0-5° C. The cyanuric chloride solution was then added to the amine $C_{18}$-QAC-tetramer intermediate while stirring in the ice bath. After 2 hours of stirring the reaction was stopped and the product was crashed out of solution using an excess of acetone. The solution was poured off, dried, weighed (3.387 grams), and then the product was dissolved in acidic water (pH=3) and placed in a freezer for storage.

Figure 15:
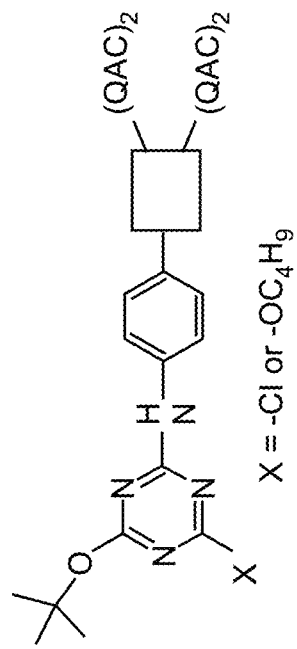
FIG. 15 is an example of confirmation of nitro reduction and DCT introduction ($C_{18}$ tetramer)
Figure 15:
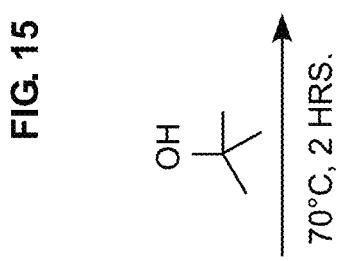
Figure 15:
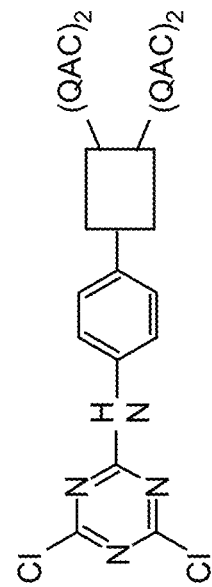

Step 4: Confirmation of Nitro Reduction and DCT Introduction (FIG. 15)

A small amount of the finished $C_{18}$-QAC-tetramer was dissolved in t-BuOH and allowed to heat to 70° C. for 2 hours while stirring. After 2 hours the remaining t-BuOH was removed via roto-evaporation. $^1$H-NMR analysis indicated reaction completion.

Figure 16:
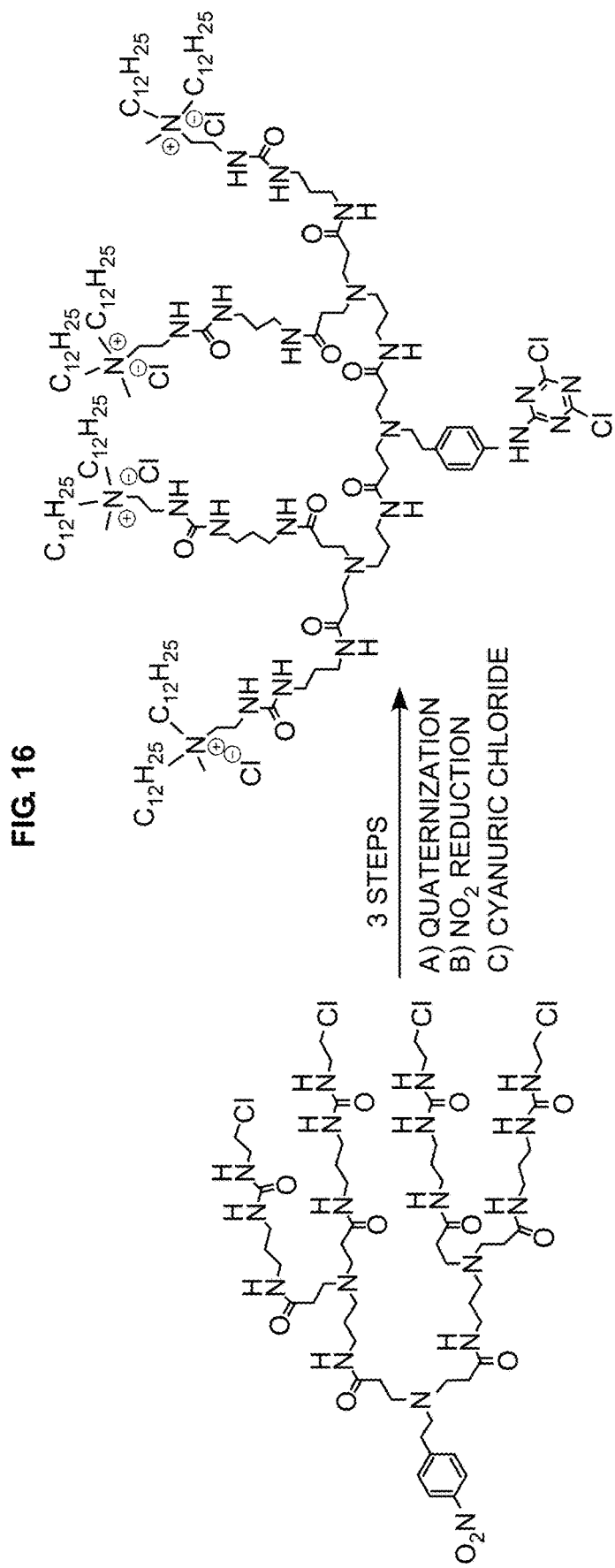
FIG. 16 is an example of synthesis of $(C_{12})_2$ tetramer.

(b) Synthesis of $(C_{12})_2$ Tetramer (FIG. 16)

Figure 17:
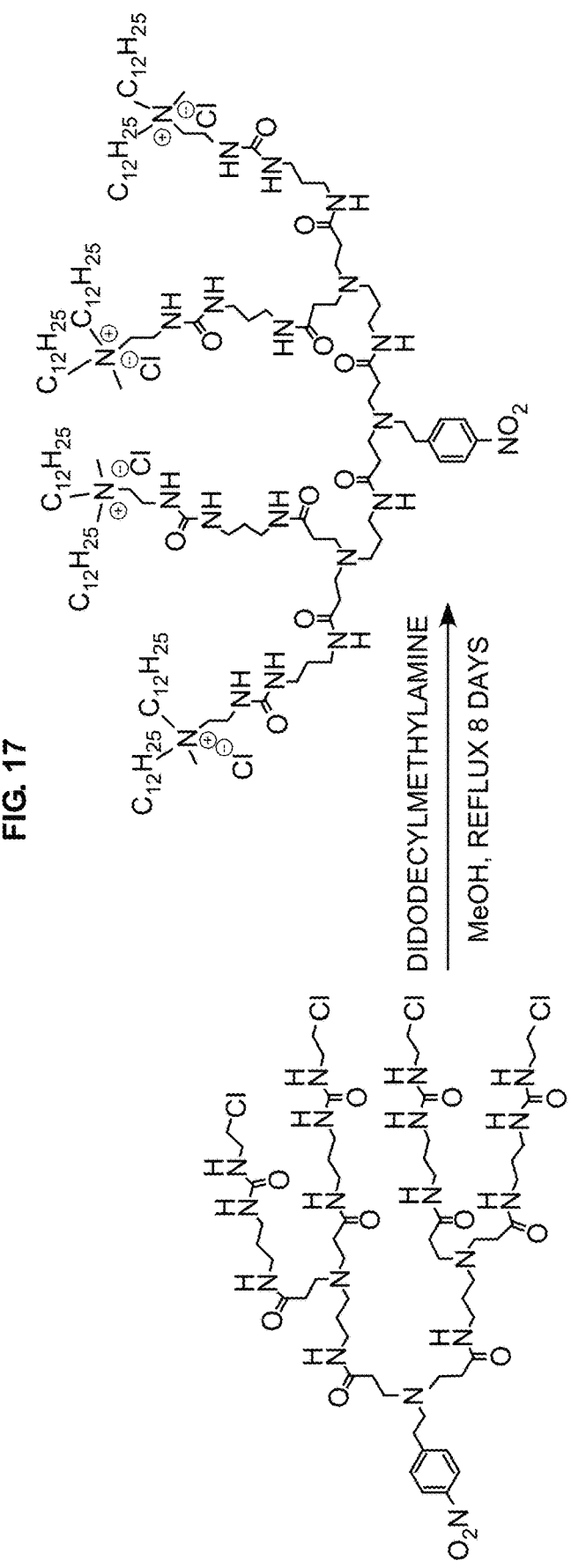
FIG. 17 is an example of quaternization with didocecylmethylamine.

Step 1: Quaternization with Didodecylmethylamine (FIG. 17)

The isocyanate terminated tetra-dendrimer intermediate (7 grams) and Didodecylmethylamine (24 grams) were dissolved in MeOH (180 mL) in a 500 mL round bottom flask. The flask was equipped with a glycol chilled condenser and placed in a 70° C.-oil bath where the reaction was allowed to reflux for 8 days. The product was purified by crystallization in ethyl acetate/acetone two times.

Figure 18:
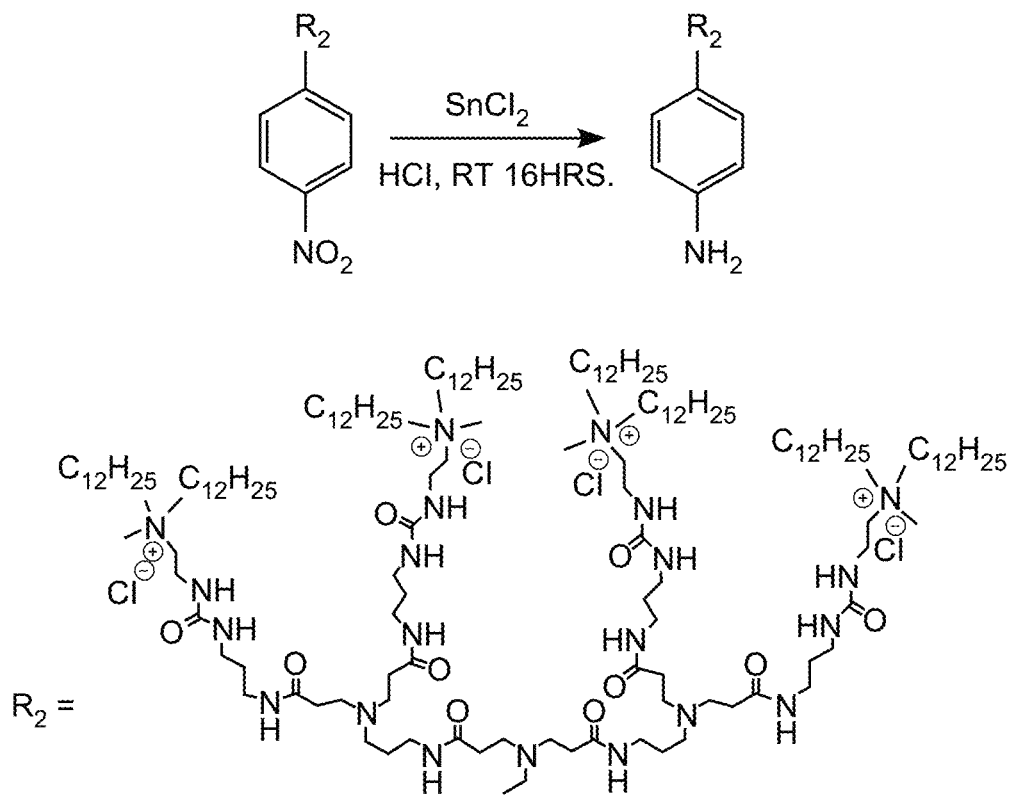
FIG. 18 is an example of reduction of the nitro group $(C_{12})_2$ tetramer.

Step 2: Reduction of the Nitro Group —$(C_{12})_2$ Tetramer (FIG. 18)

500 mL round bottom flask was charged with the nitro $(C_{12})_2$-QAC-tetramer intermediate (4.87 grams), MeOH (250 mL), $H_2O$ (20 mL), 12 M HCl (1.7 mL, 12 mole equivalents), and $SnCl_2$ $2H_2O$ (2.33 grams, 6 mole equivalents). The reaction was allowed to stir for 16 hours at room temperature. The solution was then roto-evaporated to ~20 mL total volume. 50 mL of DCM was added and the entire solution was transferred to a separation funnel. The reduced tetramer intermediate was phase transferred into the DCM layer. The aqueous layer was removed and the organic layer was treated with sodium carbonate to free up the base ($—NH_3^+—NH_2$). The product (4.8 grams) was then isolated via rotary evaporation.

Figure 19:
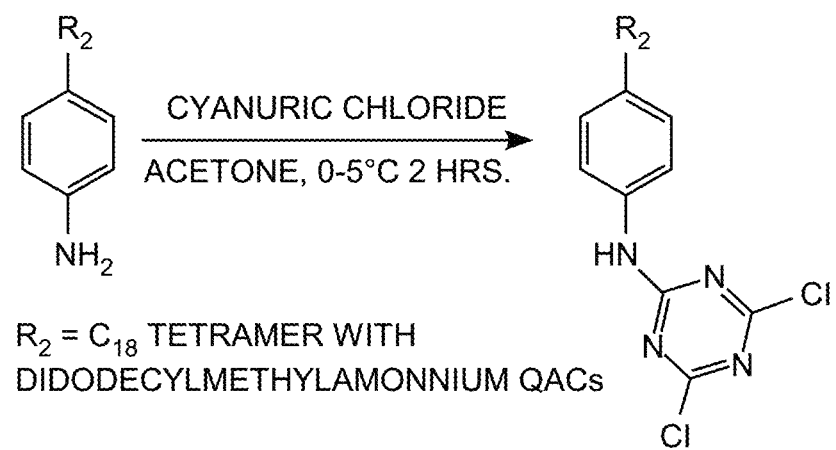
FIG. 19 is an example of introduction of the DCT Linker—$(C_{12})_2$ tetramer.

Step 3: Introduction of the DCT Linker —$(C_{12})_2$ Tetramer (FIG. 19)

A 250 mL round bottom flask was charged with the amine $(C_{12})_2$-QAC-tetramer intermediate (4.8 grams) and deionized water (100 mL) before being placed in an ice bath. The pH was then adjusted to 5 using HCl. In a separate vial, cyanuric chloride (0.48 grams) was dissolved in acetone (5 mL) before being chilled to 0-5° C. The cyanuric chloride solution was then added to the amine $(C_{12})_2$-QAC-tetramer intermediate while stirring in the ice bath. After 2 hours of stirring the reaction was stopped and the product was crashed out of solution using an excess of acetone. The solution was poured off, dried, weighed (1.27 grams), and then the product was dissolved in acidic water (pH=3) and placed in a freezer for storage.

Figure 20:
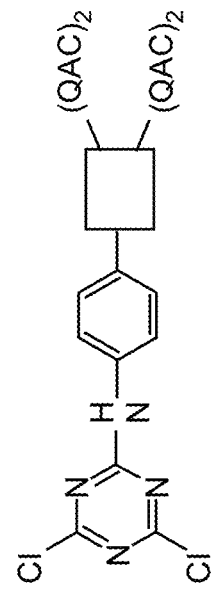
FIG. 20 is an example of confirmation of nitro reduction and DCT introduction—$(C_{12})_2$ tetramer.
Figure 20:
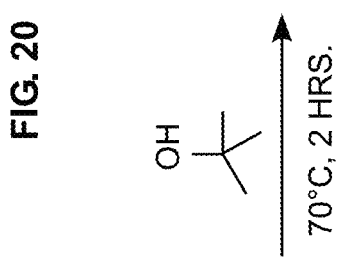
Figure 20:
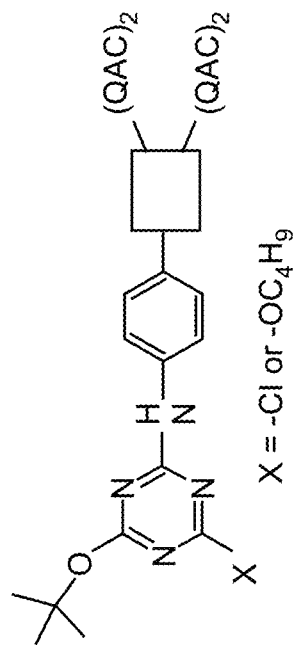

Step 4: Confirmation of Nitro Reduction and Cyanuric Chloride Addition (FIG. 20)

A small amount of the finished $(C_{12})_2$-QAC-tetramer was dissolved in t-BuOH and allowed to heat to 70° C. for 2 hours while stirring. After 2 hours the remaining t-BuOH was removed via roto-evaporation. $^1$H-NMR analysis indicated reaction completion.

Figure 21:
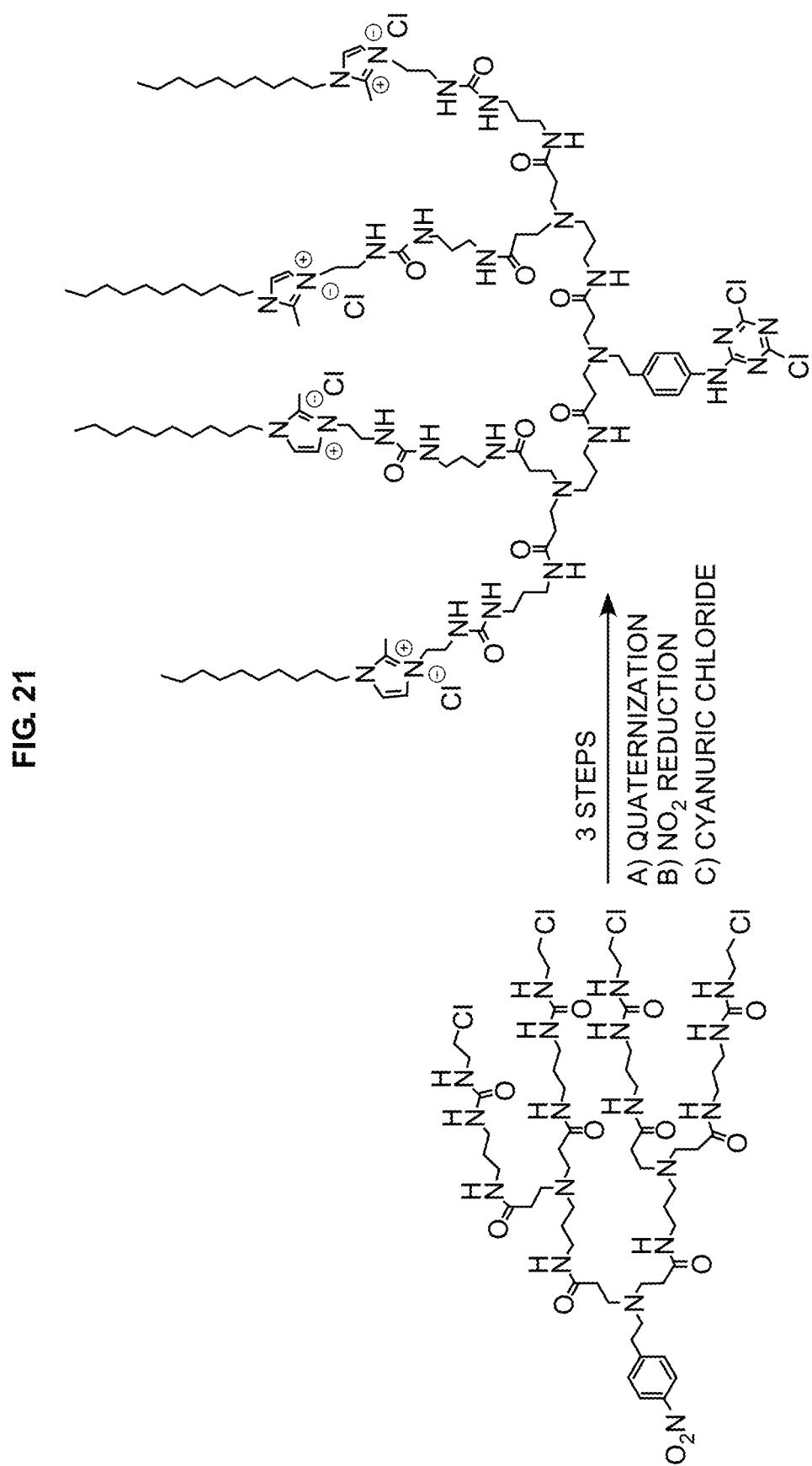
FIG. 21 is an example of synthesis of QAC-I tetramer.

(c) Synthesis of $C_{10}$ Imidazole Tetramer—QAC-I (FIG. 21)

Figure 22:
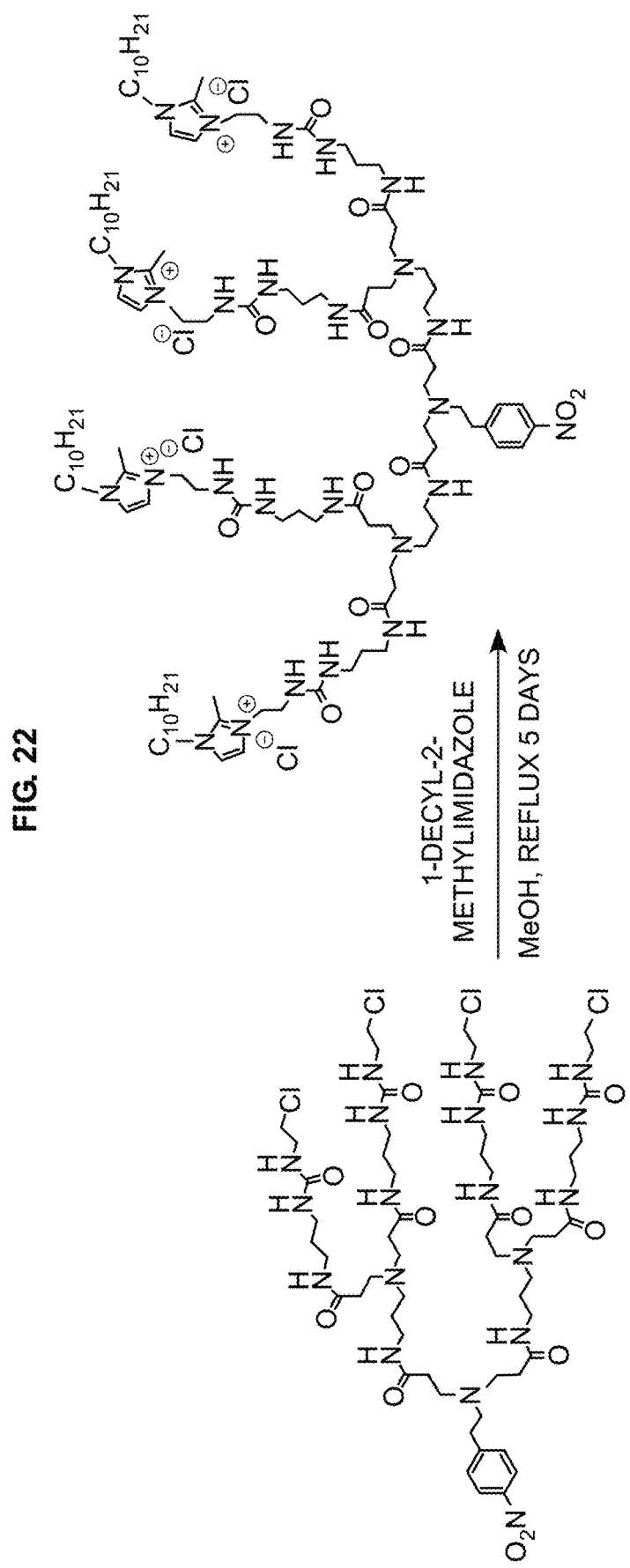
FIG. 22 is an example of quaternization with 1-decyl-2-methylimidazole.

Step 1: Quaternization with 1-decyl-2-methylindazole (FIG. 22)

The isocyanate terminated tetra-dendrimer intermediate (7 grams) and 1-Decyl-2-Methylimidazole (15 mL) were dissolved in MeOH (180 mL) in a 500 mL round bottom flask. The flask was equipped with a glycol chilled condenser and placed in a 70° C. oil bath where the reaction was allowed to reflux for 5 days. The product was purified by crystallization from ethyl acetate/acetone.

Figure 23:
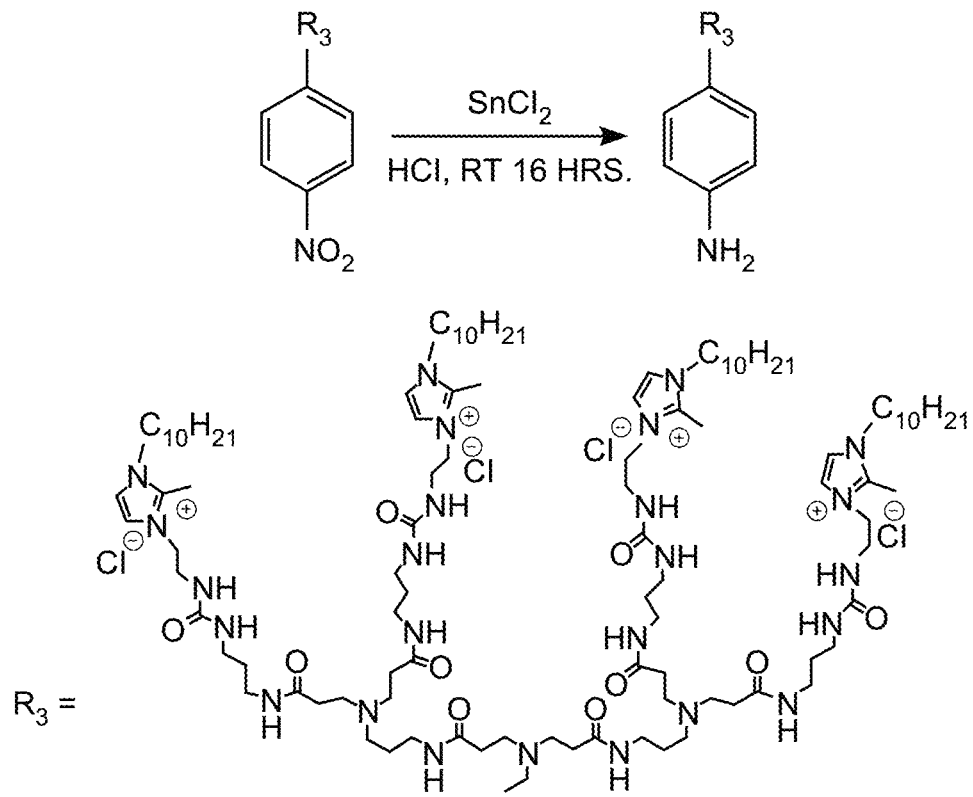
FIG. 23 is an example of a reduction of the nitro group (QAC-I tetramer)

Step 2: Reduction of the Nitro Group (FIG. 23)

A 500 mL round bottom flask was charged with the nitro imidazole QAC-tetramer (13.5 grams), MeOH (250 mL), $H_2O$ (20 mL), 12 M HCl (6 mL, 12 mole equivalents), and $SnCl_2$ $2H_2O$ (8.23 grams, 6 mole equivalents). The reaction was allowed to stir for 16 hours at room temperature. The solution was then roto-evaporated to ~20 mL total volume. 50 mL of DCM was added and the entire solution was transferred to a separation funnel. The reduced tetramer intermediate was phase transferred into the DCM layer. The aqueous layer was removed and the organic layer was treated with sodium carbonate to free up the base ($—NH_3^+ \rightarrow —NH_2$). The product (13.5 grams) was then isolated via rotary evaporation.

Figure 24:
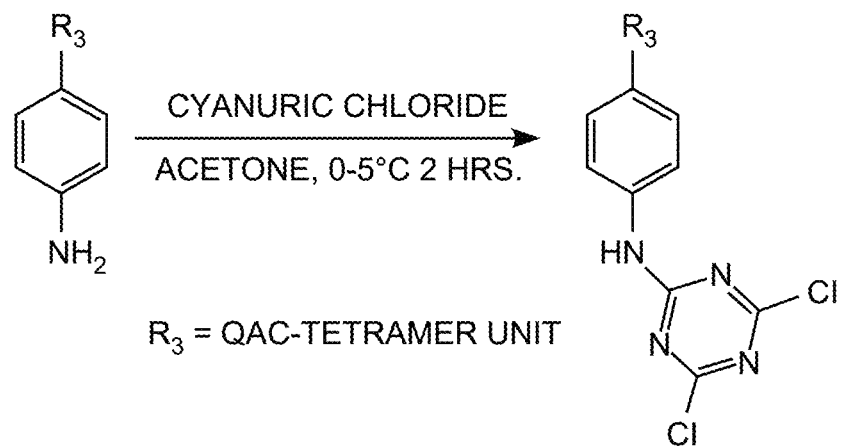
FIG. 24 is an example of introduction of the DCT linker (QAC-I tetramer)

Step 3: Introduction of the DCT Linker (QAC-I Tetramer) (FIG. 24)

A 250 mL round bottom flask was charged with the amine imidazole QAC-tetramer intermediate (13.5 grams) and deionized water (100 mL) before being placed in an ice bath. The pH was then adjusted to 5 using HCl. In a separate vial, cyanuric chloride (1.71 grams) was dissolved in acetone (5 mL) before being chilled to 0-5° C. The cyanuric chloride solution was then added to the amine imidazole QAC-tetramer intermediate while stirring in the ice bath. After 2 hours of stirring the reaction was stopped and the product was crashed out of solution using an excess of acetone. The solution was poured off, dried, weighed (5.28 grams), and then the product was dissolved in acidic water (pH=3) and placed in a freezer for storage.

Figure 25:
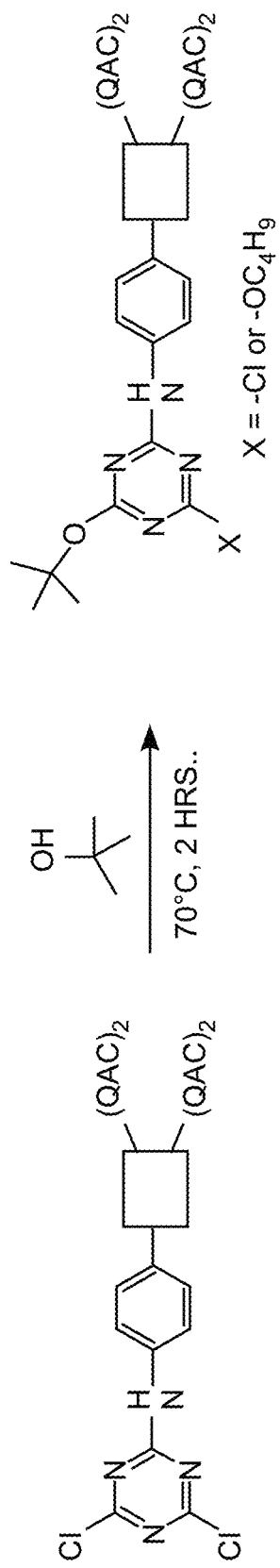
FIG. 25 is an example of confirmation of nitro reduction and DCT introduction (QAC-I tetramer)

Step 4: Confirmation of Nitro Reduction and DCT Introduction (QAC-I)(FIG. 25)

A small amount of the finished imidazole QAC-tetramer was dissolved in t-BuOH and allowed to heat to 70° C. for 2 hours while stirring. After 2 hours the remaining t-BuOH was removed via roto-evaporation. $^1$H-NMR analysis indicated reaction completion.

Scale Up of the QAC-I Tetramer Based on the combined synthetic accessibility and high antimicrobial efficacy (FIG. 22), the imidazolium (QAC-I) tetramer was selected as the lead compound for fabric derivatization and as such its scale up was undertaken. This section summarizes the optimization of these scale-up efforts.

(a) Scale Up and Purification of Tetrachlorointermediate

Figure 26:
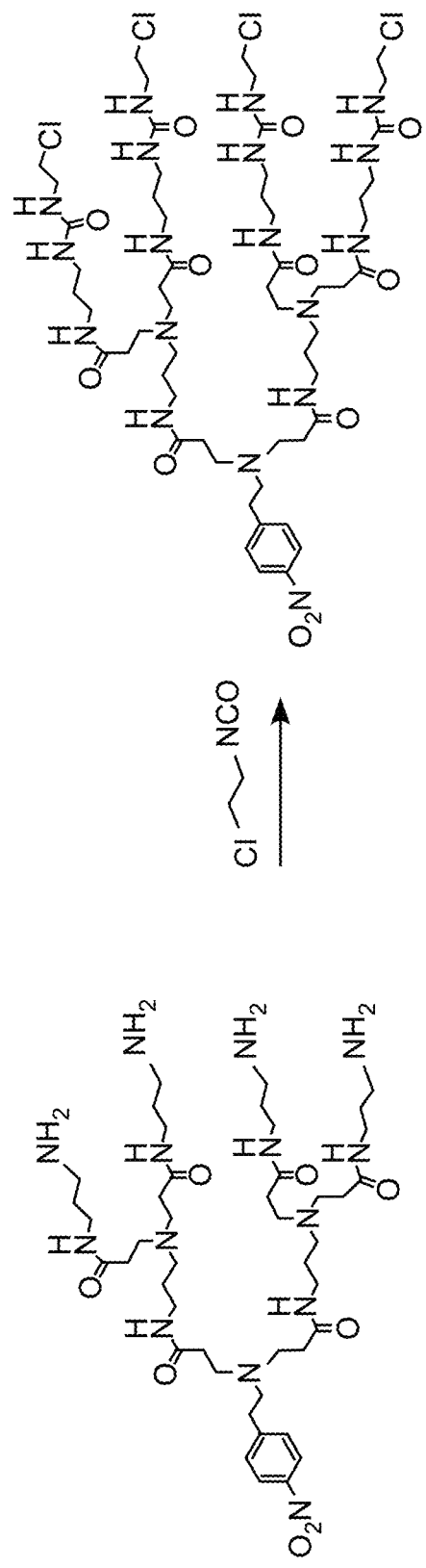
FIG. 26 is an example of synthesis of tetrachloro-intermediate.

The tetrachloro-intermediate was synthesized on ~80 grams scale using the procedure shown in FIG. 26.

The tetramer amino intermediate (61.6 grams, 65.88 mmol) was added to 300 mL of dichloromethane and 200 mL of tert-butyl alcohol and added to an addition funnel. 2-Chloroethylisocyanate (45 mL, 527 mmol) was dissolved in 30 mL of dichloromethane and 20 mL of tert-butyl alcohol in a 1000 mL round flask equipped with a stir bar. The 4-Mer amino intermediate solution was added dropwise to the isocyanate solution over 3 hours. After all of the 4-Mer amino intermediate was added, the flask was heated to 50° C. The addition funnel was then switched for a glycol-chilled condenser and the reaction was heated for 16 hours. Following completion of the reaction, excess solvent and 2-chloroethylisocyanate were removed in vacuo and triturated several times with acetone and heptane to yield an oily solid (84 grams, 61.9 mmol per flask). A procedure to purify this compound was developed. The procedure involves two cycles of dissolution of methanol and precipitation in acetone. The experimental details are presented below.

A sample of tetrachlorointermediate (1 gram) was dissolved in 1 mL of methanol and precipitated out with acetone (two cycles). $^1$H-NMR analysis indicated high purity.

The purification procedure was successfully scaled up to produce tens of grams of the purified tetrachloro-intermediate.

(b) Scale Up of QAC-Tetramer ($NH_2$ Form)

Figure 27:
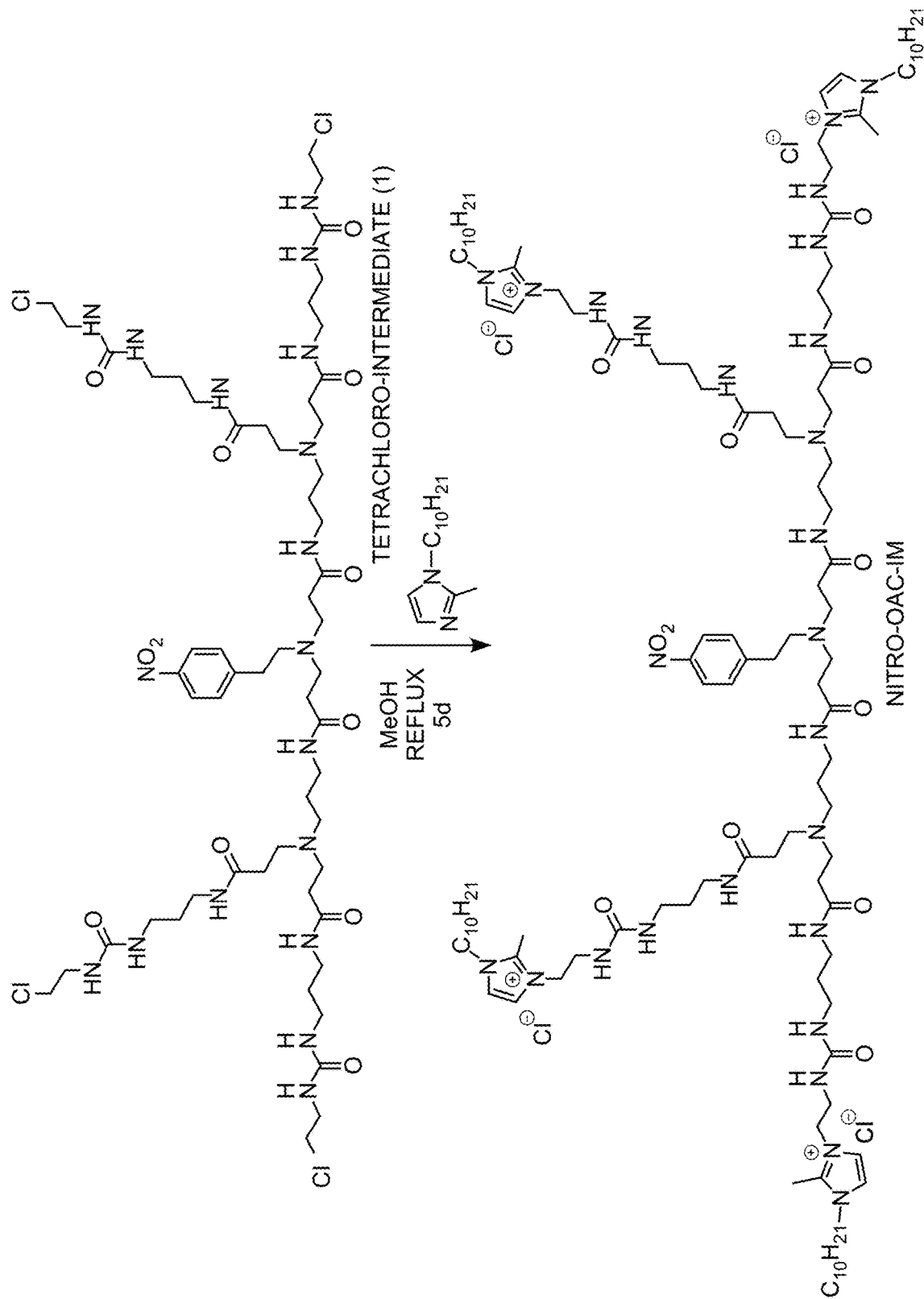
FIG. 27 is an example of quaternization of tetrachloro-intermediate (large scale)

The first step in the synthesis involved the production of the QAC-I tetramer in the nitro ($NO_2$) form by the quaternization of the tetrachloro-intermediate with 1-decyl-2-methyl-imidazole as shown in FIG. 27.

The experimental procedure is presented below.

A 500 mL round bottomed flask was charged with methanol (300 mL) and equipped with a magnetic stir bar. To the flask was then added tetrachlorointermediate (25.63 grams, 18.9 mmol), followed by 1-decyl-2-methylimidazole (42.0 grams, 190 mmol). The resultant was stirred until completely homogenized, fitted with an ethylene glycol-cooled condenser and heated under reflux for 5 days.

After 5 days of reaction time, the reaction mixture was cooled to ambient temperature and concentrated to approximately ¼ the original volume via rotary evaporation. The concentrated, slightly viscous, dark red solution was then slowly run into a vigorously stirred solution of acetone/ethyl acetate (1:1, 600 mL). A waxy precipitate formed from the solution, and the supernatant was decanted off. The waxy semi-solid residue was dissolved in minimal methanol, transferred to a round bottomed flask, and concentrated to near-dryness in vacuo. A small amount of methylene chloride (ca. 25 ml) was then added to the flask, and the solution was concentrated again to near-dryness. The methanol-DCM solvent exchange was repeated one more time, and the resultant was dried under high-vacuum after rotary evaporation, yielding a glassy, red solid (33.4 grams, 79%) which readily absorbed moisture from the air. A small sample of the obtained product was dissolved in deuterated dimethyl sulfoxide and placed briefly under high-vacuum to remove trace solvent. $^1$H-NMR analysis indicated reaction completion.

Figure 28:
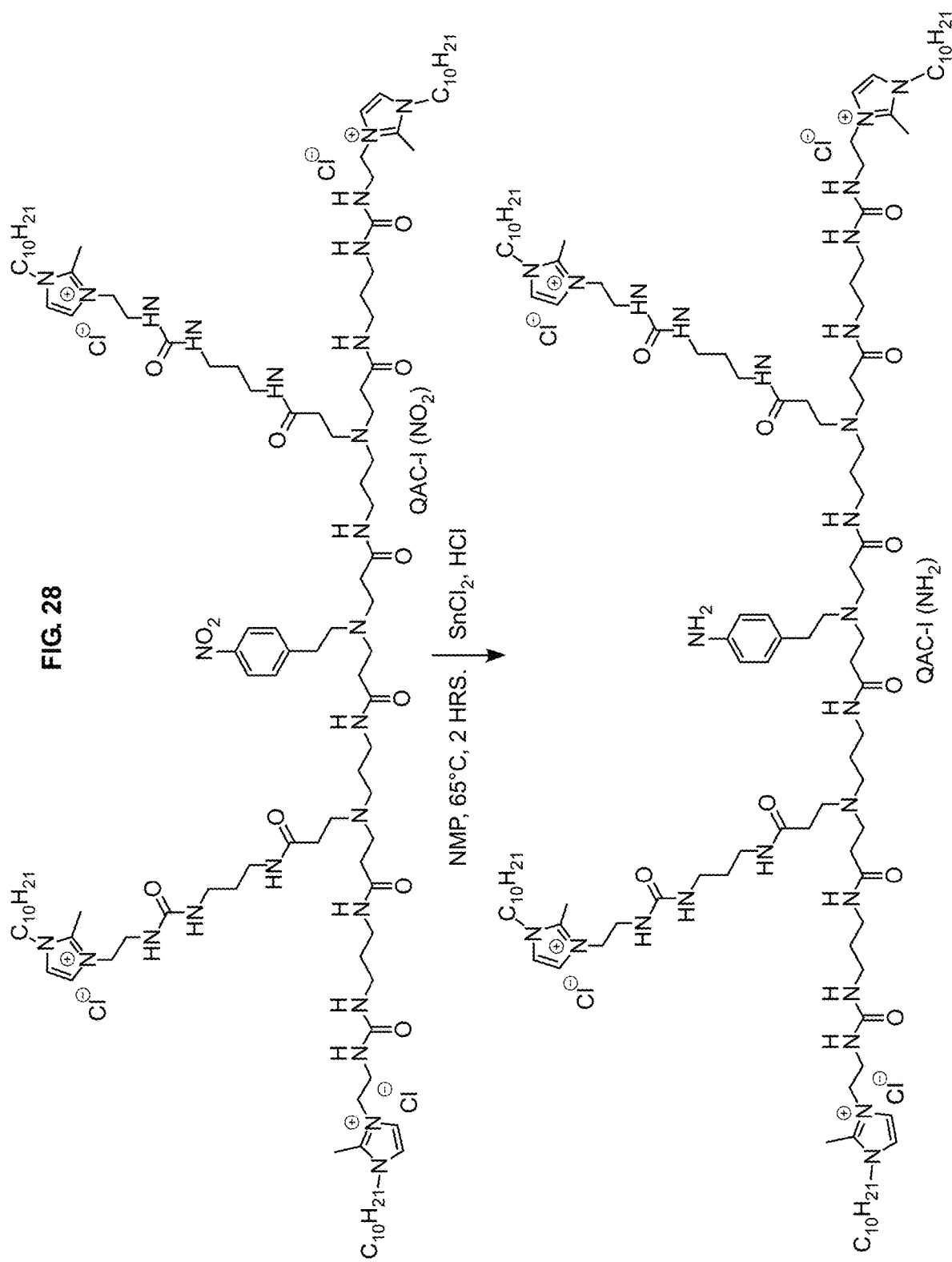
FIG. 28 is an example of a reduction of the QAC-I ($NO_2$ form)

In the second step of the synthesis, the $NO_2$ group was reduced with tin (II) chloride using $SnCl_2$ as the reducing agent (FIG. 28).

The reaction provides quantitative conversion with only solvent contamination in the final product. The experimental details are presented below.

A round bottomed flask was charged with Nitro-QAC-IM (5.0 grams, 2.23 mmol) and N-methylpyrrolidone (15 mL). The resultant was stirred magnetically until completely homogenized. Tin(II) chloride (2.10 grams, 11.1 mmol) was then added, followed by 37% hydrochloric acid (1.85 mL). The resultant was heated to 65° C. and left to proceed for two hours. After this time, the reaction mixture was removed from heat and allowed to cool to ambient temperature. The reaction mixture was then slowly run into stirring ice-cold acetone (150 mL). An orange-yellow precipitate formed that congealed into a gum-like ball. The supernatant was decanted and discarded, and the precipitate was rinsed with acetone. The precipitate was then dissolved in a minimal amount of methylene chloride, and precipitated once again into acetone as described previously. The collected solid was then dried thoroughly in vacuo, resulting in an orange, hygroscopic powder (4.4 g, 89%) $^1$H-NMR analysis indicated reaction completion.

Synthesis of the $3^{rd}$ Generation Dendrimer Compounds and Intermediates (Octamers)

Figure 29:
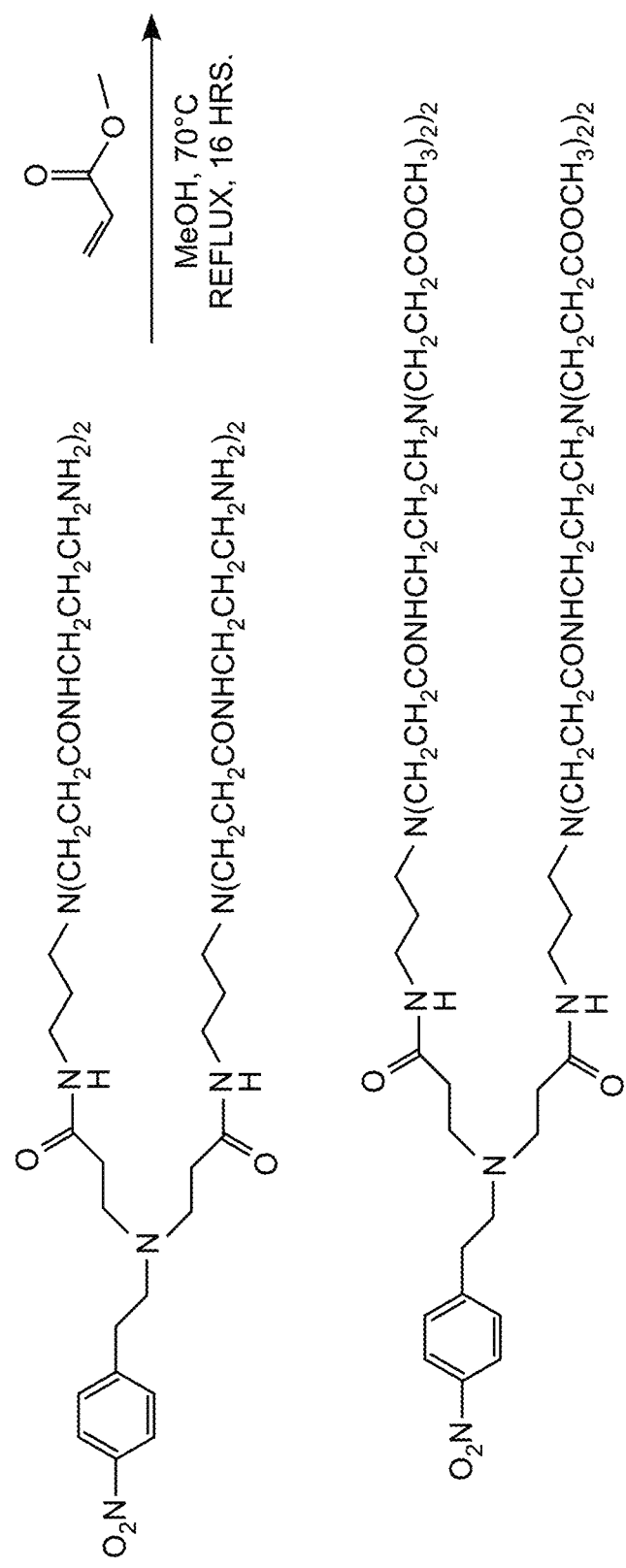
FIG. 29 is an example of synthesis of the octaester intermediate.

The first step in the synthesis of the $3^{rd}$ generation dendrimers involved the production of an octa-ester intermediate from the tetramer intermediate containing four amino groups by treatment with methyl acrylate (FIG. 29).

Figure 30:
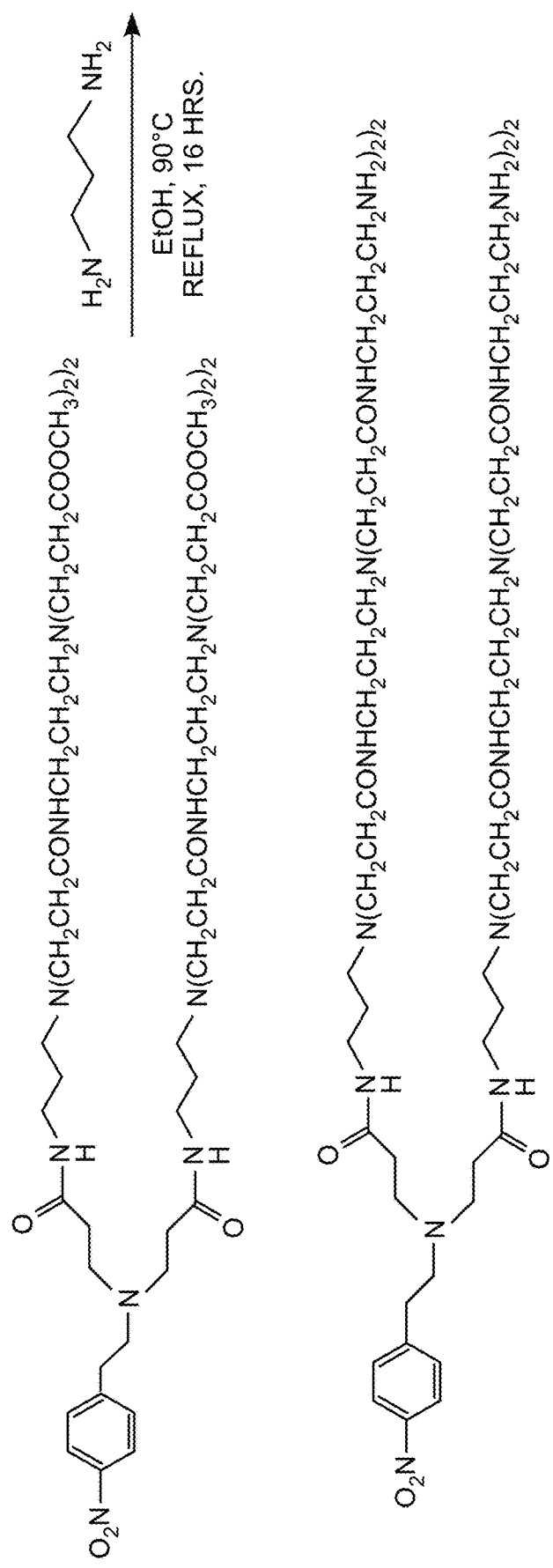
FIG. 30 is an example of synthesis of the octaamino intermediate.

The second generation branched dendrimer containing four amino groups (~54 mmol) was added to 100 mL of methanol in a round bottom flask equipped with a stir bar. Methyl acrylate (864 mmol, 77.5 mL) was then added to the flask and the flask was equipped with a glycol-chilled condenser. The mixture was allowed to reflux for 16 hours while stirring. The solvent and remaining methyl acrylate were removed in vacuo over a period of 6 hours. In the second step, the octaester intermediate was reacted with 1,3-diaminopropane to afford an octaamino intermediate (FIG. 30).

The octaester intermediate (~54 mmol) was added to a 250 mL round bottom flask in addition to ethanol (50 mL) and 1,3-Diaminopropane (864 mmol, 72 mL). The flask was then equipped with a stir bar and a glycol chilled condenser. The mixture was allowed to reflux for 16 hours while stirring. Once the reaction was finished, the solvent and remaining 1,3-diaminopropane were removed using vacuum distillation over 3 days ($^1$H-NMR analysis indicated good purity).

Figure 31:
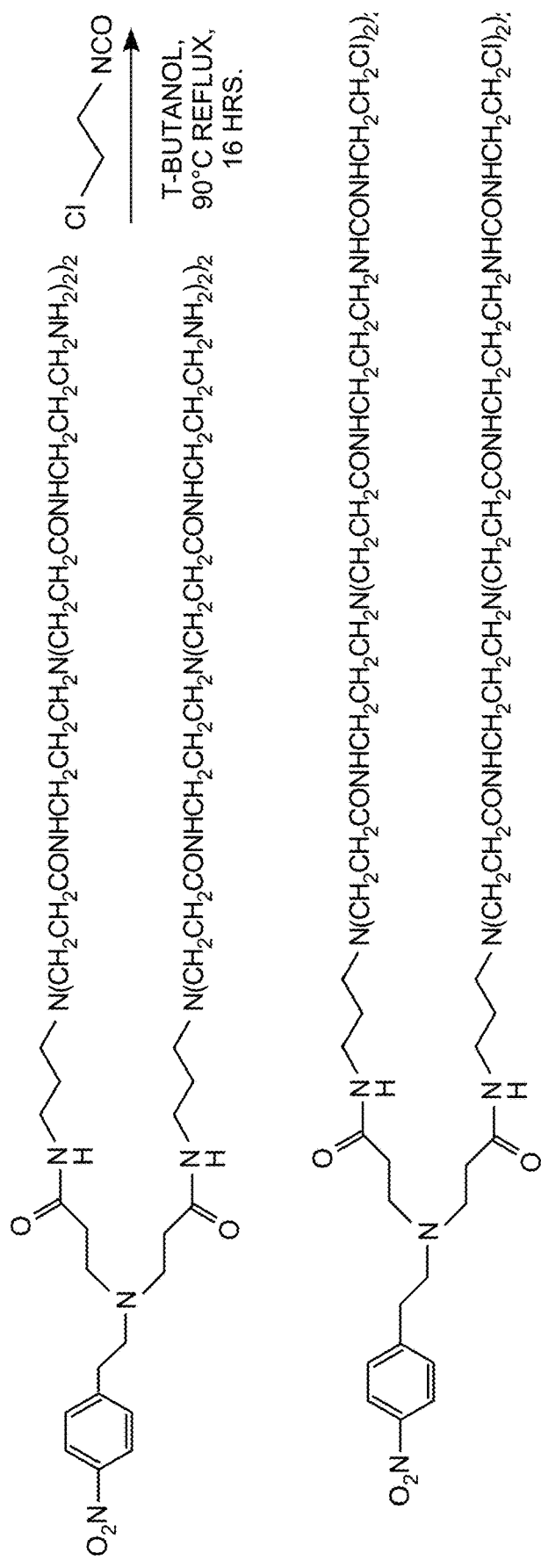
FIG. 31 is an example of synthesis of octachloro intermediate.

In the third step, the octaamino intermediate was reacted with 2-chloroethyl isocyanate to afford the octachloro compound shown in FIG. 31.

In a typical experimental procedures, a 250 mL round bottom flask was charged with the third generation branched dendrimer capped with 1,3-diaminopropane (12.75 mmol, ~25 grams) followed by tert-butanol (39 grams) and 2-Chloroethyl isocyanate (18 mL). The flask was equipped with a stir bar and a glycol-chilled condenser. The reaction was allowed to proceed under reflux conditions for 16 hours while stirring.

Synthesis of the 4th Generation Dendrimer Compounds and Intermediates (Hexadecamers)

Figure 32:
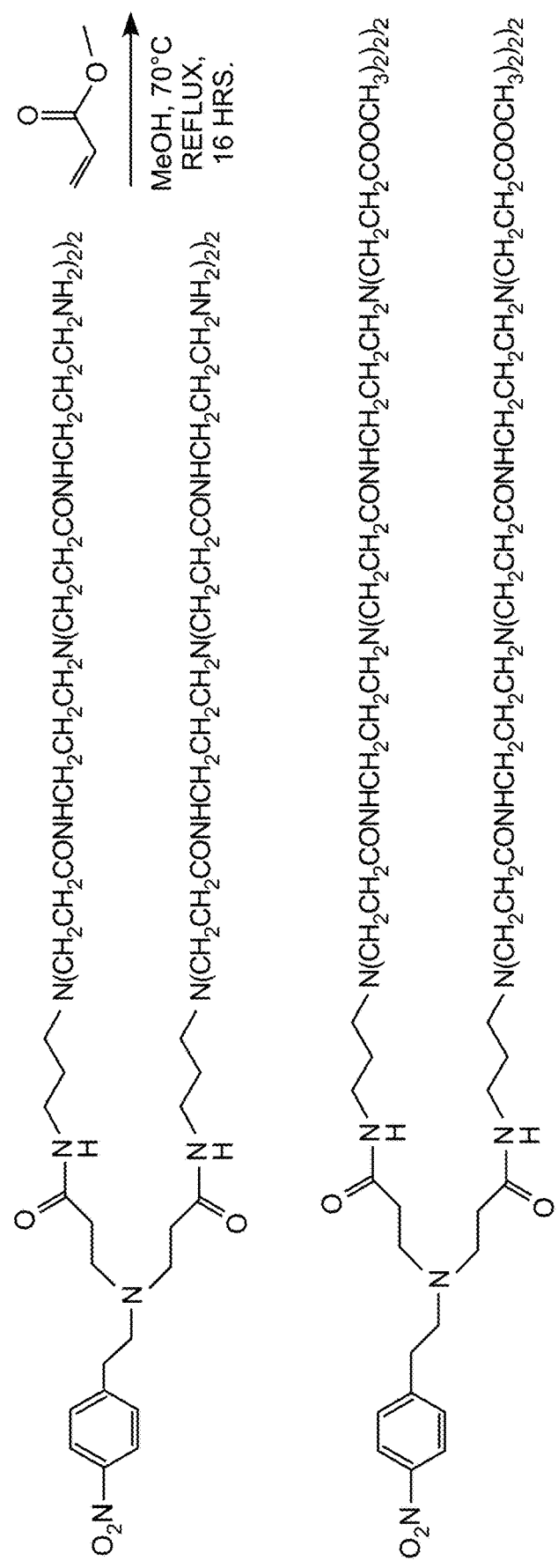
FIG. 32 is an example of synthesis of the hexadecaester intermediate.

The first step of this synthetic sequence involved the production of the hexadecaester intermediate as shown in FIG. 32.

In a typical experimental procedure, a 250 ml round bottom flask was charged with the previously produced, third generation branched dendrimer containing eight amino groups (12.75 mmol, ~25 grams) followed by ethanol (50 mL) and methyl acrylate (408 mmol, 37 mL). The flask was equipped with a stir bar and a glycol-chilled condenser. The reaction was allowed to proceed under reflux conditions for 16 hours while stirring. Following completion of the reaction, excess solvent and methyl acrylate were removed in vacuo over 6 hours. $^1$H-NMR spectrum indicated the formation of the target product as a major component of the reaction mixture.

B. Fabric Derivatizations (Functionalizations) with QAC-Dendrimers—Examples

Two distinct fabric derivatization protocols were developed: (1) direct functionalization where the fiber was reacted with the dichlorotriazine form of the dendrimer and (2) reverse functionalization where the fabric was first activated with cyanuric chloride and then reacted with the amino form of the dendrimer. The two methodologies are illustrated for the cotton fabric in FIG. 33.

The direct functionalization methodology (red) uses a one-step protocol in aqueous solution, but suffers from the competing hydrolysis of the DCT linker which results in a significant non-covalent attachment of the dendrimer to the fabric. The reverse functionalization methodology (blue) uses a two-step protocol in N-methylpyrolidone (NMP) which circumvents the DCT hydrolytic issue and allows the bath to be re-used. The experimental procedures associated with the two methodologies are presented below.

Direct Functionalization Methodology

The fabrics are first desized by treatment with sodium carbonate. In a typical experimental procedure, a 1 L beaker was charged with deionized water (900 mL) and sodium carbonate (100 grams, 0.943 mol) and equipped with an overhead stirrer. To the desizing bath was then added 100 cotton swatches cut into 5 cm diameter circles. The mixture was heated to 60 T and gently agitated for 6 hours with an overheard stirrer. After the completion of the desizing wash, the swatches were removed and rinsed with deionized water until neutral pH. The swatches were laid out flat and allowed to air-dry completely.

After desizing, the fabrics are treated with the DCT form of the dendrimer (tetramer) at a dendrimer concentration of 0.3 mg/mL. In a typical experimental procedure, a solution of 120 mg dendrimer in 400 mL of water was used to treat 20 swatches (4.8 cm in diameter) for 12 hrs. under mechanical stirring at r.t. After this time, sodium carbonate (100 mg) was added and the resulting mixture was further stirred for 6 hrs at r.t. The swatches were removed and rinsed with DI until neutral pH. The swatches were laid out flat and allowed to air-dry completely. The presence of the QAC on the fabric surface was determined by fluorescein staining (see below).

Reverse Functionalization Methodology

The swatches were first desized as described above. This was followed by fabric activation with cyanuric chloride and subsequent functionalization with the amino form of the dendrimer. The experimental details of these two steps are presented below.

(a) Fabric Activation with Cyanuric Chloride

A 500 ml round bottomed flask was charged with NMP (250 mL, 1.03 g/mL, 2.60 mol) and equipped with a magnetic stir bar. To the vessel was then added cyanuric chloride (60 mg, 0.325 mmol), which was stirred until completely dissolved. After complete dissolution of the cyanuric chloride, desized cotton swatches were added to the reaction mixture and stirred for ten minutes. After ten minutes, the supernatant liquid was decanted and discarded. The activated cotton swatches were then rinsed three times successively with acetone and allowed to air-dry completely.

(b) Derivatization of Activated Cotton

A 500 ml round bottomed flask was charged with 1-methyl-2-pyrrolidone (250 mL, 1.03 g/mL, 2.60 mol) and equipped with a magnetic stir bar. To the vessel was then added NH$_2$-QAC-LM (100 mg, 0.045 mmol) and sodium carbonate (25 mg, 0.235 mmol). The mixture was allowed to stir until the QAC had completely dissolved. Activated cotton swatches were then added to the vessel, and the mixture was stirred at r.t for 16 hrs. or at 90° C. for hr. The resulting cotton swatches were rinsed three times successively with acetone and allowed to air-dry completely.

Colorimetric Method for QAC-Surface Assessment: Fluorescein Staining

Figure 34:
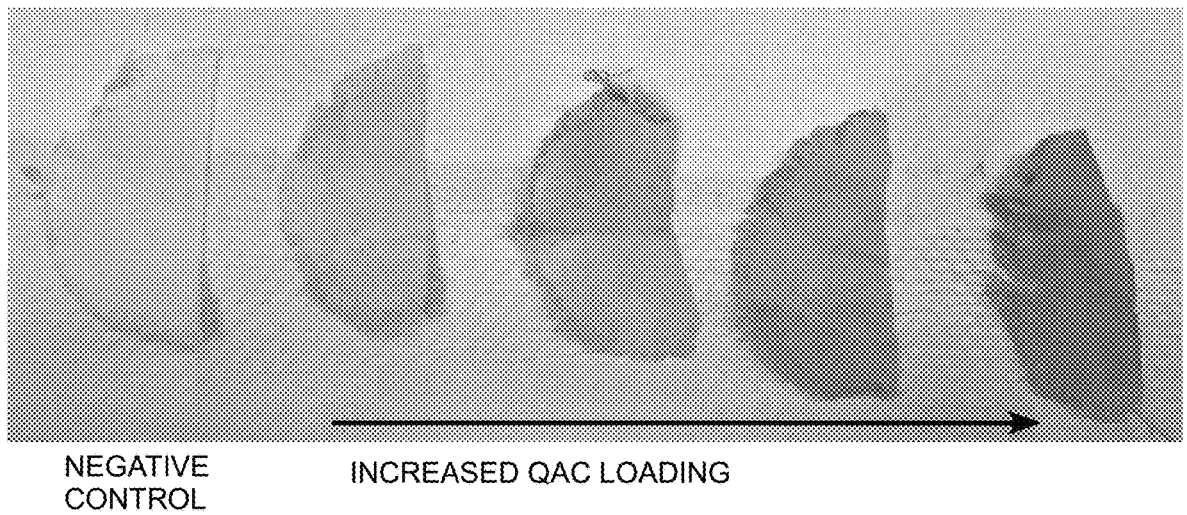
FIG. 34 is an example of fluorescein staining.

In order to assess the derivatization efficiency and maximization of QAC population on the surface of the fabrics, a methodology to assess the relative QAC-surface concentration was developed. The method involves the staining of the fabric with fluorescein (anion) which exchanges for the QAC chloride counter ion (stoichiometry of QAC group to fluorescein=1:1). In a typical procedure, swatches were cut in half and then submerged in a stain solution (1% w/v aqueous solution of fluorescein sodium salt) for ten minutes. After the staining, the swatches were rinsed thoroughly with deionized water until the rinsate was completely colorless. The half-swatches were then air dried and photographed (FIG. 34).

The analysis involves the evaluation of the relative color intensities to determine the increase in QAC loading and/or maximization of QAC population on the fabric surface.

C. Antimicrobial Testing of Fabrics Derivatized with QAC-Dendrimers

Figure 35:
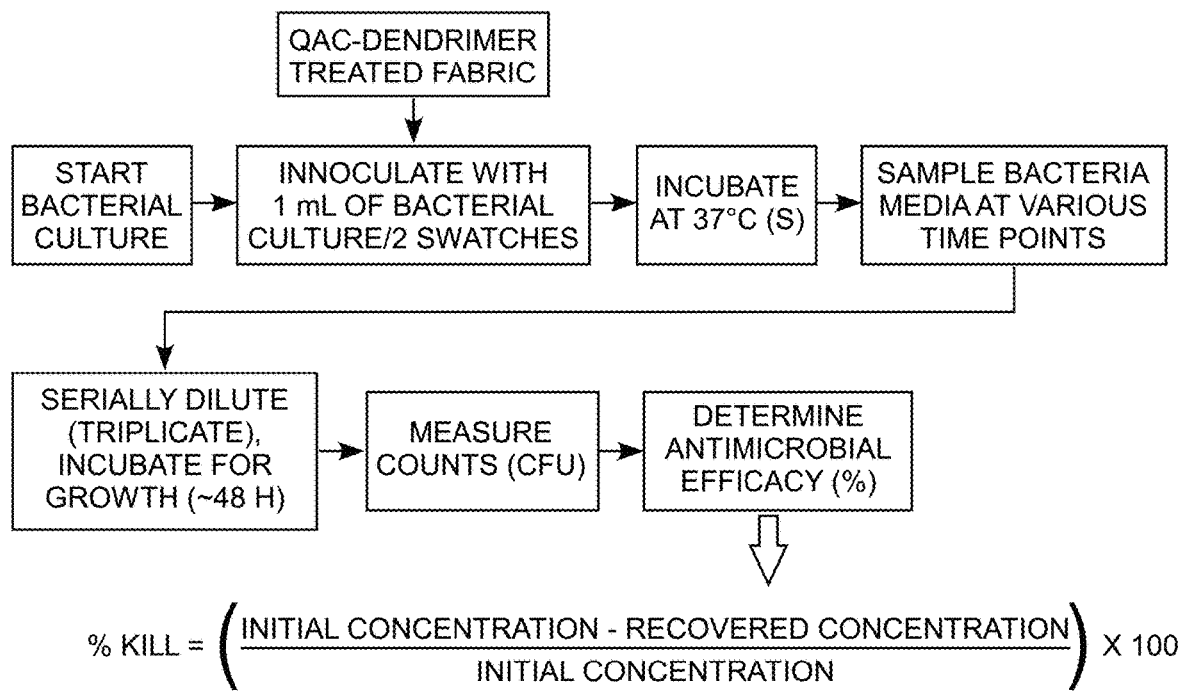
FIG. 35 is an example of an overview of the AATCC100 method.

The antimicrobial testing during this effort was performed. The evaluation of the AM efficacy has been performed using a standard method, based on the AATCC 100 protocol. An overview of the test method is shown in FIG. 35.

The experimental procedure starts with 1 mL of a bacterial culture (S. aureus representative for Gram positive bacteria or K. pneumoniae representative for Gram negative bacteria) which is inoculated to 2-3 fabric swatches (full absorption). The mixture is incubated for selected times. The mixture is then diluted with PBS and a bacterial culture (agar plate) is performed. The colony forming units (CFUs) are determined and the results are expressed as kill efficiency (percentage kill relative to the initial concentration).

Structure Activity Relationship and Downselection of Best Performers

Figure 36:
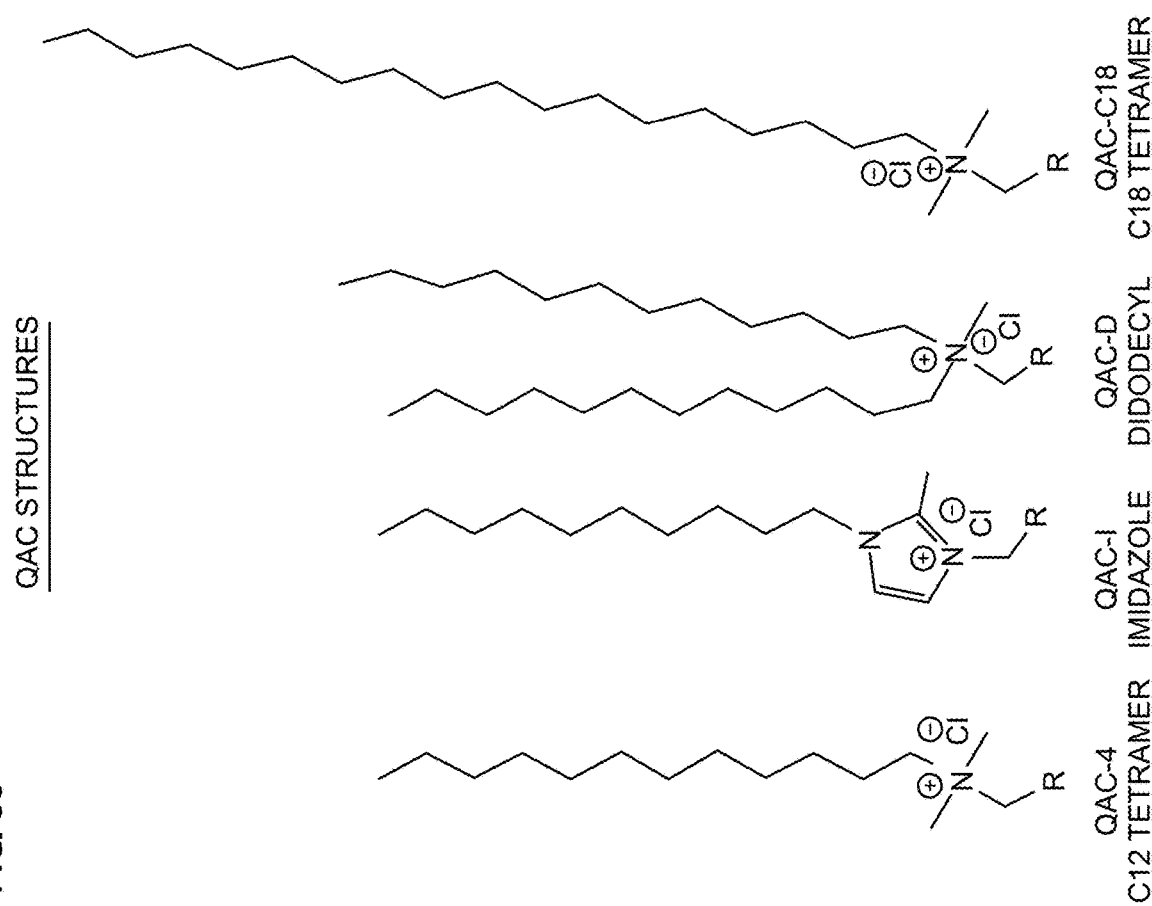
FIG. 36 is an example of a base architecture (left) and a C structures (right)
Figure 36:
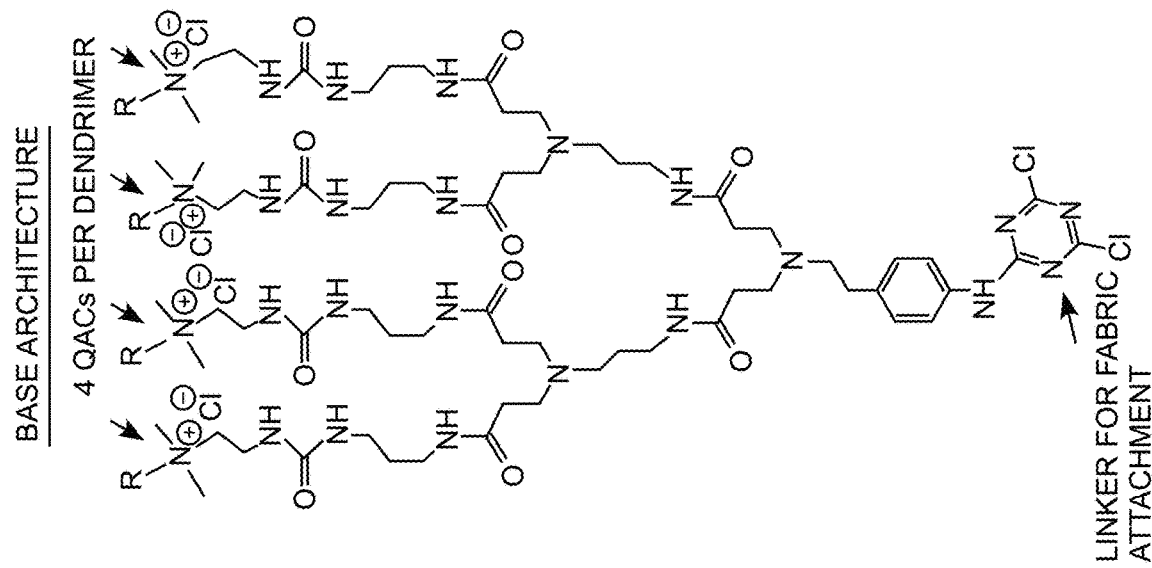

In order to assess the effect of the structure of dendrimer QAC group on the antimicrobial (AM) activity the QAC-dendrimers were attached to cotton fabric. The base architecture and the QAC structures are shown in FIG. 36.

The AM efficacy of the derivatized cotton fabrics was determined using the AATCC 100 methodology. The antimicrobial activity was evaluated against S. aureus at three timepoints (T=0, T=4 hrs, T=24 hrs). The results are summarized in Table 1:

TABLE 1

AM Efficacy Results of Various QAC-dendrimers (Cotton Fabric)

| Compound | % Kill at 4 hours | % Kill at 24 hours |
|---|---|---|
| QAC-I | >99 | >99 |
| QAC-4 | >99 | 62 |
| QAC-C18 | 78 | 11 |
| QAC-D | −38 | N/A |

Based on the results shown in Table 1, QAC-I and QAC-4 derivatized cotton swatches were selected for further AM evaluation against the Gram negative bacteria K. Pneumo-

Figure 37:
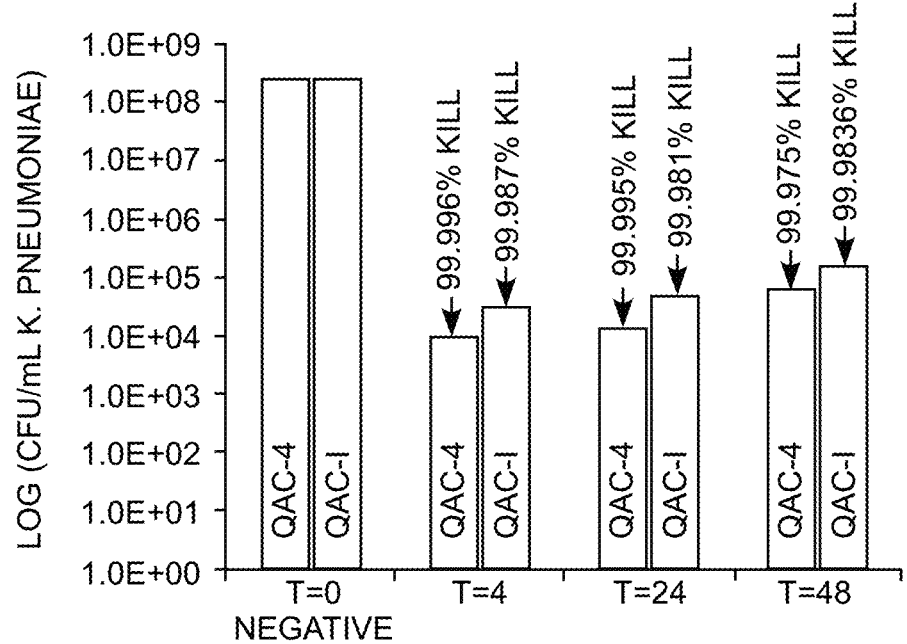
FIG. 37 is an example of efficacy of QAC-4 and QAC-I (*K. peumoniae*, cotton fabrics)

*niae*. Both fabrics showed very high efficacy as shown in FIG. 37. Based on the high efficacy against both Gram positive and Gram negative bacteria, the imidazolium dendrimer (QAC-I) was selected for further AM evaluation.

AM Efficacy of Dendrimer Derivatized NYCO and Polyester Fabrics

Figure 33:
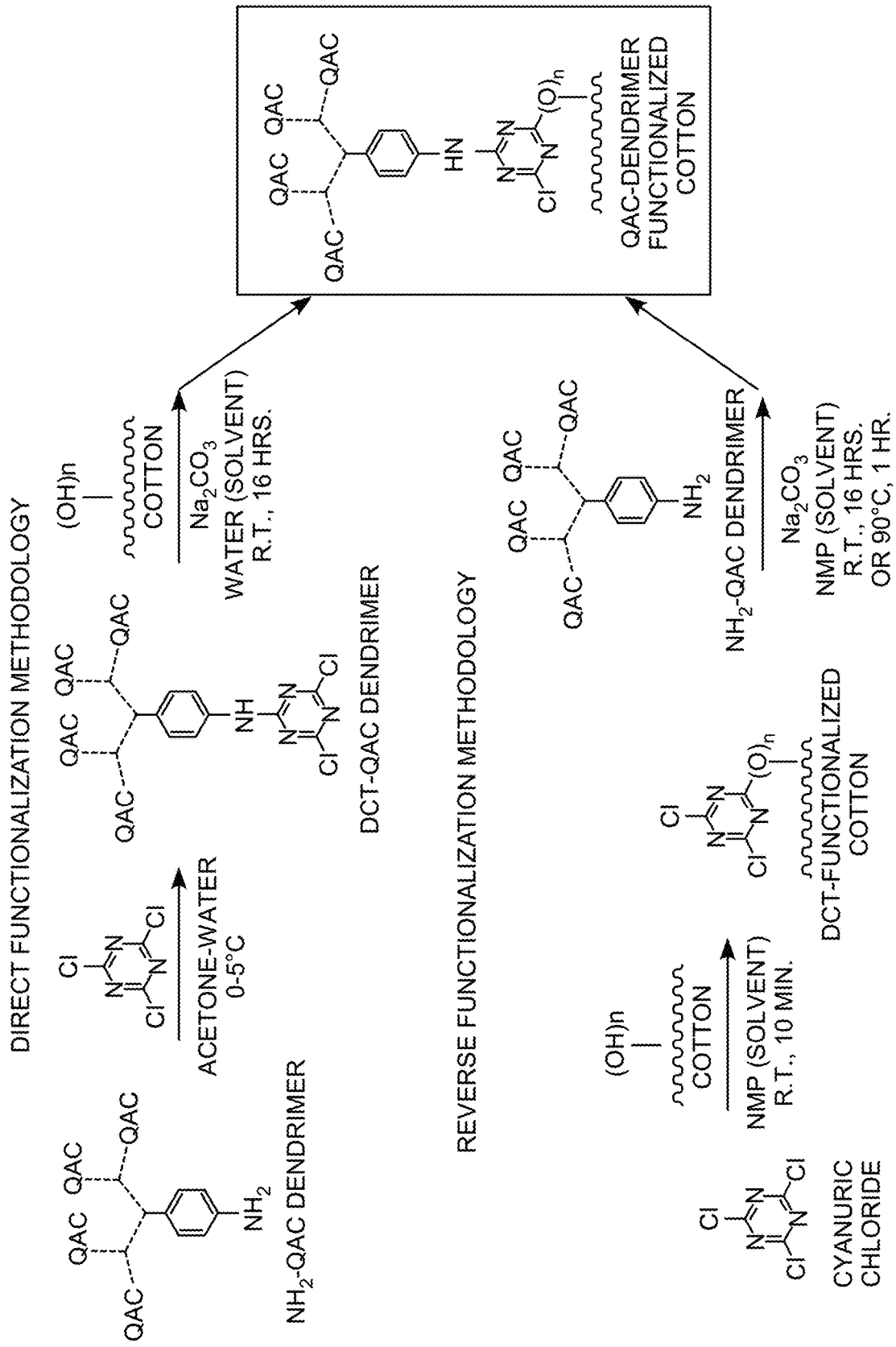
FIG. 33 is an example of fabric functionalization ethodologies.

The QAC-I dendrimer was used to derivatize NYCO and polyester fabrics using the direct functionalization protocol (FIG. 33). The fabrics were tested for their AM activity against the Gram positive bacteria. *S. Aureus* using the AATCC 100 protocol (~1×10$^6$ CFU/mL; 4 hrs. and 24 hrs. of incubation). The results are shown in FIG. 38.

Figure 38:
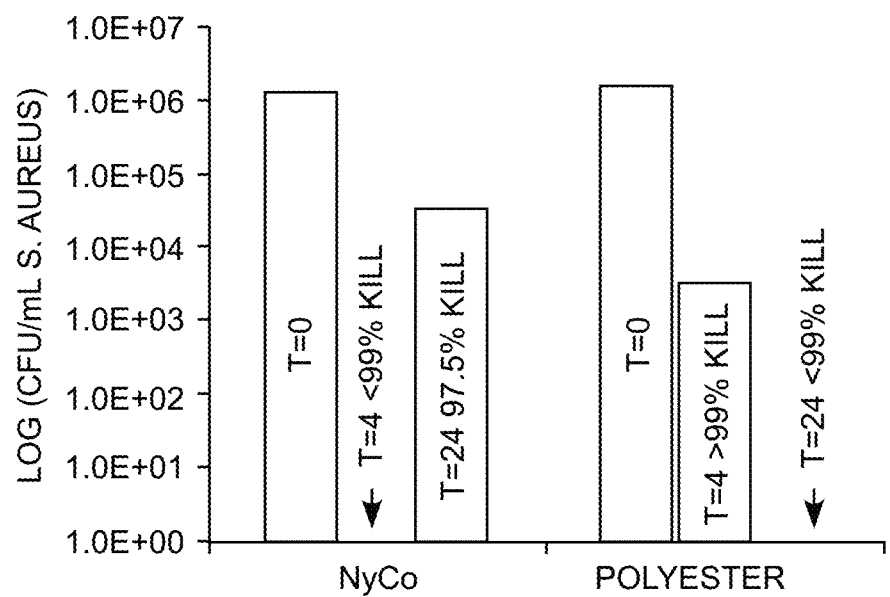
FIG. 38 is an example of antibacterial efficacy of QAC-I Derivatized NYCO and Polyester Fabrics.

As shown in FIG. 38, both fabrics showed high antibacterial efficacy (>99% kill at 4 hrs.). This result indicated that QAC-I can be used as an AM treatment for multiple fabrics.

Broad Spectrum AM Testing of QAC-I Dendrimer Derivatized Cotton Fabrics

The QAC-I derivatized cotton fabrics were evaluated against several strains of Gram positive and Gram negative bacteria and one fungus (*C. Albicans*). The results are summarized in Table 2.

TABLE 2

Broad Spectrum AM Testing of QAC-1 Dendrimer Derivatized Cotton Fabrics

| Pathogen | Type | Associated Infections | AM Efficacy (max.) |
| --- | --- | --- | --- |
| *S. Aureus* | Bacterial Gram Positive | Skin infections (abscesses), respiratory infections (sinusitis), food poisoning | >99.999% |
| *K. Pneumoniae* | Bacteria Gram Negative | Lungs (pneumonia). urinary tract, biliary tract and surgical wound infections. | >99.99% |
| *S. Epidermisis* | Bacteria Gram Positive | Patients with compromised immune systems. Biofilms on catheters or other surgical implants. | >99.99% |
| *E. Coli* | Bacteria Gram Negative | Food Poisoning, gastroenteritis, urinary tract infections and neonatal meningitis. | >99.99% |
| *C. Albicans* | Fungus | Opportunistic oral and genital infections, candidal onychomycosis, (infection of the nail plate). | >99.99% |

The results indicated very high efficacy against all pathogens and suggested that QAC-I derivatized fabrics can be used against a broad spectrum of bacteria and fungi.

Comparative AM Testing Against Silver-Derivatized Textiles

The silver fabrics are considered to be the state-of the art in the realm of AM textiles. Two silver-based consumer products (cotton fabrics) were selected for evaluation of their AM properties compared to those of QAC-I derivatized cotton. The first material comprised a silver-shirt which contained silver nanoparticles. The second material was a silver-towel which contained a permanent coating of silver ions. Swatches of both products were generated and the antimicrobial efficacy was tested using the AATCC 100 protocol (*K. Pneumoniae* at 4, 24 and 48 hrs. time points). The results are summarized in Table 3:

TABLE 3

Comparative AM Testing of QAC-I Cotton Against Silver-based Fabrics

| Fabric | Efficacy (% kill) at timepoint | | | |
| --- | --- | --- | --- | --- |
| | 0 hrs. | 4 hrs. | 24 hrs. | 48 hrs. |
| Silver Shirt | >99.2 | 87.2 | <0 | <0 |
| Silver Towel | >99.2 | >99.2 | 98.3 | 93.2 |

TABLE 3-continued

Comparative AM Testing of QAC-I Cotton Against Silver-based Fabrics

| Fabric | Efficacy (% kill) at timepoint | | | |
| --- | --- | --- | --- | --- |
| | 0 hrs. | 4 hrs. | 24 hrs. | 48 hrs. |
| QAC-I Cotton | 99 | >99.6 | >99.6 | 97.3 |

As shown in Table 3, the QAC-I dendrimer derivatized cotton shows similar or better efficacy compared to that of the Silver-towel fabric and much better efficacy than that of the Silver-shirt fabric. At 4 hours and 24 hrs., the efficacies of the QAC-I cotton are similar to those of the silver-towel. However, at 48 hours, the QAC-I cotton maintained high efficacy (97.3% kill) while the silver towel efficacy dropped (93.2% kill).

D. Biocompatibility Testing of Fabrics Derivatized with QAC-Dendrimers—Examples

The biocompatibility properties of the QAC-dendrimer derivatized cotton fabrics were evaluated using two standard methods: (a) cytotoxicity assay and (b) primary skin irritation model. The results indicated biocompatibility with no cytotoxicity or skin irritation. The experimental procedures and details of the results are presented below.

Cytotoxicity Testing

The cytotoxicity of selected fabrics was evaluated using a GLP protocol based on the L929 Agar Diffusion test, direct contact method. A brief description of the protocol is provided below.

The potential biological reactivity of a mammalian cell culture (mouse fibroblast L929) in response to exposure to the test articles (cotton fabrics) was determined. The maintenance medium of L929 cells grown in 60 mm plates was replaced with a mixture of agar and cell culture medium in 3 replicates. The test articles and control articles (~100 mm$^2$) were applied directly to the surface of the agar, and the cells were incubated for 48 hrs. at 37° C. The biological reactivity of the cells following the exposure to the test article and control articles were visually observed with a microscope at 24 and 48 hrs. and graded on a scale of 0 to 4 (Table 4).

TABLE 4

Grades of Biological Reactivity

| Grade | Reactivity | Description of Reactivity Zone |
|---|---|---|
| 0 | None | No detectable zone around or under specimen. |
| 1 | Slight | Some malformed or degenerated cells under specimen. |
| 2 | Mild | Zone limited to area under specimen. |
| 3 | Moderate | Zone extending specimen size up to 1.0 cm. |
| 4 | Severe | Zone extending farther than 1.0 cm beyond the specimen. |

Two cotton fabrics derivatized with QAC-I and QAC-4 dendrimers were evaluated for cytotoxicity (desized cotton was used as control). The results are summarized in Table 5:

TABLE 5

Cytotoxicity Results

| ID | QAC-dendrimer (QAC moitety) | Grade 24 hrs. | Grade 48 hrs. | Results |
|---|---|---|---|---|
| TA-1 | none | 2 | 2 | Non-cytotoxc |
| TA-2 | QAC-4 (dodecyl-dimethylammonium) | 2 | 2 | Non-cytotoxic |
| TA-3 | QAC-1 (decyl-methyllmidazolium) | 1 | 2 | Non-cytotoxic |
| Negative control | n/a | 0 | 0 | Non-cytotoxic |
| Positive control | n/a | 3 | 3 | Cytotokic |

As shown in Table 5, cells exposed to underivatized and derivatized cotton fabrics showed only mild biological reactivity. Based on the criteria of the protocol and the ISO10993-5 guidelines, the QAC-dendrimer derivatized fabrics meet the requirement of the test and are not considered to have a cytotoxic effect.

Primary Skin Irritation Testing

Cotton fabrics derivatized with QAC-I dendrimer was evaluated at Toxikon for skin irritation using a GLP protocol based on "Direct Primary Skin Irritation Test—ISO". The test article was evaluated for its potential to produce primary skin irritation after a single topical minimum 4 hour application to the skin of New Zealand White rabbits. Test sites were scored for erythema and/or edema. The results are summarized in Table 6:

TABLE 6

Skin Reaction Scores in the Primary Skin Irritation Test

Test Sites

| | Erythema/Edema Nov. 10, 2015 60 Minutes** | | Erythema/Edema Nov. 11, 2015 24 Hours* | | Erythema/Edema Nov. 12, 2015 48 Hours* | | Erythema/Edema Nov. 13, 2015 72 Hours* | | |
|---|---|---|---|---|---|---|---|---|---|
| Animal # | Site 1 | Site 2 | Site 1 | Site 2 | Site 1 | Site 2 | Site 1 | Site 2 | Total† |
| 50998 | 0/0 | 0/0 | 0/0 | 0/0 | 0/0 | 0/0 | 0/0 | 0/0 | 0.0 |
| 50999 | 0/0 | 0/0 | 0/0 | 0/0 | 0/0 | 0/0 | 0/0 | 0/0 | 0.0 |
| 51000 | 0/0 | 0/0 | 0/0 | 0/0 | 0/0 | 0/0 | 0/0 | 0/0 | 0.0 |

Control Sites

| | Erythema/Edema Nov. 10, 2015 60 Minutes** | | Erythema/Edema Nov. 11, 2015 24 Hours* | | Erythema/Edema Nov. 12, 2015 48 Hours* | | Erythema/Edema Nov. 13, 2015 72 Hours* | | |
|---|---|---|---|---|---|---|---|---|---|
| Animal # | Site 1 | Site 2 | Site 1 | Site 2 | Site 1 | Site 2 | Site 1 | Site 2 | Total† |
| 50998 | 0/0 | 0/0 | 0/0 | 0/0 | 0/0 | 0/0 | 0/0 | 0/0 | 0.0 |
| 50999 | 0/0 | 0/0 | 0/0 | 0/0 | 0/0 | 0/0 | 0/0 | 0/0 | 0.0 |
| 51000 | 0/0 | 0/0 | 0/0 | 0/0 | 0/0 | 0/0 | 0/0 | 0/0 | 0.0 |

*Readings after bandage removal
**60 minute scores are not included in determining the PII
†(Erythema + Edema Scores)/(2 Test Sites × 3 Observation Points).
Primary Irriation Index (PII) = 0.0

No signs of erythema or edema were noted at any observation period. Based on the criteria of the protocol, the test article was considered a negligible irritant.

E. Laundering Testing—Examples

In order to assess the robustness of the QAC-dendrimer fabric finish to laundering, several studies were performed to assess the effect of laundering on the QAC surface population and on the antibacterial efficacy. A standard methodology based on the accelerated laundering conditions of the AATCC 61 test method (1 cycle of 45 minutes at 49° C. is equivalent to 5 standard cycles) was used The effects of the following parameters were evaluated: detergent type, QAC-dendrimer additive (Tide detergent), temperature and detergent concentration. The results of these studies are presented below. temperature and detergent concentration. The results of these studies are presented below. Note: these studies were performed with fabrics functionalized by the reversed protocol (FIG. 33) as the fabrics derivatized with the direct protocol contained relatively large amounts of non-covalent bound dendrimer which is removed during laundering).

Effect of Detergent Type: Non-Ionic (Tween-20) Vs. Anionic (Tide)

(a) Characterization of QAC Surface Groups

Figure 39:
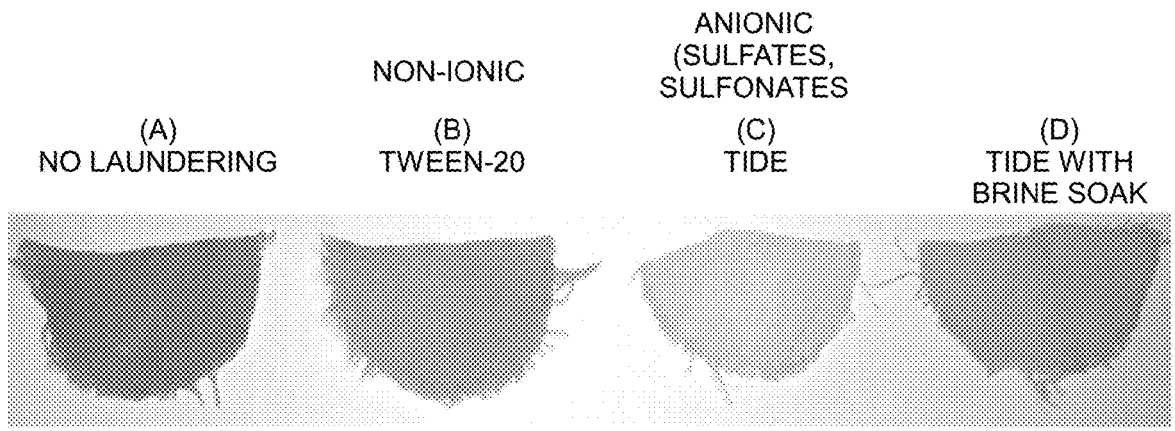
FIG. 39 is an example of laundering experiments—effect of detergent.

Cotton fabric round swatches (5 cm in diameter) derivatized with the QAC-I dendrimer were washed using 1 accelerated cycle (45 minutes at 49° C., using a standard detergent (Tide—contains anionic surfactants) and a non-ionic detergent (Tween-20). The detergent concentration was 0.23% w/v and a ratio of 47.5 mL of solution per swatch was used. The resulting fabrics were rinsed with DI water at r.t., air dried and then analyzed by fluorescein staining to assess the QAC population on the surface. The results are presented in FIG. 39.

The results indicate that laundering with a non-ionic detergent has a limited effect on the QAC population, the reduction in the QAC population is possibly due to the removal of a small amount of non-covalently bound dendrimer (FIG. 39(b) vs FIG. 39(a)). The laundering with Tide (FIG. 39(c)) appears to both remove non-covalently attached QAC-dendrimer and prevent the fluorescein attachment through an anion exchange mechanism shown in equation (1) below.

$$QAC^+Cl^-(fabric)+R-SO_3^-Na^+(Tide)\rightarrow QAC^+RSO_3^- (fabric) \quad (1)$$

The strongly bound sulfonate (or sulfate) prevents subsequent fluorescein binding.

This hypothesis is confirmed by extended brine treatment (chloride exchange) which restores the QAC potential to bind the fluorescein stain (FIG. 39(d)).

(b) Evaluation of AM Activity

Cotton fabrics laundered as described above were evaluated for their AM efficacy using the standard AATCC protocol (S. Aureus, 4 hr. incubation time, % kill calculated relative to the final amount of bacteria). The results are summarized in Table 7:

TABLE 7

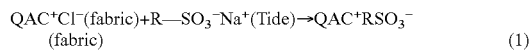

| Laundering | % Kill of laundered fabric |
|---|---|
| Detergent | (4 hrs.) |
| None | >99.99% |
| Tween-20 | >99.99% |
| Tide | 24% |

The results Indicate that the Tide washing results in the reduction of AM activity mostly due to the strong binding interaction of Tide anionic surfactants which prevent the QAC interaction with bacteria. The results also indicated that the high AM efficacy correlates fairly well with the strong color intensity of the fluorescein staining. The reduction of AM due to Tide wash can be mitigated by: (a) addition of QAC-dendrimer during washing or (b) washing at room temperature (r.t.) and/or with lower Tide concentration. These experimental results of these variations are presented in the next sections.

(a) Effect of QAC-Dendrimer Addition

Figure 40:
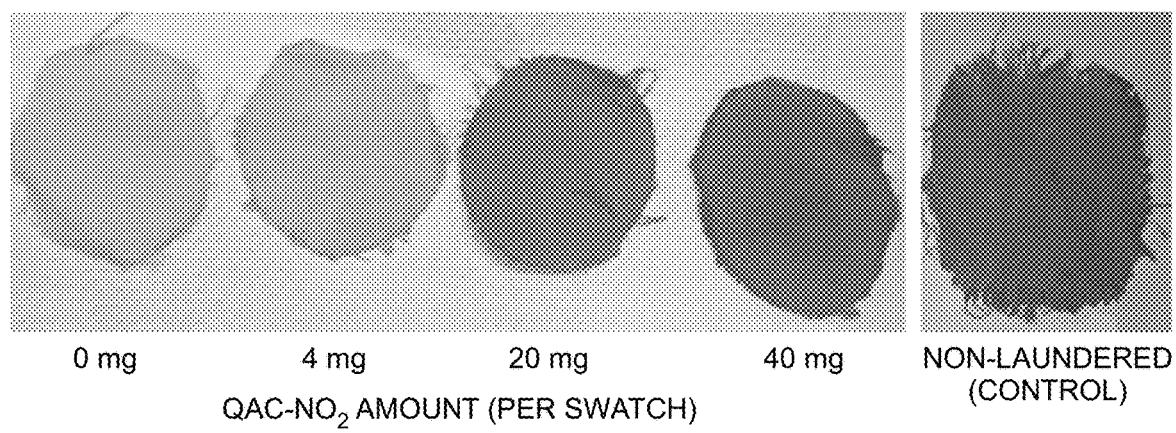
FIG. 40 is an example of Tide laundering in the presence of QAC-$NO_2$.

In order to prevent the binding of the anionic surfactants from Tide to the QAC groups on the surface of the fabrics, the laundering was performed in the presence of various amounts of non-reactive dendrimer (QAC-NO$_2$). A titration experiment was performed to assess the minimal amount of QAC-NO$_2$ that is required to suppress the binding of the Tide anionic surfactants. The experiment used the accelerate conditions (see above), a Tide concentration of 0.23% w/v, a ratio of 47.5 mL/5 cm round swatch and 0-40 mg/swatch of QAC-NO$_2$. The results are shown in FIG. 40.

The results indicate that Tide binding is essentially suppressed by >40 mg of QAC-NO$_2$ as the color intensity was similar to that of non-laundered material.

(b) Effects of Temperature and Detergent Concentration

Figure 41:
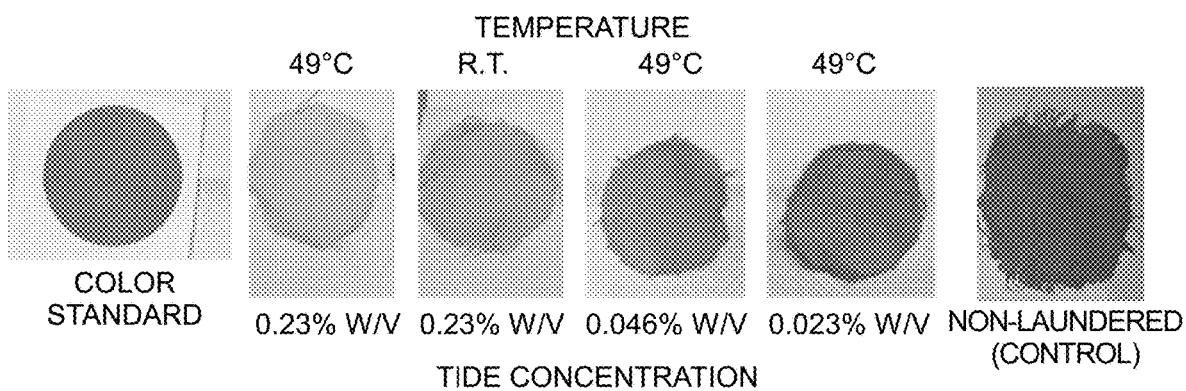
FIG. 41 is an example of Tide laundering—effects of temperature and concentration.

The Tide binding to the QAC surface was also evaluated as a function of temperature and Tide concentration. The results are summarized in FIG. 41 (baseline conditions are 0.23% Tide w/v, 49° C.):

As shown in FIG. 41, laundering at lower temperature (r.t.) or with reduced Tide concentration results in decreased binding of the anionic surfactants to the QAC groups on the fabric surface.

The overall results of the laundering experiments indicate that preservation of the QAC population needed for high AM efficacy can be achieved by: (a) laundering with non-ionic detergents or (b) laundering with Tide in the presence of QACs or at r.t./reduced detergent concentration.

F. Process Development Elements for Large Scale Fabric Derivatization—Examples In order to identify optimal conditions for large scale fabric derivatization processes, several process development experiments have been performed to assess: (a) the kinetics of the dendrimer attachment; (b) the scalability of the process and the uniformity of the finish and, (c) the re-usability of the dendrimer bath.

Kinetics of Dendrimer Attachment

The original procedure using the reverse functionalization protocol (FIG. 33) required 16 hrs. at r.t. to maximize the dendrimer loading on the fabric surface. In order to assess the fastest kinetics that will enable maximum dendrimer attachment, several studies were performed using increased temperature and/or increased concentration. The experimental procedures and the corresponding results are described below.

(a) Derivatizations at 60° C.

Figure 42:
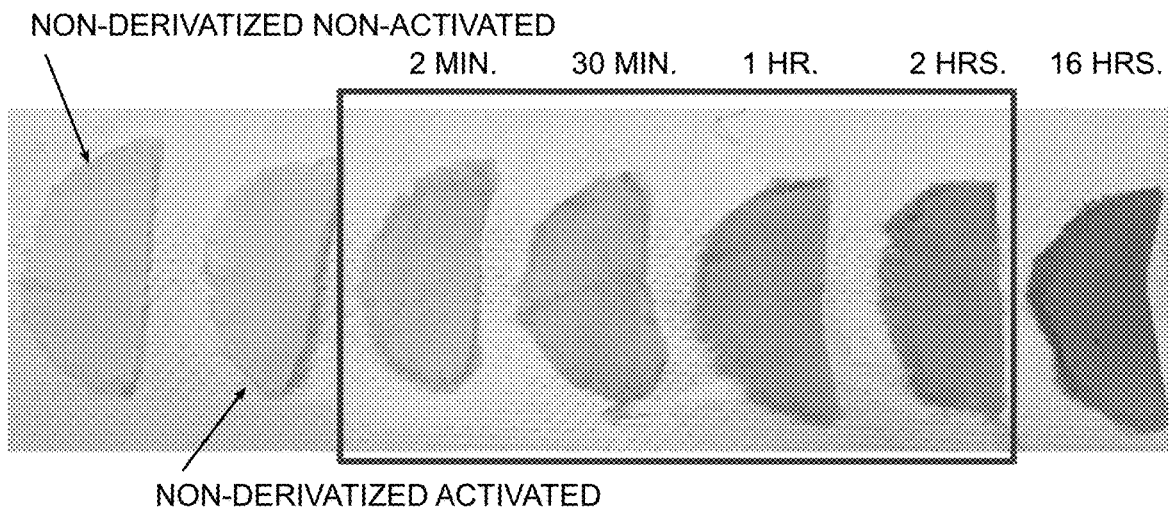
FIG. 42 is an example of derivatizations at 60° C.

The initial experiments were run at 60° C. using a concentration of QAC-NH$_2$ dendrimer of 0.4 g/L and a ratio 10 mL solution/swatch in the presence of sodium carbonate (0.2 grams per gram of dendrimer). Swatches were removed at various time points (0-2 hrs.) and stained with fluorescein to assess the QAC population on the fabric surface. A gradual increase with time has been observed (FIG. 42); however, the extent of derivatization appears to be much lower than that observed at 16 hr. time point. The results indicate a fairly slow derivatization process; based on these findings, derivatizations at 90° C. were investigated as discussed below.

(b) Derivatizations at 90° C.

These experiments were run at 90° C. using the same experimental conditions employed for the derivatizations at 60° C. (see above). The results are shown in FIG. 43.

Figure 43:
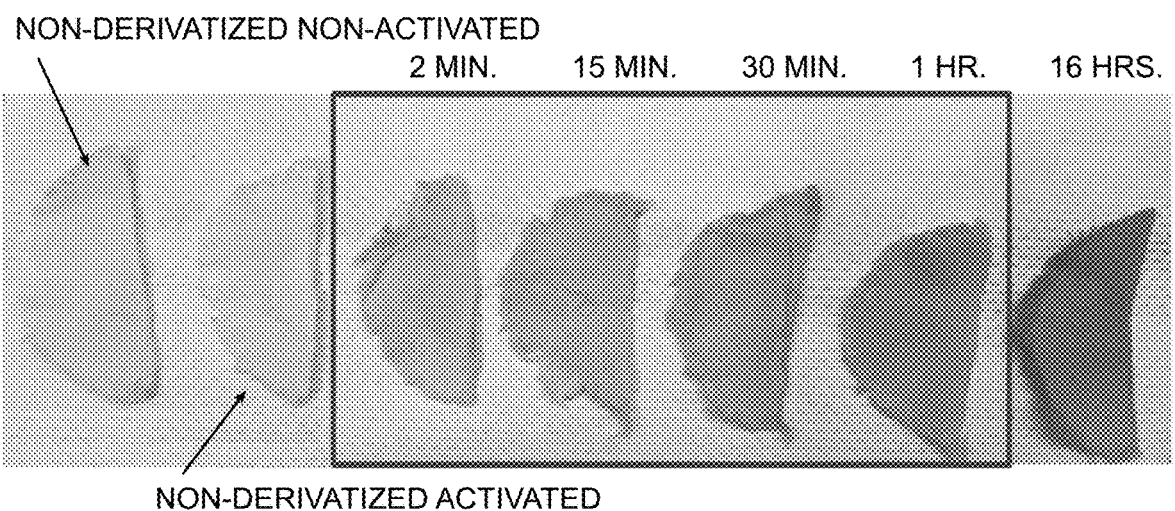
FIG. 43 is an example of derivatizations at 90° C.

The results shown in FIG. 43, indicated that increasing the temperature to 90° C. has only a small effect in increasing the rate of QAC-dendrimer attachment to the fabric. As such, the effect of increasing the concentration was investigated. Due to a practical limit associated with the usage of dendrimer, an increase in concentration of 5× was chosen for evaluation. The results am summarized below.

(c) Derivatizations at 92° C. Using 5× Increase in Concentration

Figure 44:
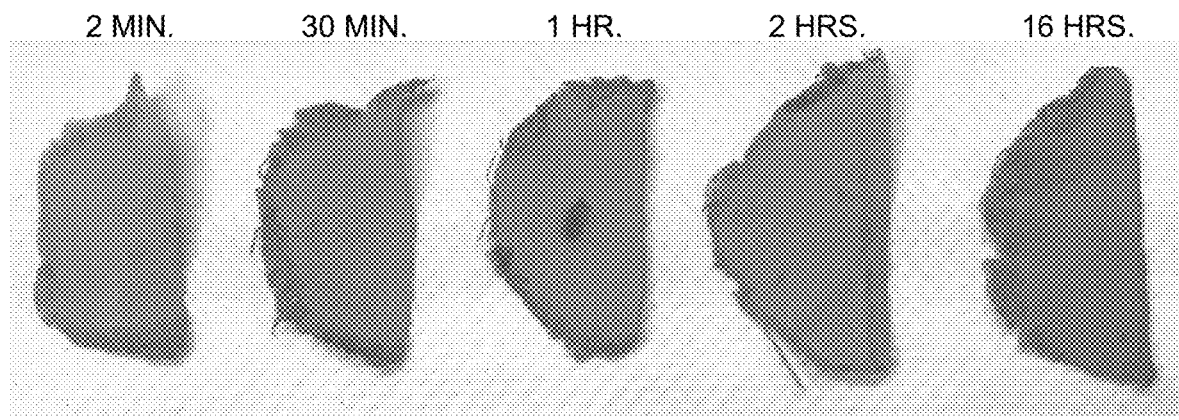
FIG. 44 is an example of derivatizations using 5× concentration and 90° C.

In these experiments, the concentration of the dendrimer was increased to 2 g/L (5× increase) while using a derivatization temperature of 90° C. as described above. The results (FIG. 44) indicated that maximum attachment is achieved within 30-60 min.

Based on these results, a derivatization time of 60 min. at 90° C. was selected for subsequent experiments to investigate the scalability and the bath reusability.

Evaluation of Process Scalability and the Uniformity of the Finish

In order to assess the scalability of the derivatization process and the uniformity of the finish, the attachment process was performed on a 12"×12" cotton fabric, using overhead stirring, a concentration of dendrimer of ~2 g/L and a volume of NMP of ~1 L.

Figure 45:
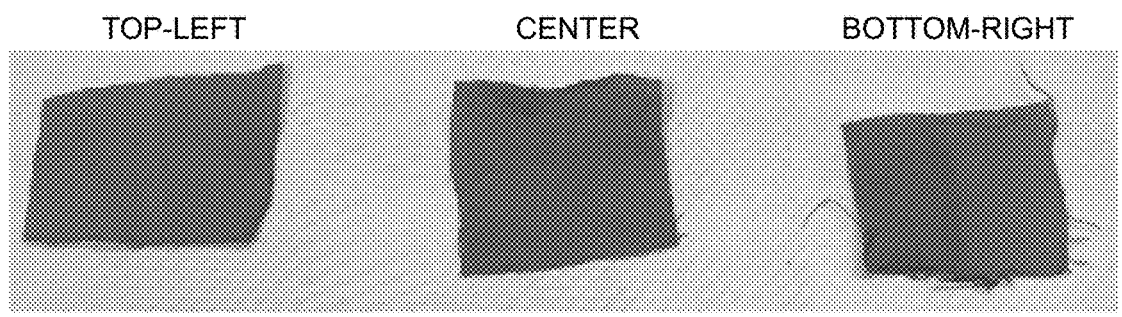
FIG. 45 is an example of derivatization of large swatch (12"×12")

The derivatization was performed on activated material, at 90° C. for 1 hr. in the presence of sodium carbonate (0.25 grams per gram of dendrimer) The resulting piece of fabric was rinsed with acetone and air dried. Three areas of the fabric (opposite corners and center) were cut (1"×1") and then subjected to fluorescein staining (FIG. 45).

The results indicated good scalability of the process with good uniformity of the antimicrobial finish.

Assessment of the Reusability of the Derivatization Bath

Figure 46:
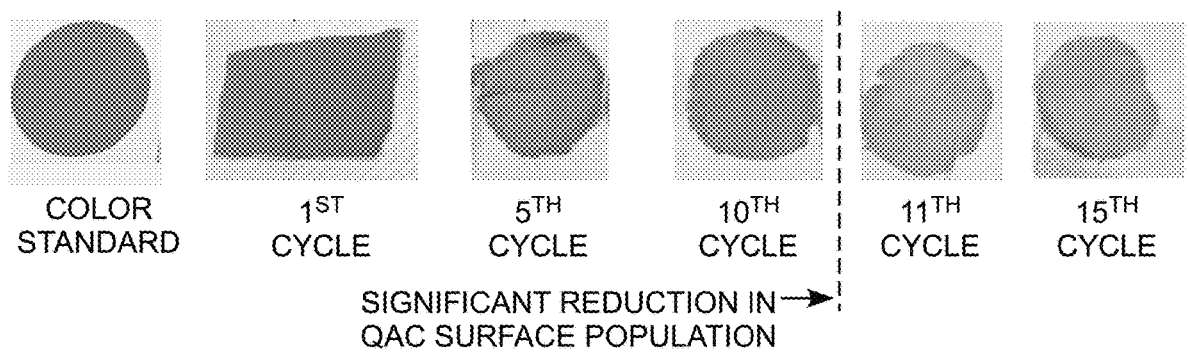
FIG. 46 is an example of bath reusability studies.

The reusability of the derivatization bath was evaluated for multiple cycles of derivatization at 90° C. for 1 hr. A total of 15 fabric derivatization cycles were performed using the following conditions (per activated swatch): 40 mg of QAC-NH$_2$ dendrimer, 10 mg of Na$_2$CO$_3$ in 20 mL of NMP. Using the fluorescein testing and a color standard, a significant drop in the QAC surface population was determined after the 10$^{th}$ cycle as shown in FIG. 46.

These results indicated that 40 mg of the QAC-dendrimer can be used to sequentially derivatize 10 swatches (5 cm in diameter) before the bath needs replenishing. Based on these results, the following parameters are estimated for a large scale process for each square meter of fabric: temperature: 90° C., residence time: 1 hr.; concentration: 2 g/L (2 grams of QAC-dendrimer in 1 L of NMP) before replenishing. Additional studies using the full scale process are needed for further optimization and determination of replenishment amounts and rates.

The combined results suggest that the kinetics of derivatizations are slow for a large scale roll-to-roll process and am more suitable for semi-continuous or batch processes.

G. Additional Antimicrobial Testing—Examples

Cotton fabrics derivatized with imidazolium dendrimer were further evaluated for the AM efficacy against other pathogens. High AM efficacy was observed against antibiotic-resistant bacteria (vegetative cells and spores) and against the non-enveloped virus MS2 (Table 8):

TABLE 8

| AM Efficacy of Cotton Fabrics Derivatized with dendrimers | | |
|---|---|---|
| Pathogen Type | Name | % Reduction |
| Antibiotic resistant bacteria involved in healthcare-associated infections (HAI) | C. Difficile (vegetative) | 99.20% |
|  | C. Difficile (spores) | 99.82% |
|  | MRSA | 99.80% |
| Virus (non-enveloped) | MS2 | 99.95% |

H. Attachment to Other Surfaces and AM Evaluation—Examples

Figure 47:
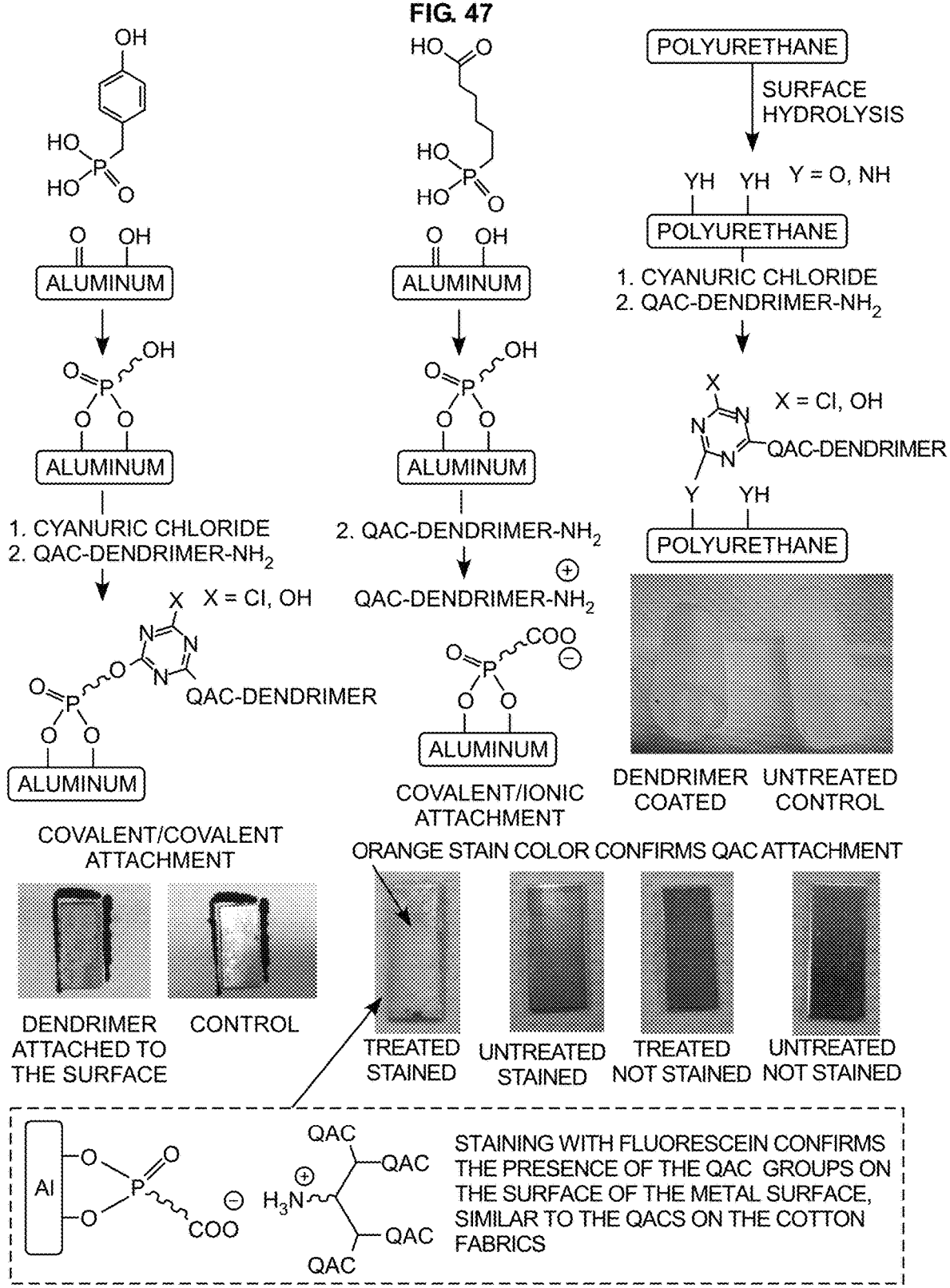
FIG. 47 is an example of attachment of dendrimer to other surfaces.

Preliminary experiments were performed that demonstrated attachment to metal surfaces and polyurethane tubing. The attachment chemistries along with the fluorescein stainings that confirm the presence of surface QAC groups are shown in FIG. 47.

Production and Antimicrobial Efficacy Evaluation of Aluminum Surfaces Derivatized with the AM Dendrimers Compounds (a) Synthesis of AM Compound (1)

Figure 48:
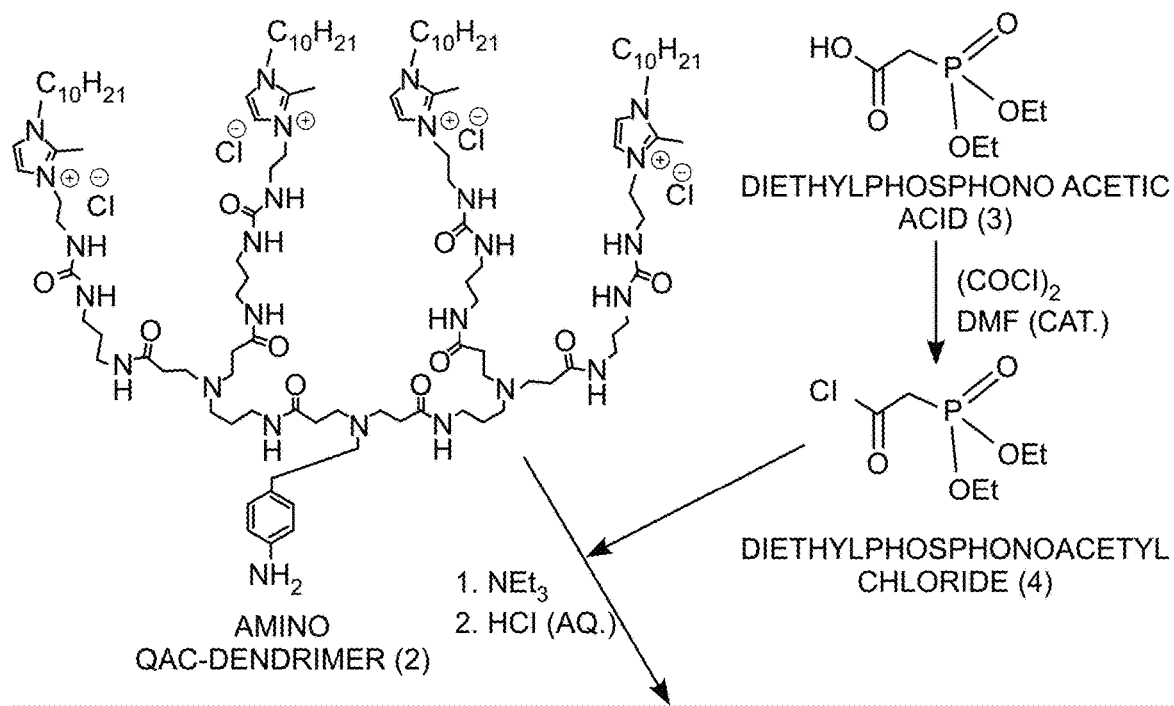
FIG. 48 is an example of synthesis of AM compound for coating of metal surfaces.
Figure 48:
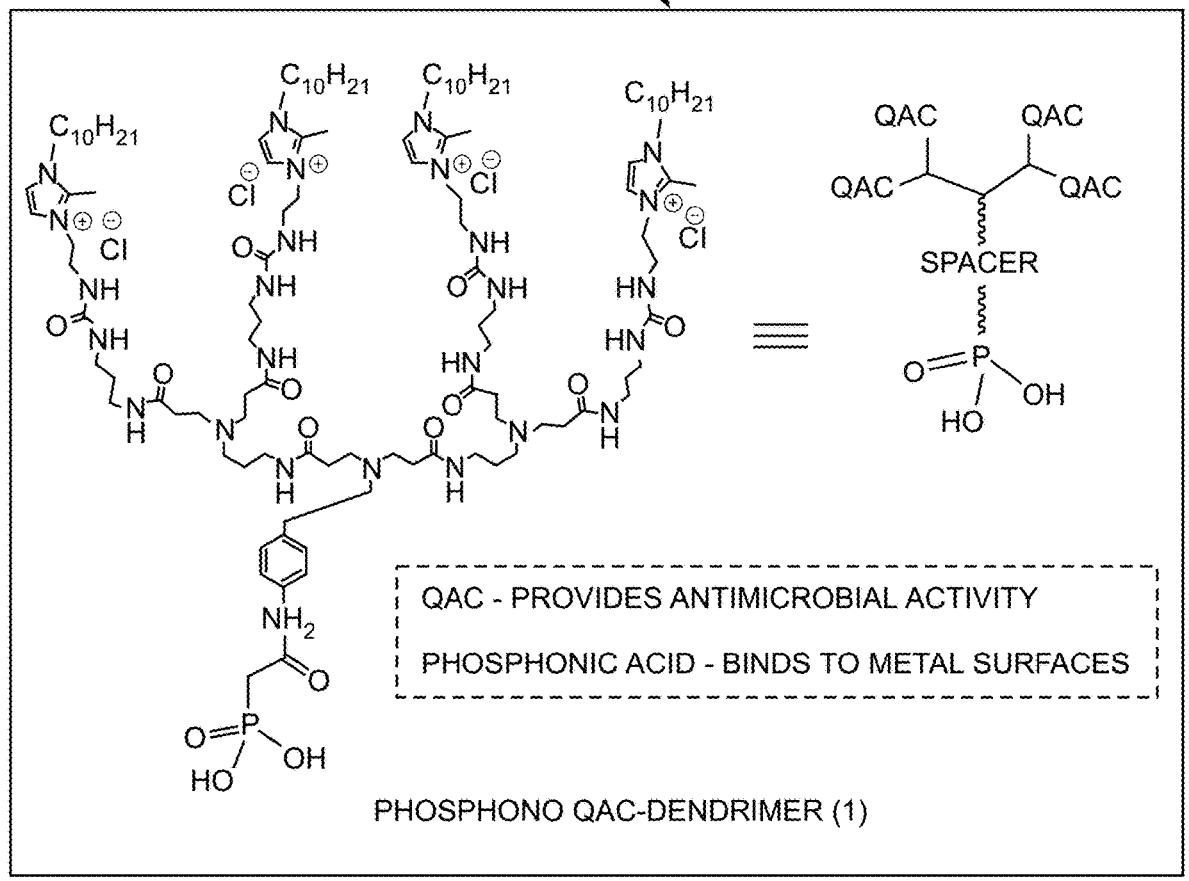

A synthetic process for the AM compound (1) was developed to successfully produced gram amounts for the derivatization of metal surfaces. The synthetic route is shown in FIG. 48.

In the first step, compound (3) was reacted with oxalyl chloride to produce compound (4). The experimental procedure is described below.

Figure 49:
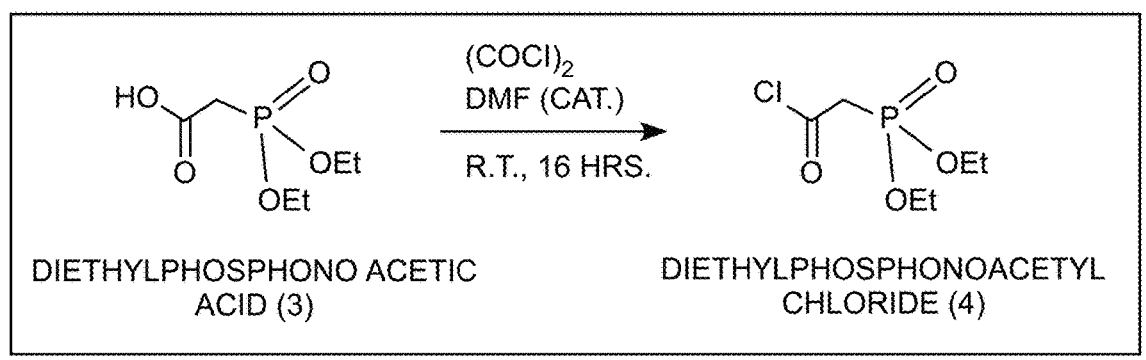
FIG. 49 is an example of a schematic of the proposed approach.
Figure 49:
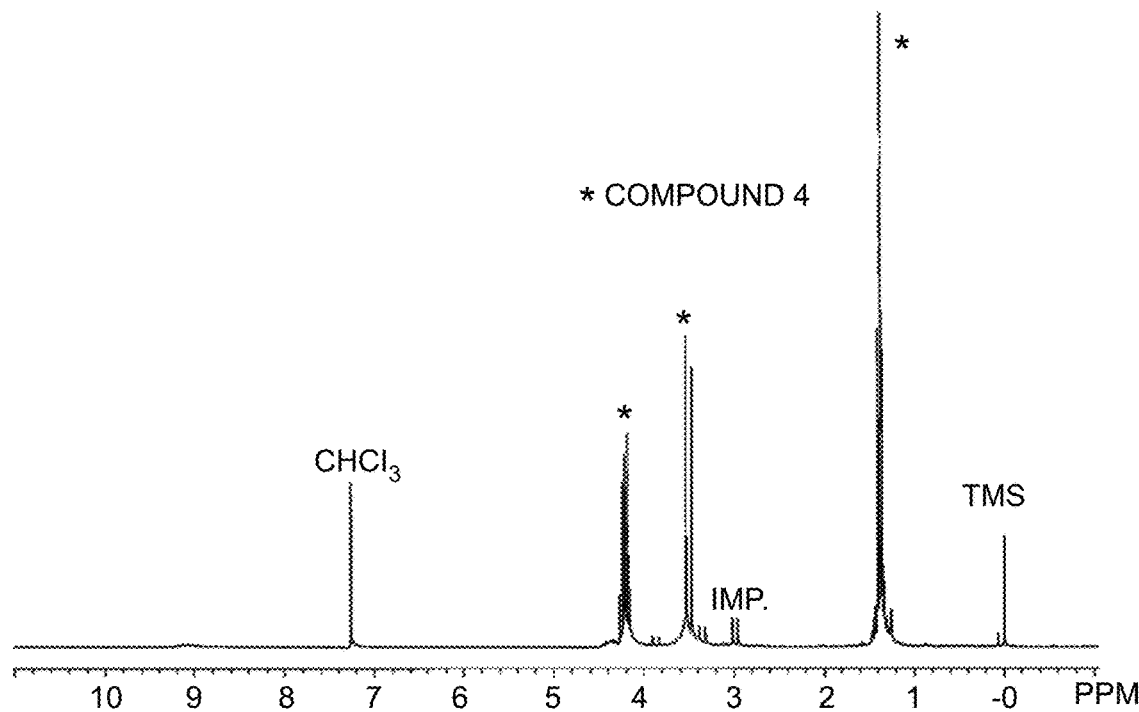

To a solution of compound (3)—(1.% grams, 0.01 mol) in 10 mL of dichloromethane (DCM) was added (COCl)$_2$ as a 2M solution in DCM (10 mL, 0.02 mol) and 50 uL of dimethylformamide (DMF) as catalyst. The resulting solution was stirred at r.t. for 16 hrs. The mixture was concentrated under reduced pressure to afford a dark brown oil. $^1$H-NMR analysis (FIG. 49) indicated conversion >90% of staring material 1 into the desired product 2.

Product (4) was used as such for subsequent chemistry (without additional purification). In the second step of the synthesis, compound (4) was reacted with the amino-dendrimer precursor (2) as described below.

Figure 50:
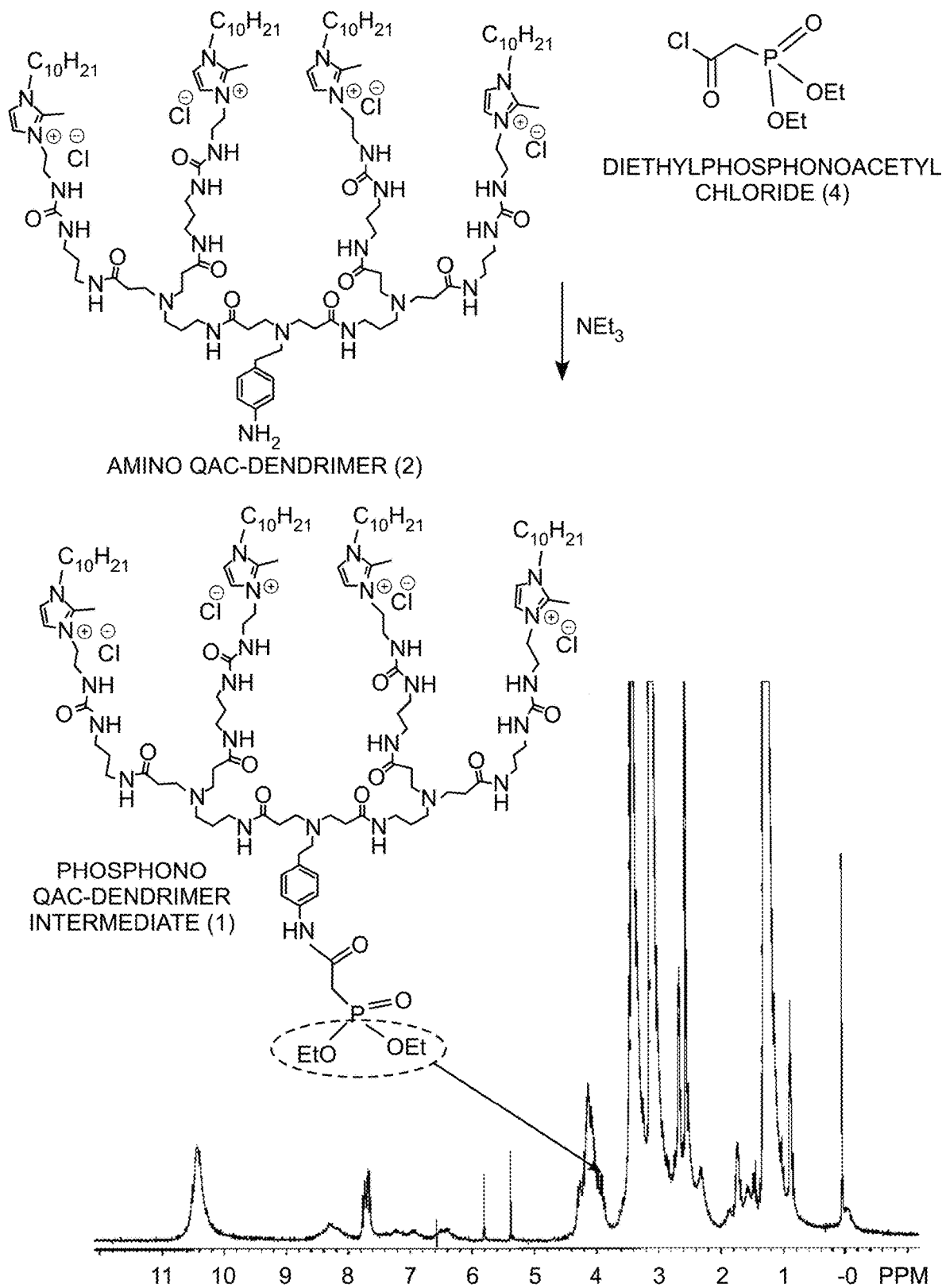
FIGS. 50-62 show additional examples.

To a suspension of compound (2)—(1.57 grams, 0.7 mmol) in 20 mL of DCM were added 4 mL of trimethylamine (NEt$_3$) and a solution of compound (4)(0.5 grams, 2.3 mmol) in 3 mL of DCM. The resulting mixture was stirred at r.t. for 16 hrs. The mixture was concentrated under reduced pressure to afford an oily solid. Trituration with acetone afforded the desired product (1') as confirmed by $^1$H-NMR analysis (FIG. 50).

Figure 51:
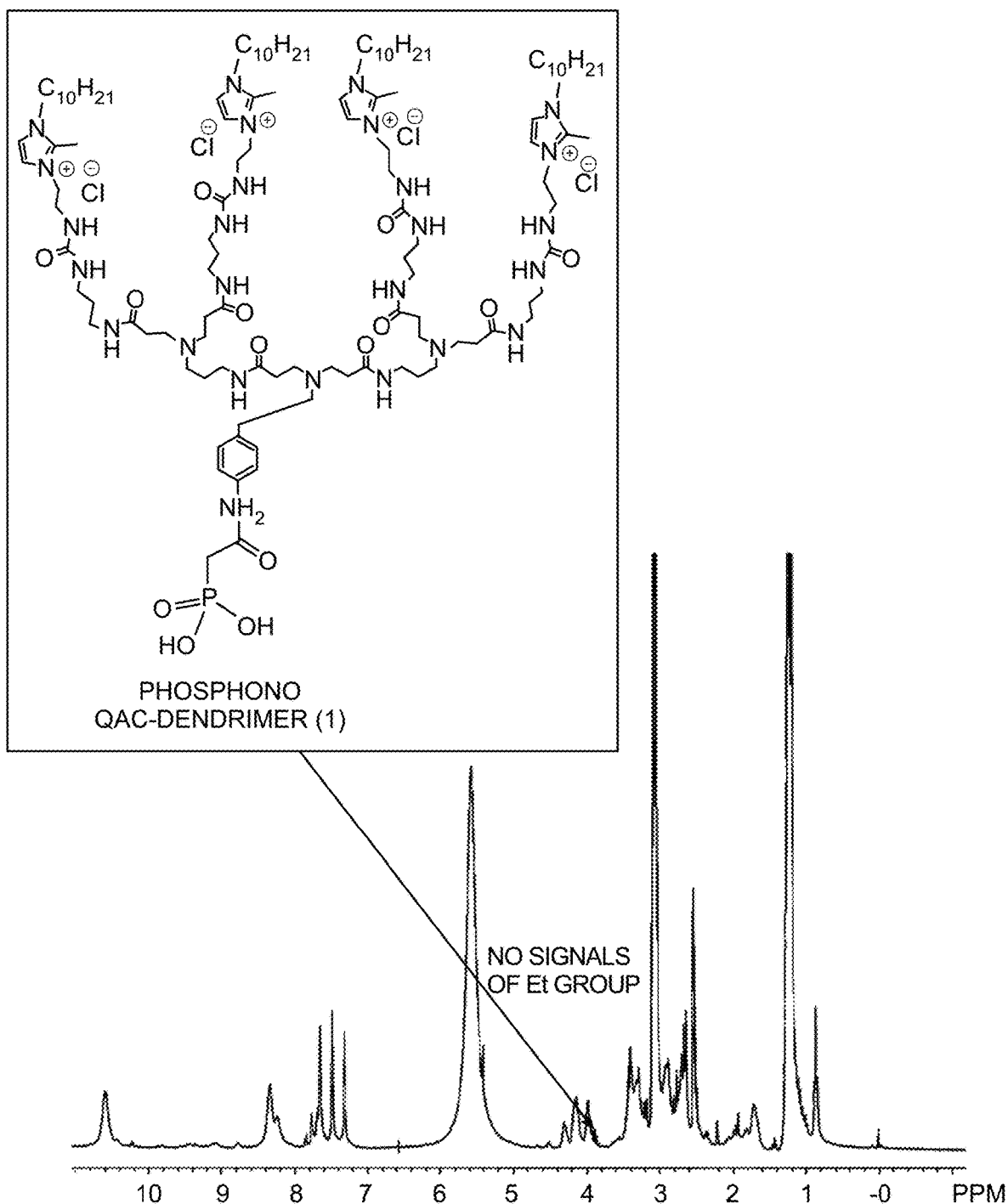

The intermediate compound (1') was subsequently hydrolyzed using concentrated HCl in acetonitrile (16 hrs, reflux). $^1$H-NMR analysis indicated full conversion into the target compound (1), FIG. 51.

Using this procedure 1.5 grams of the target AM compound (1) were synthesized. This material was used without further purification for attachment to aluminum coupons.

(b) Attachment of Compound (1) to Aluminum Surfaces

Figure 52:
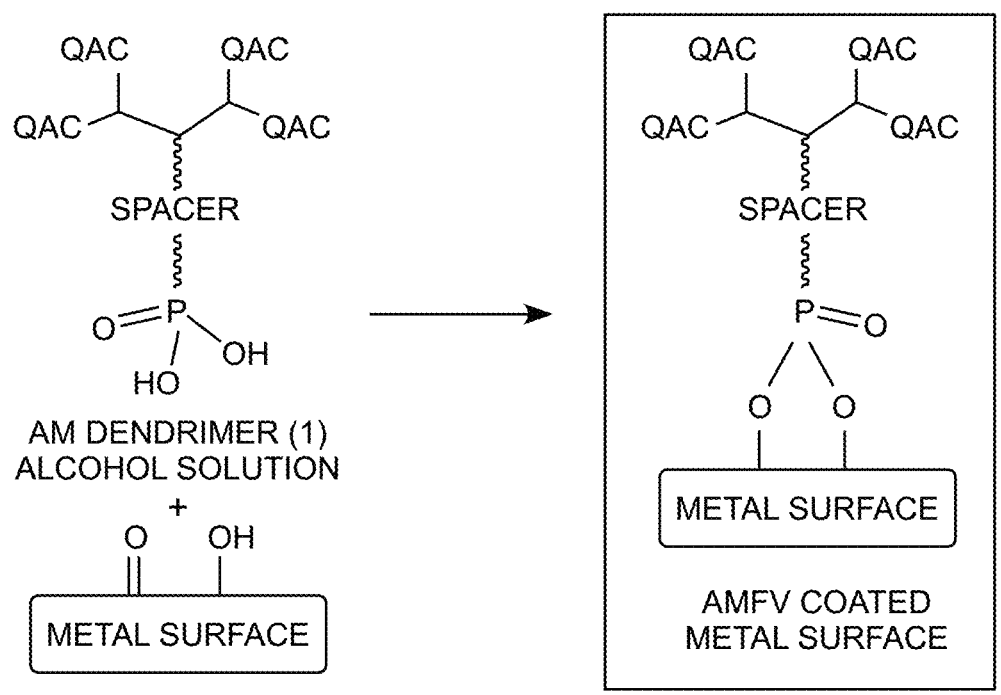

The AM compound (1) was attached to aluminum metallic surfaces (non-anodized, clear anodized and black anodized) using a methanol solution (10 mg/mL) and metal coupons (FIG. 52). Coupons of predetermined dimensions (2"×2" or ½"×1") were submerged in alcoholic solutions of compound (1). At predetermined time points (2 days, 6 days) small coupons were removed and thoroughly rinsed with alcohol to remove any unbound material.

Figure 53:
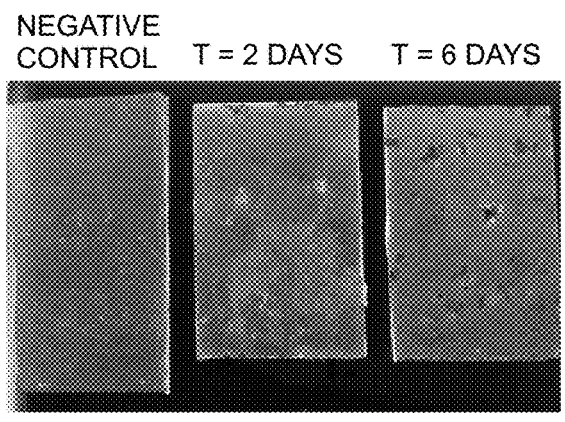
Figure 53:
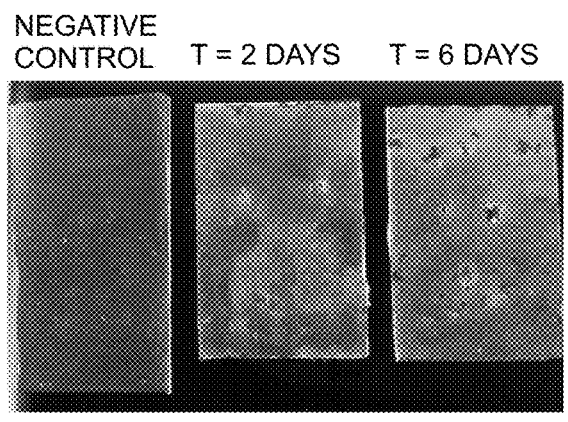
Figure 54:
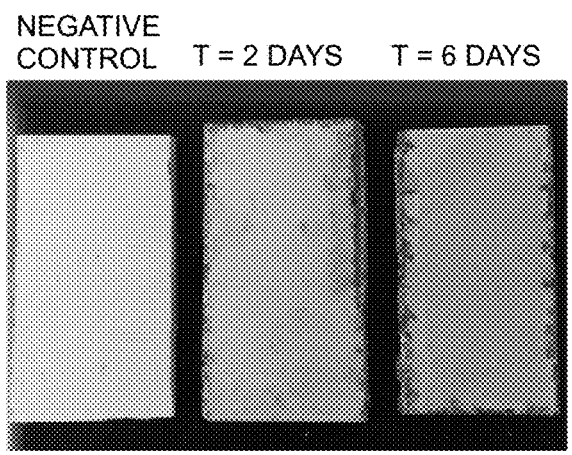
Figure 54:
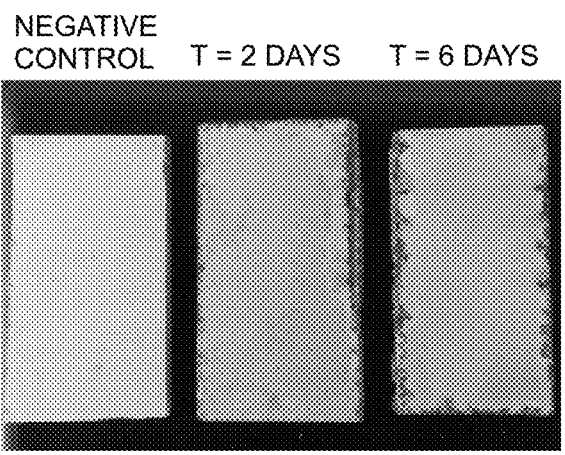
Figure 55:
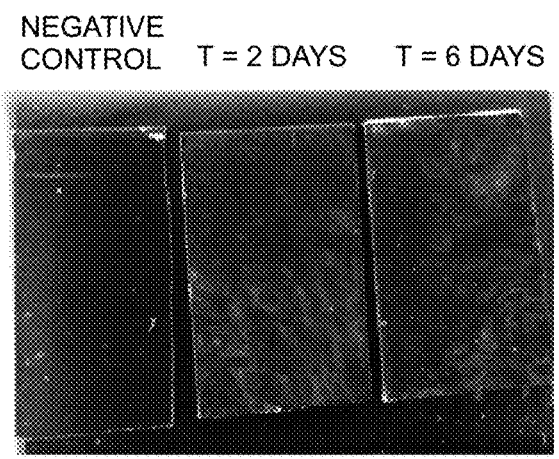
Figure 55:
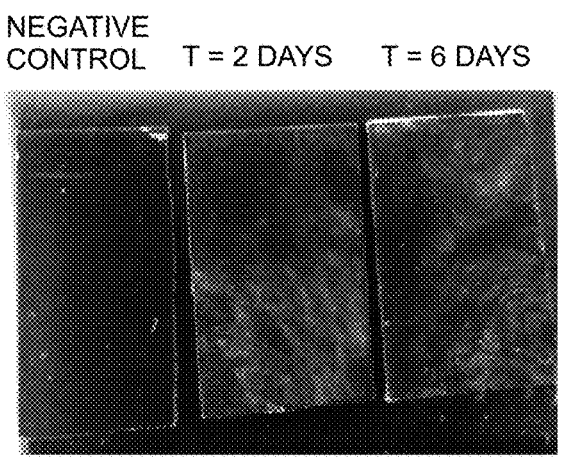

The presence of the QAC moieties was determined by fluorescein staining. The coupons were submerged in a 1% aqueous fluorescein solution for 10 min. and then removed and rinsed with DI water until no fluorescence was detected in the wash. The resulting coupons were photographed to assess the relative QAC population on the surface. The results are shown in FIGS. 53-55 (increase in picture saturation provided for additional clarity):

As seen in FIGS. 53-55, the extent of staining increases with the derivatization time indicating an increase in the attachment of the antimicrobial dendrimer over time. The material resulting from the functionalization of the clear anodized aluminum provided the best uniformity and was selected for biological testing (see next section).

(c) Antimicrobial Testing of Metallic Coupons Derivatized with Antimicrobial Dendrimers The AM testing was performed using the standardized JIS Z 2801 method against the Gram negative, *E. Coli* bacteria. A summary of the procedure is presented below:

The test microorganism is prepared, usually by growth in a liquid culture medium.

The suspension of test microorganism is standardized by dilution in a nutritive broth (this affords microorganisms the opportunity to proliferate during the test).

Control and test surfaces are inoculated with microorganisms, and then the microbial inoculum is covered with a thin, sterile film. Covering the inoculum spreads it, prevents it from evaporating, and ensures close contact with the antimicrobial surface.

Microbial concentrations are determined at "time zero" by elution followed by dilution and plating to agar.

A control is run to verify that the neutralization/elution method effectively neutralizes the antimicrobial agent in the antimicrobial surface being tested.

Inoculated, covered control and antimicrobial test surfaces are allowed to incubate undisturbed in a humid environment for 24 hours, usually at body temperature.

After incubation, microbial concentrations are determined. Reduction of microorganisms relative to the control surface is calculated.

Figure 56:
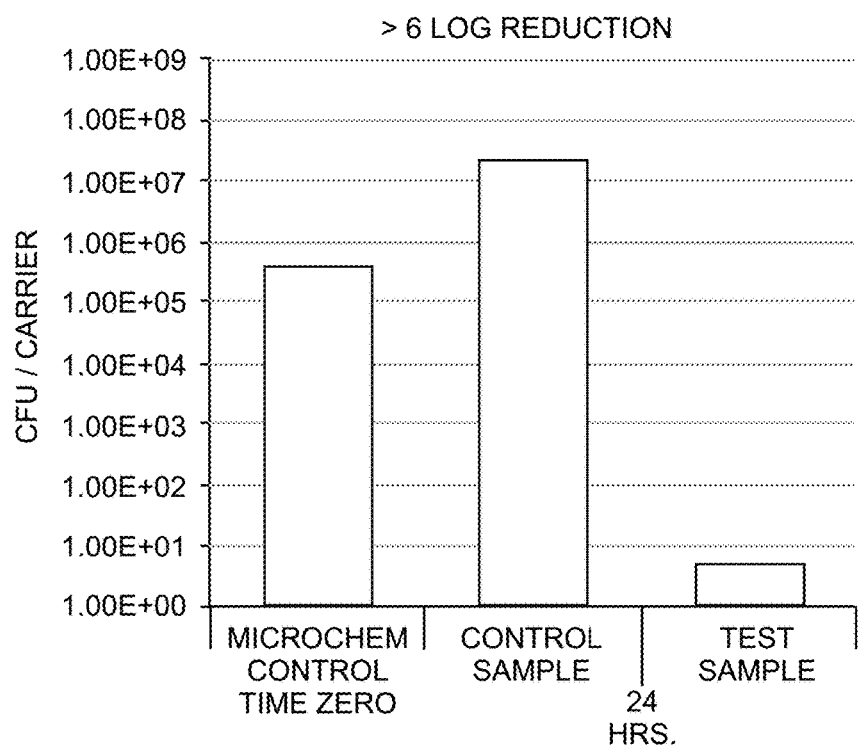

The testing of the front side resulted in >6 log reduction (>99.9999%) of the inoculum compared to a control without dendrimer derivatization (FIG. 56).

Figure 57:
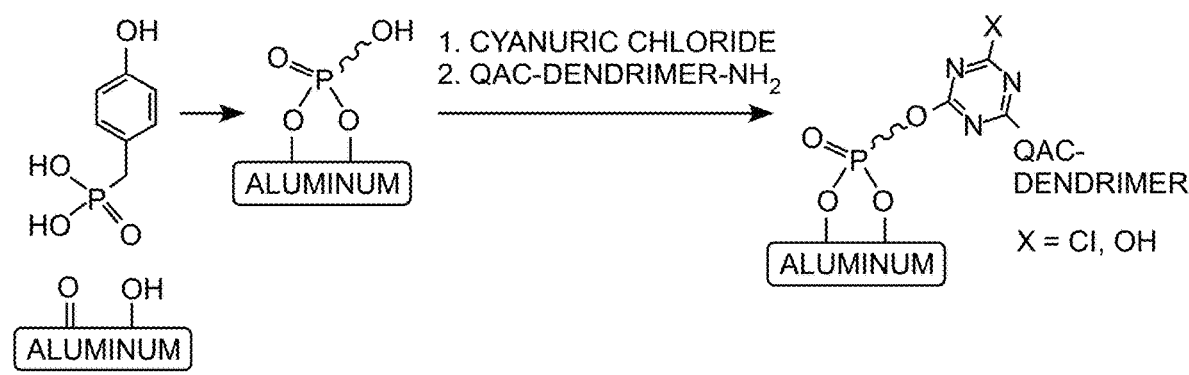

Additional AM testing was performed using the JIS Z 2801 method described above and aluminum coupons that were produced using the one step methodology outlined in FIG. 52 and the two step methodology shown in FIG. 57.

Both types of aluminum coupons have shown high AM efficacy ranging from 2.8 to 8 log reduction (99.8% to 99.999999%) against *E. Coli*.

Figure 58:
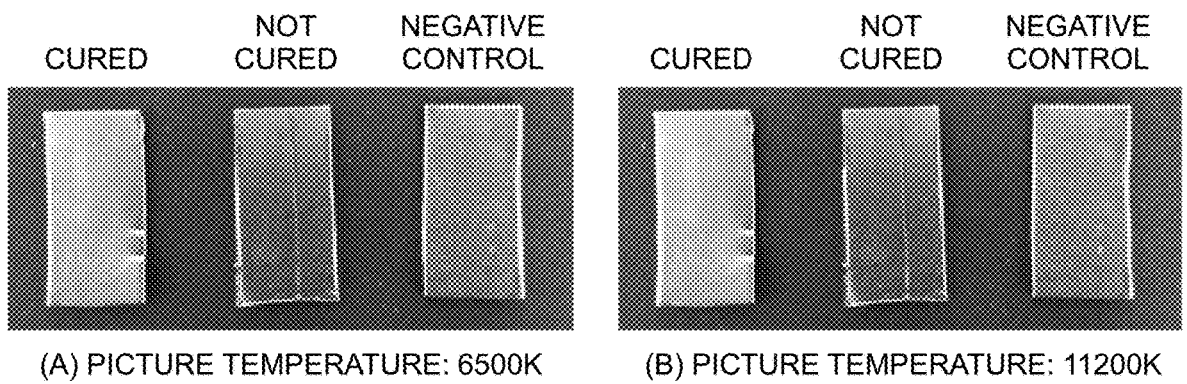

Stainless steel coupons were functionalized using the methodologies developed for the aluminum coupons modified with an additional thermal curing step. The coupons resulted from the r.t. functionalization for 6 days were cured at 115° C. for 2 hrs. The fluorescein staining indicated in significant attachment, as shown in FIG. 58 (increased picture temperature provided for additional clarity).

The cured stainless steel coupons have shown high AM efficacy against *E. Coli* (5.34 Log reduction, 99.999%).

Figure 59:
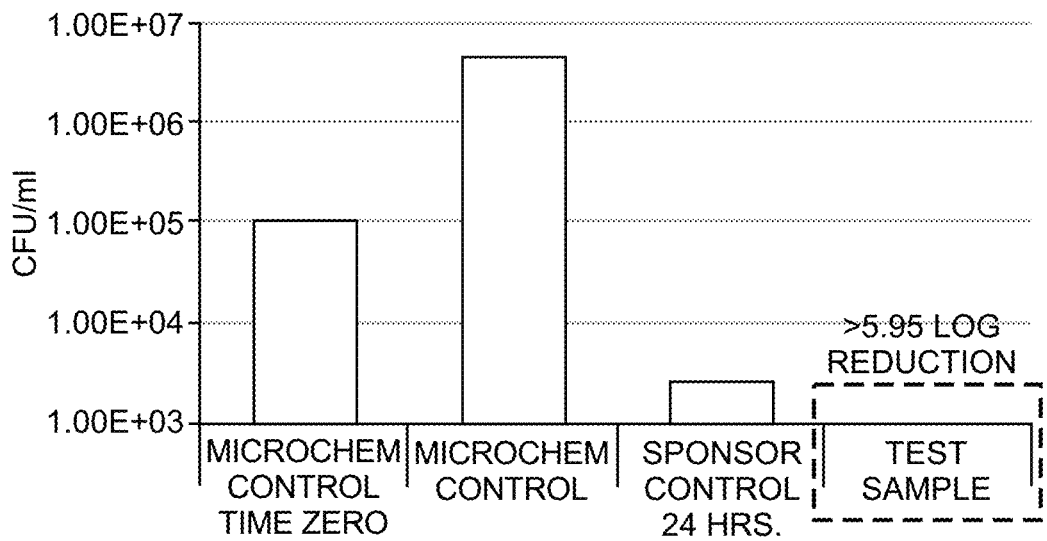
Figure 59:
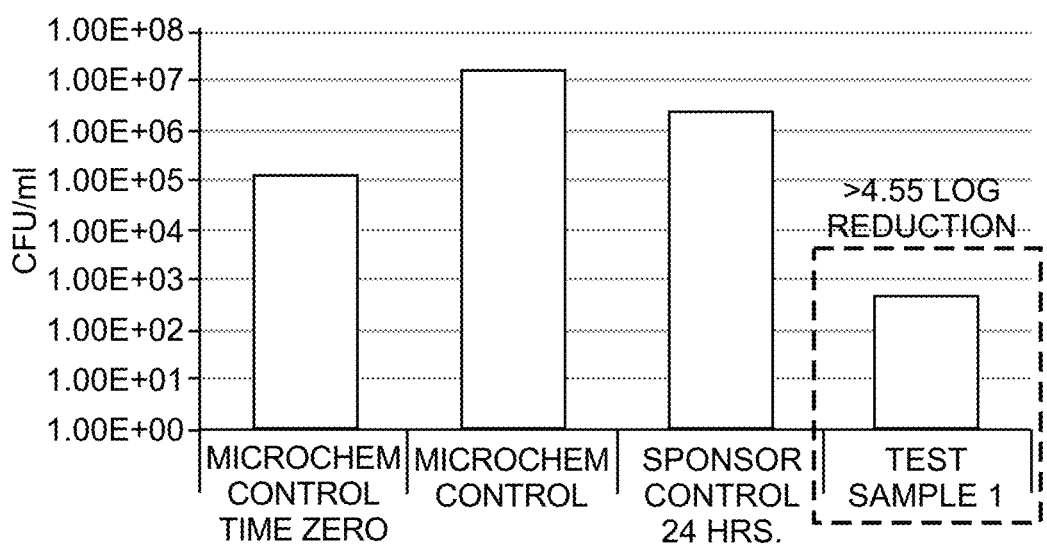

(d) Additional Antimicrobial Efficacy of Aluminum Surfaces Derivatized with Dendrimers Compounds In addition to *E. Coli* bacteria, the efficacy of AM functionalized aluminum coupons was evaluated against *Bacillus atrophaeus* (ATCC 9372) and *Bacillus* sp. (ATCC 29669) using the standard JIS Z 2801 method (–). Results (FIG. 59) indicated >5.95 Log reduction (>99.9989%) against *Bacillus atrophaeus* (ATCC 9372) and 4.55 Log reduction (99.997%) against *Bacillus* sp. (ATCC 29669).

Synthesis of UV-Activatable Dendrimer and Attachment to Polymer Surfaces (Plastics).

Figure 60:
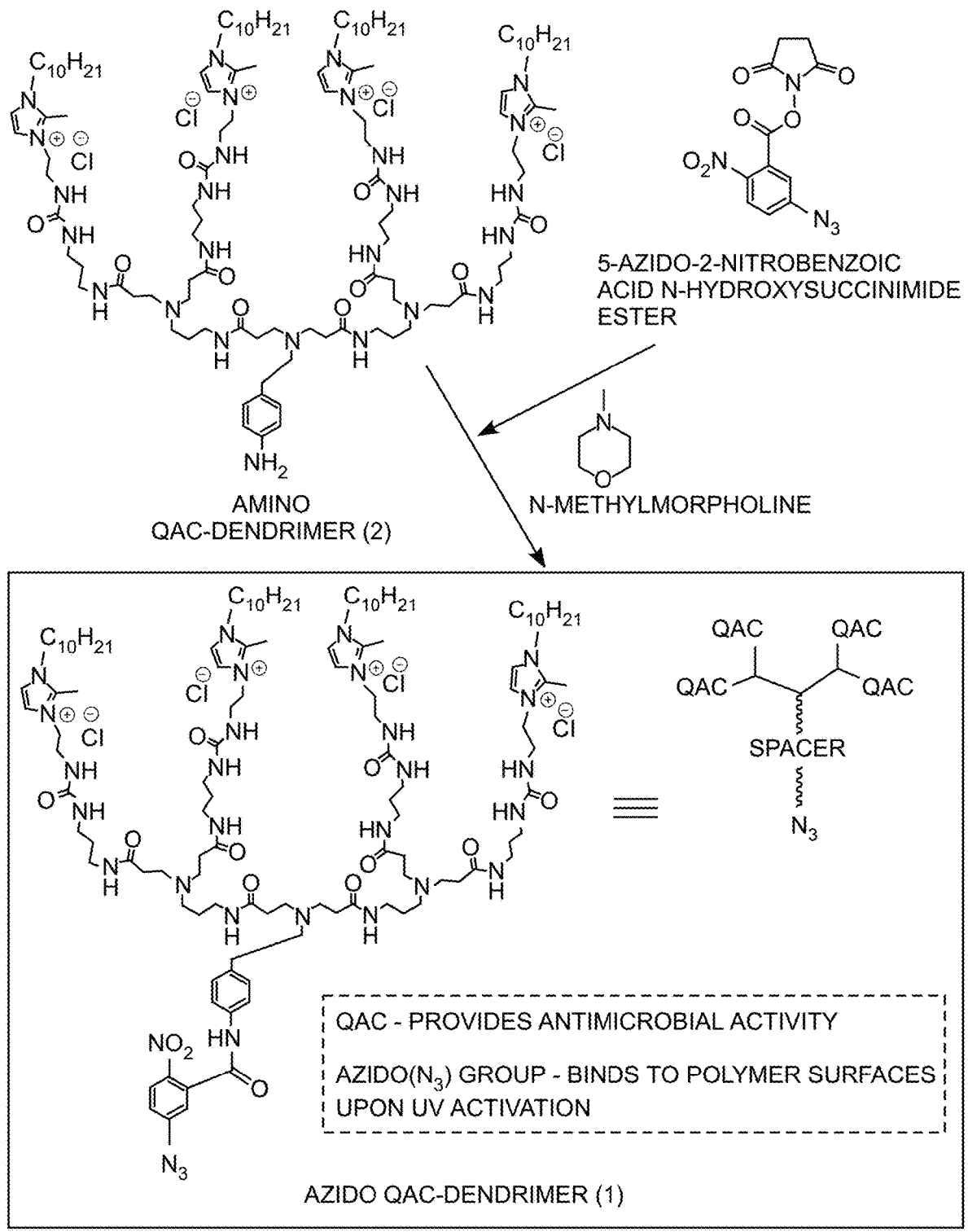

The azide dendrimer compound (1) was synthesized as shown in FIG. 60. The amino QAC-dendrimer precursor (2) was reacted with 5-azido-2-nitrobenzoic acid N-hydroxysuccinimide ester in acetonitrile in the presence of N-methyl morpholine. The target product was precipitated with diethyl ether and isolated by filtration.

Figure 61:
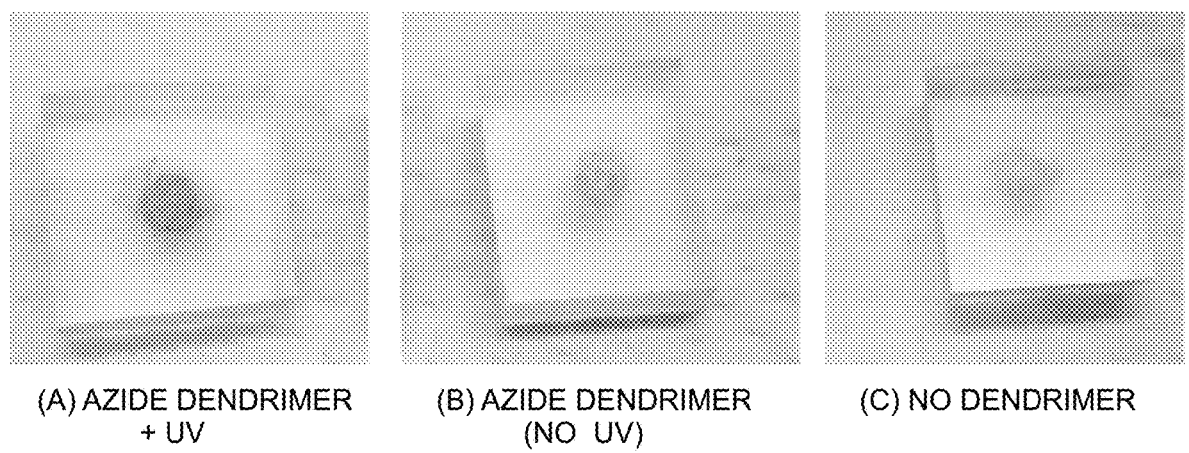

Compound (1) was deposited by evaporation from a methanol solution on a grooved circular area of a polyurethane coupon. The area was irradiated with UV light (320-350 nm wavelength range) for 20 min. The resulting coupon was rinsed with methanol and then stained with fluorescein using the procedure. Two controls were used: (a) a coupon with the dendrimer without UV-irradiation and (b) a coupon without dendrimer. FIG. 61 outlines the results that indicated that UV-irradiation provided strong (covalent) attachment to the polyurethane surface.

Figure 62:
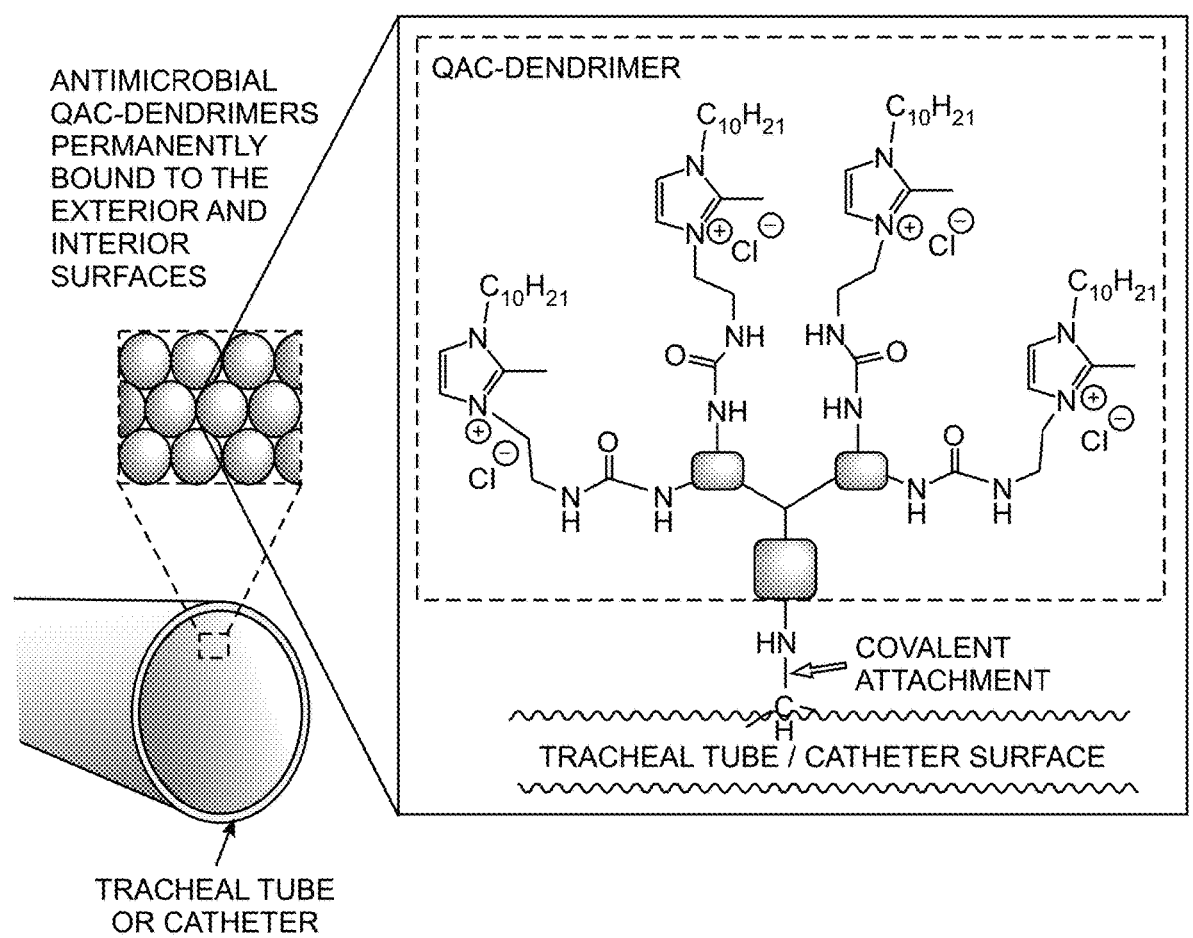

Based on literature precedent, the azide precursor can be used for the attachment of QAC-dendrimer to multiple polymers, small molecules, nanoparticles, metallic surfaces etc. and potentially impart antimicrobial properties to these materials and substrates. For example the azide precursor could be attached to the surface of the endotracheal tube materials via covalent bonds when exposed to UV-irradiation. The concept is shown in FIG. 62.

In summary, compounds are usually produced by synthetic methods comprising three major steps:
1) Development of dendrimer molecular architecture
2) Introduction of linkers and spacers
3) Functionalization with antimicrobial moieties Further synthetic transformations to provide capabilities such as surface attachment were also employed for the production of the composition providing antimicrobial properties to a substrate shown in formula (1) and discussed above with reference to one or more of FIGS. 1-62, in some examples.

S Although specific features of the invention am shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim is that would literally encompass all possible equivalents, many equivalents will be unforeseeable at the time of the amendment and am beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A composition providing antimicrobial properties to a substrate, the composition comprising: low molecular weight dendrimers of formula (1):

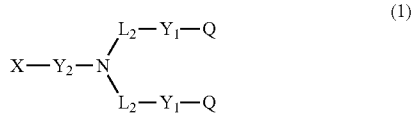

Where: Q is an antimicrobial moiety in monomer or dendritic form, N is a nitrogen atom, La is a linker linking each Y molecular spacer to the nitrogen atom, Y is a molecular spacer spacing each antimicrobial moiety Q from the $L_2$ linker and includes substituted N-ethylurea, there are two or more chains of antimicrobial moieties and molecular spacers, X is a linker configured to covalently bond to surface functionalities of the substrate, and $Y_2$ is a molecular spacer between the linker X and the nitrogen atom and includes a ring structure wherein the ring structure is a benzene.

2. The composition of claim 1 in which said ring structure is an aromatic ring.

3. The composition of claim 1 in which the antimicrobial moiety includes positively charged quaternary ammonium cations.

4. The composition of claim 3 which the quaternary ammonium cations are chosen from: tetrasubstituted nitrogen of type $^+NR_1R_2R_3R_4$, where $R_1$-$R_4$ can independently be alkyl, aryl, alkenyl or other carbon moieties and trisubstituted nitrogen of type $Z_1Z_2 N^+=CA_1A_2$, where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$.

5. The composition of claim 4 in which the quaternary ammonium cations are chosen from substituted dimethyldodecylammonium cation, didodecylmethylammonium cation, and dimethyloctylammonium cation, and substituted 2-methyl-1-decylimidazolium.

6. The composition of claim 1 in which the linker X is chosen from: amino groups, dichlorotriazine, phosphonic acid, azide or other linkers specific to the surface of choice.

7. The composition of claim 1 in which the linker $L_2$ includes substituted N-propyl-propionamide.

8. The composition of claim 1 in which the spacer $Y_1$ includes substituted N-ethylurea.

9. A composition providing antimicrobial properties to a substrate, the composition comprising: an antimicrobial moiety in monomer or dendritic form; a nitrogen atom; a linker $L_2$ linking a molecular spacer $Y_1$ to the nitrogen atom, the molecular spacer Y spacing each antimicrobial moiety from the $L_2$ linker; two or more chains of antimicrobial moieties and molecular spacers; a linker X configured to covalently bond to surface functionalities of the substrate; and a molecular spacer $Y_2$ between the linker X and the nitrogen atom and includes ring structure wherein the ring structure is a benzene.

10. The composition of claim 9 in which said ring structure is an aromatic ring.

11. The composition of claim 9 in which the antimicrobial moiety includes positively charged quaternary ammonium cations.

12. The composition of claim 11 in which the quaternary ammonium cations are chosen from: tetrasubstituted nitrogen of type $^+NR_1R_2R_3R_4$ where $R_1$-$R_4$ can independently be alkyl, aryl, alkenyl or other carbon moieties and trisubstituted nitrogen of type $Z_1Z_2 N^+=CA_1A_2$ where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$.

13. The composition of claim 12 in which the quaternary ammonia cations is chosen from substituted dimethyldodecylammonium cation, didodecylmethylammonium cation, and dimethyloctylammonium cation, and substituted 2-methyl-1-decylimidazolium.

14. The composition of claim 9 in which the linker X is chosen from: amino groups, dichlorotriazine, phosphonic acid, and azide.

15. The composition of claim 9 in which the linker $L_2$ includes substituted N-propyl-propionamide.

16. The composition of claim 9 in which the spacer $Y_1$ includes substituted N-ethylurea.

17. A composition providing antimicrobial properties to a substrate, the composition comprising:
low molecular weight dendrimers of formula (1):

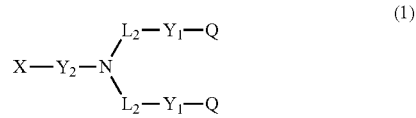

Where:
Q is an antimicrobial moiety in monomer or dendritic form,
N is a nitrogen atom,
$L_2$ is a linker linking each $Y_1$ molecular spacer to the nitrogen atom,
$Y_1$ is a molecular spacer spacing each antimicrobial moiety Q from the $L_2$ linker,
there are two or more chains of antimicrobial moieties and molecular spacers,
X is a linker configured to covalently bond to surface functionalities of the substrate,
$Y_2$ is a molecular spacer between the linker X and the nitrogen atom, and wherein the antimicrobial moiety includes positively charged quaternary ammonium cation chosen from: tetrasubstituted nitrogen of type $^+NR_1R_2R_3R_4$, where $R_1$-$R_4$ can independently be alkyl, aryl, alkenyl or other carbon moieties and trisubstituted nitrogen of type $Z_1Z_2 N^+=CA_1A_2$, where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$ and from substituted dimethyldodecylammonium cation, didodecylmethylammonium cation, and dimethyloctylammonium cation, and substituted 2-methyl-1-decylimidazolium.

18. A composition providing antimicrobial properties to a substrate, the composition comprising:
low molecular weight dendrimers of formula (1):

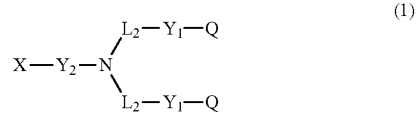

Where:
Q is an antimicrobial moiety in monomer or dendritic form,

N is a nitrogen atom, $L_2$ is a linker linking each $Y_1$ molecular spacer to the nitrogen atom and includes substitute N propyl-propionamide, $Y_1$ is a molecular spacer spacing each antimicrobial moiety Q from the $L_2$ linker, there are two or more chains of antimicrobial moieties and molecular spacers, X is a linker configured to covalently bond to surface functionalities of the substrate, and $Y_2$ is a molecular spacer between the linker X and the nitrogen atom.

19. A composition providing antimicrobial properties to a substrate, the composition comprising:

low molecular weight dendrimers of formula (1):

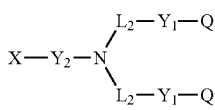

(1)

Where:

Q is an antimicrobial moiety in monomer or dendritic form,

N is a nitrogen atom, $L_2$ is a linker linking each $Y_1$ molecular spacer to the nitrogen atom, $Y_1$ is a molecular spacer spacing each antimicrobial moiety Q from the $L_2$ linker and includes substituted N-ethylurea, there are two or more chains of antimicrobial moieties and molecular spacers, X is a linker configured to covalently bond to surface functionalities of the substrate, and $Y_2$ is a molecular spacer between the linker X and the nitrogen atom.

20. A composition providing antimicrobial properties to a substrate, the composition comprising:

an antimicrobial moiety in monomer or dendritic form;

a nitrogen atom;

a linker $L_2$ linking a molecular spacer $Y_1$ to the nitrogen atom, the molecular spacer $Y_1$ spacing each antimicrobial moiety from the $L_2$ linker;

two or more chains of antimicrobial moieties and molecular spacers;

a linker X configured to covalently bond to surface functionalities of the substrate;

a molecular spacer $Y_2$ between the linker X and the nitrogen atom; and wherein the antimicrobial moiety includes positively charged quaternary ammonium cations chosen from: tetrasubstituted nitrogen of type $^+NR_1R_2R_3R_4$ where $R_1$-$R_4$ can independently be alkyl, aryl, alkenyl or other carbon moieties and trisubstituted nitrogen of type $Z_1Z_2 N^+=CA_1A_2$ where $Z_1$, $Z_2$ can independently be alkyl, aryl, alkenyl or other carbon moieties and $A_1$ and $A_2$ are carbon or heteroatom moieties that may form a ring structure with $Z_1$ or $Z_2$ and from substituted dimethyldodecylammonium cation, didodecylmethylammonium cation, and dimethyloctylammonium cation, and substituted 2-methyl-1-decylimidazolium.

21. A composition providing antimicrobial properties to a substrate, the composition comprising:

an antimicrobial moiety in monomer or dendritic form;

a nitrogen atom;

a linker $L_2$ linking a molecular spacer $Y_1$ to the nitrogen atom, the molecular spacer $Y_1$ spacing each antimicrobial moiety from the $L_2$ linker and the linker $L_2$ including a substituted N-propyl-propionamide;

two or more chains of antimicrobial moieties and molecular spacers;

a linker X configured to covalently bond to surface functionalities of the substrate; and a molecular spacer $Y_2$ between the linker X and the nitrogen atom.

22. A composition providing antimicrobial properties to a substrate, the composition comprising:

an antimicrobial moiety in monomer or dendritic form;

a nitrogen atom;

a linker $L_2$ linking a molecular spacer $Y_1$ to the nitrogen atom, the molecular spacer $Y_1$ spacing each antimicrobial moiety from the $L_2$ linker;

two or more chains of antimicrobial moieties and molecular spacers;

a linker X configured to covalently bond to surface functionalities of the substrate; and a molecular spacer $Y_2$ between the linker X and the nitrogen atom, the spacer $Y_1$ including substituted N-ethylurea.

* * * * *